US006085239A

United States Patent [19]

Kubo et al.

[11] Patent Number: 6,085,239

[45] Date of Patent: Jul. 4, 2000

[54] INFORMATION ACQUISITION PROXY SYSTEM AND INFORMATION TRANSFER MANAGING SYSTEM

[75] Inventors: Toru Kubo, Yokohama; Yasuhide Horiuchi, Tokyo; Satoshi Terasaki, Oomiya, all of Japan

[73] Assignee: Matsushita Electric Industrial Co., Ltd., Osaka, Japan

[21] Appl. No.: 08/958,318

[22] Filed: Oct. 27, 1997

[30] Foreign Application Priority Data

| | | | |
|---|---|---|---|
| Oct. 28, 1996 | [JP] | Japan | 8-284869 |
| May 21, 1997 | [JP] | Japan | 9-130740 |

[51] Int. Cl.[7] .......... G06F 13/00

[52] U.S. Cl. .......... 709/223; 709/201; 709/224

[58] Field of Search .......... 709/201, 202, 709/203, 206, 219, 223, 224, 225, 300, 302; 707/9, 10, 104

[56] References Cited

U.S. PATENT DOCUMENTS

| | | | |
|---|---|---|---|
| 5,754,939 | 5/1998 | Herz et al. | 455/4.2 |
| 5,809,250 | 9/1998 | Kisor | 709/227 |
| 5,822,539 | 10/1998 | Hoff | 709/236 |
| 5,848,412 | 12/1998 | Rowland et al. | 707/9 |

FOREIGN PATENT DOCUMENTS

| | | |
|---|---|---|
| 6-187261 | 7/1994 | Japan . |

*Primary Examiner*—Viet D. Vu
*Attorney, Agent, or Firm*—Lowe Hauptman Gopstein Gilman & Berner

[57] ABSTRACT

An information acquisition proxy system which conducts mediation for information acquisition between an information accessing terminal and an information distributing server. The system comprises a user authentication section for identifying a user and an information acquisition history managing section for retaining and managing a demand for information acquisition from the information accessing terminal, with the information acquisition history managing section retaining and managing demands in units of users. Also included in the system is an additional information managing section for managing additional information for the demand said information acquisition history managing section manages. With this arrangement, an additional information is added by one user when the user has access to specific information, and hence the user can refer to the additional information at the later information access using a different information accessing terminal, thus allowing effective information access work based upon the previous access situation.

17 Claims, 50 Drawing Sheets

| USER 1 | | USER 2 | | |
|---|---|---|---|---|
| IDENTIFIER | LABEL | IDENTIFIER | LABEL | ...... |
| A | TRAVEL INFORMATION | Z | ANNOUNCEMENT OF NEW TECHNOLOGY | |
| B | DEVELOPMENT OF INTERNET | W | INTRODUCTION OF NEW PRODUCTS | ...... |
| Z | ANNOUNCEMENT OF NEW TECHNOLOGY | | | |
| X | SHOPPING GUIDE | ⋮ | | ...... |
| ⋮ | | | | |

| USER 1 | | USER 2 | | |
|---|---|---|---|---|
| IDENTIFIER | ADDITIONAL INFORMATION | IDENTIFIER | ADDITIONAL INFORMATION | ...... |
| B | USE AS CONFERENCE DATA AFTERWARDS | Z | FOLLOW-UP NECESSARY | ...... |
| Z | IMPORTANT, COMMUNIZATION BY GROUP | | | |
| | | | | |

| INFORMATION ACQUISITION HISTORY | |
|---|---|
| TITLE | ADDITIONAL INFORMATION |
| 1 TRAVEL INFORMATION | |
| 2 DEVELOPMENT OF INTERNET | USE AS CONFERENCE DATA AFTERWARDS |
| 3 ANNOUNCEMENT OF NEW TECHNOLOGY | IMPORTANT, COMMUNIZATION BY GROUP |
| 4 SHOPPING GUIDE | |

FIG.11

| GROUP 1 | GROUP 2 | ...... |
|---|---|---|
| USER 1<br>USER 2<br>USER 5 | USER 1<br>USER 7<br>USER 8 | ...... |

FIG.12

| INFORMATION ACQUISITION HISTORY | | |
|---|---|---|
| TITLE | USER NAME | ADDITIONAL INFORMATION |
| 1 TRAVEL INFORMATION | USER 1 | |
| 2 DEVELOPMENT OF INTERNET | USER 1 | USE AS CONFERENCE DATA AFTERWARDS |
| 3 ANNOUNCEMENT OF NEW TECHNOLOGY | USER 1 | IMPORTANT,<br>COMMUNIZATION BY GROUP |
| | USER 2 | FOLLOW-UP NECESSARY |
| 4 SHOPPING GUIDE | USER 1 | |
| 5 INTRODUCTION OF NEW PRODUCTS | USER 2 | |

| TEXT | PICTURE |
| --- | --- |
| 20KB | MONOCHROMATIC PICTURE 1024X768 |

| IDENTIFIER | INFORMATION STORAGE POSITION | CACHE CONTROL INFORMATION | |
| --- | --- | --- | --- |
| | | FINAL ACCESS DATE AND TIME | EXTENDED INFORMATION |
| A | X | 1996/8/20 18:00:00 | |

FIG.20

| IDENTIFIER | INFORMATION STORAGE POSITION | CACHE CONTROL INFORMATION | |
|---|---|---|---|
| | | FINAL ACCESS DATE AND TIME | EXTENDED INFORMATION |
| A | X | 1996/8/20 18:00:00 | WAIT FOR ACCESS FROM USER 1 FOR 3 DAYS |

FIG.21

| USER 1 | | USER 2 | |
|---|---|---|---|
| IDENTIFIER | ADDITIONAL INFORMATION | IDENTIFIER | ADDITIONAL INFORMATION |
| X | USE AS CONFERENCE DATA AFTERWARDS | Z | FOLLOW-UP NECESSARY |
| A | OCCURRENCE OF CONVERSION OF COLOR PICTURE INTO MONOCHROMATIC PICTURE | | |
| | | | |

FIG.22

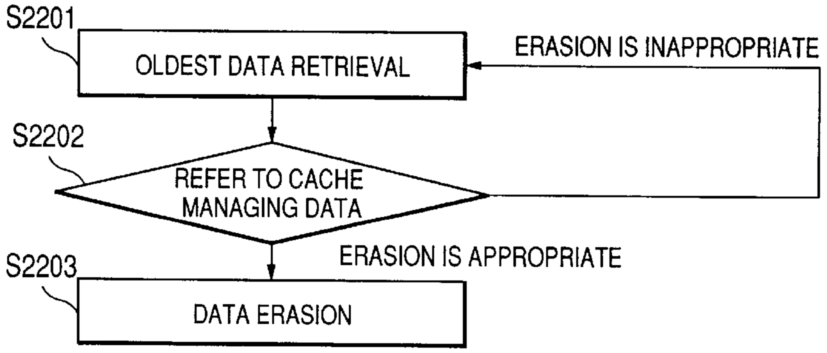

FIG.23

| IDENTIFIER | INFORMATION STORAGE POSITION | CACHE CONTROL INFORMATION | |
|---|---|---|---|
| | | FINAL ACCESS DATE AND TIME | EXTENDED INFORMATION |
| A | X | 1996/8/20 18:00:00 | WAIT FOR ACCESS FROM USER 1 FOR 3 DAYS |
| C | Z | 1996/8/20 18:30:00 | |
| D | Y | 1996/8/21 3:00:00 | |
| ⋮ | ⋮ | ⋮ | |
| ⋮ | ⋮ | ⋮ | |

FIG.24

| IDENTIFIER | INFORMATION STORAGE POSITION | CACHE CONTROL INFORMATION | |
|---|---|---|---|
| | | FINAL ACCESS DATE AND TIME | EXTENDED INFORMATION |
| A | X | 1996/8/20 18:00:00 | WAIT FOR ACCESS FROM USER 1 FOR 3 DAYS |
| D | Y | 1996/8/21 3:00:00 | |
| ⋮ | ⋮ | ⋮ | |
| ⋮ | ⋮ | ⋮ | |

| INFORMATION ACQUISITION HISTORY | |
|---|---|
| TITLE | ADDITIONAL INFORMATION |
| 1 TRAVEL INFORMATION | |
| 2 DEVELOPMENT OF INTERNET | USE AS CONFERENCE DATA AFTERWARDS |
| 3 ECOLOGY OF WILD BIRDS | [OCCURRENCE OF INFORMATION LOSS AT FINAL ACCESS] |

| TEXT | PICTURE |
| --- | --- |
| 20KB | COLOR PICTURE 800×600 |

FIG.33
| TEXT | PICTURE |
| --- | --- |
| 5KB | MONOCHROMATIC PICTURE 160X80 |
FIG.34
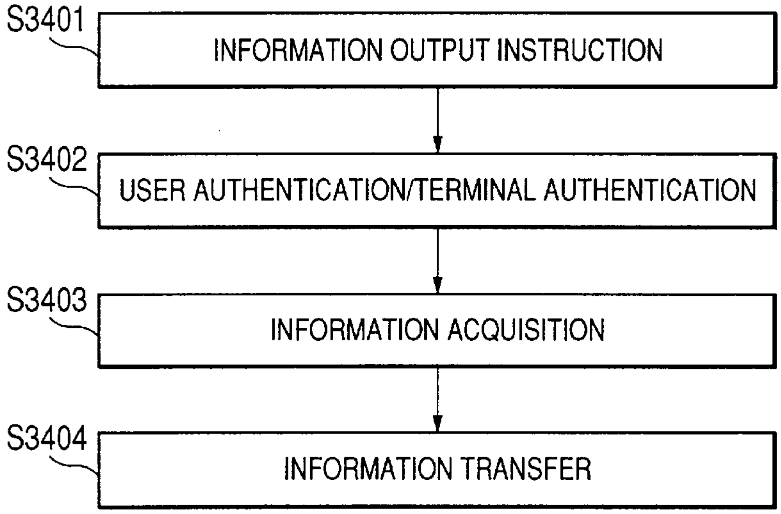
FIG.35
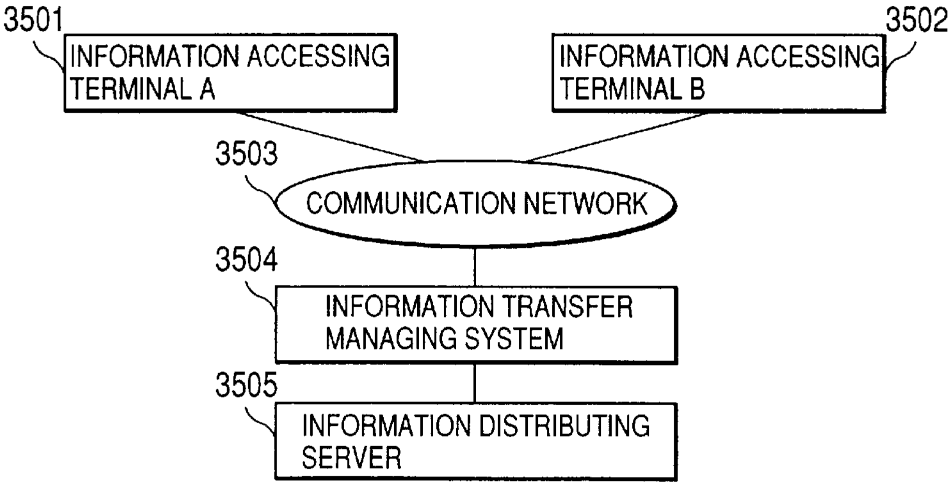

| USER 1 | | | USER 2 | | | |
|---|---|---|---|---|---|---|
| IDENTIFIER | LATEST REFERENCE DATE AND TIME | LOSS | IDENTIFIER | LATEST REFERENCE DATE AND TIME | LOSS | ...... |
| INFORMATION w | 97/01/20 14:26 | NO | INFORMATION w | 97/01/17 10:00 | NO | ...... |
| INFORMATION x | 97/01/17 17:00 | NO | | | | |
| | | | | | | |

| INFORMATION ACQUISITION HISTORY | | |
|---|---|---|
| IDENTIFIER | LATEST REFERENCE DATE AND TIME | LOSS |
| INFORMATION w | 97/01/20 14:26 | NO |
| INFORMATION x | 97/01/17 17:00 | NO |

| GROUP 1 | GROUP 2 | ...... |
|---|---|---|
| USER 1<br>USER 2<br>USER 5 | USER 1<br>USER 7<br>USER 8 | ...... |

| INFORMATION ACQUISITION HISTORY | | | |
|---|---|---|---|
| IDENTIFIER | USER NAME | LATEST REFERENCE DATE AND TIME | LOSS |
| INFORMATION w | USER 1 | 97/01/20 14:26 | NO |
| | USER 2 | 97/01/17 10:00 | NO |
| INFORMATION x | USER 1 | 97/01/17 17:00 | NO |

| TEXT | PICTURE |
| --- | --- |
| 20KB | MONOCHROMATIC PICTURE 1024X768 |

| USER 1 | | | USER 2 | | | |
| --- | --- | --- | --- | --- | --- | --- |
| IDENTIFIER | LATEST REFERENCE DATE AND TIME | LOSS | IDENTIFIER | LATEST REFERENCE DATE AND TIME | LOSS | ······ |
| INFORMATION w | 97/01/20 14:26 | NO | INFORMATION x | 97/01/17 10:00 | NO | ······ |
| INFORMATION x | 97/01/17 17:00 | NO | | | | |
| INFORMATION y | 97/01/20 14:40 | OCCURRENCE | | | | |

| INFORMATION ACQUISITION HISTORY | | |
|---|---|---|
| IDENTIFIER | LATEST REFERENCE DATE AND TIME | LOSS |
| INFORMATION w | 97/01/20 14:26 | NO |
| INFORMATION x | 97/01/17 17:00 | NO |
| INFORMATION y | 97/01/20 14:40 | OCCURRENCE |

| | TERMINAL A | TERMINAL B |
|---|---|---|
| COLOR PICTURE DISPLAY | INCAPABLE | CAPABLE |
| TABLE DISPLAY | INCAPABLE | CAPABLE |

FIG.56

| USER 1 | | | | | | | |
|---|---|---|---|---|---|---|---|
| IDENTIFIER | CONTENTS | | | | LATEST REFERENCE DATE AND TIME | LOSS | ...... |
| | POSITION | KIND | ATTRIBUTE | NON-DISPLAY | | | |
| INFORMATION w | ● | LINK | INFORMATION x | NO PRESENCE | 97/01/20 14:26 | NO | ...... |

FIG.58

| USER 1 | | | | | | | |
|---|---|---|---|---|---|---|---|
| IDENTIFIER | CONTENTS | | | | LATEST REFERENCE DATE AND TIME | LOSS | ...... |
| | POSITION | KIND | ATTRIBUTE | NON-DISPLAY | | | |
| INFORMATION w | ● | LINK | INFORMATION x | NO PRESENCE | 97/01/20 14:26 | NO | ...... |
| INFORMATION x | ■ | TABLE | | PRESENCE | 97/01/20 14:40 | NO | |

| INFORMATION ACQUISITION HISTORY | | |
|---|---|---|
| IDENTIFIER | LATEST REFERENCE DATE AND TIME | REFERENCE |
| INFORMATION w | 97/01/20 14:26 | COMPLETE |
| INFORMATION x | 97/01/20 14:40 | INCOMPLETE |

THIS IS INFORMATION w.

REFER TO <U><UNPERFORMED></U>
<U>INFORMATION x</U> FOR DETAILS

THIS IS INFORMATION w.

REFER TO <U><PORTION></U>
<U>INFORMATION x</U> FOR DETAILS

| | TERMINAL A | TERMINAL B |
|---|---|---|
| COLOR PICTURE DISPLAY | INCAPABLE | CAPABLE |
| TABLE DISPLAY | INCAPABLE | CAPABLE |
| TEXT INPUT | CAPABLE | CAPABLE |
| PLURAL-SECTION SELECT | INCAPABLE | CAPABLE |

| KIND | IDENTIFIER | ADDITIONAL INFORMATION |
|---|---|---|
| ACQUISITION | INFORMATION y | NO |

| INFORMATION y | | | | | |
|---|---|---|---|---|---|
| POSITION | KIND | ATTRIBUTE | | | |
| ● | FORM | INPUT TO INFORMATION z | | | |
| ▲ | TEXT INPUT | ITEM NAME | INITIAL VALUE | | |
| | | ITEM 1 | NO PRESENCE | | |
| ■ | MULTIPLE SELECTION | ITEM NAME | MEMBER | | |
| | | ITEM 2 | X:NON-SELECTION | Y:NON-SELECTION | Z:NON-SELECTION |

| KIND | IDENTIFIER | ADDITIONAL INFORMATION |
|---|---|---|
| INPUT | INFORMATION z | EMPTY |

FIG.73

<table>
<tr><td colspan="11">USER 1</td><td>......</td></tr>
<tr><td rowspan="2">IDENTIFIER</td><td colspan="6">CONTENTS</td><td colspan="4">ACCESS INFORMATION</td><td rowspan="7">......</td></tr>
<tr><td>POSITION</td><td>KIND</td><td colspan="4">ATTRIBUTE</td><td>KIND</td><td>IDENTIFIER</td><td>ADDITIONAL INFORMATION</td><td>CONDITION</td></tr>
<tr><td rowspan="6">INFORMATION y</td><td>●</td><td>FORM</td><td colspan="4">INPUT TO INFORMATION z</td><td rowspan="5">INPUT</td><td rowspan="5">INFORMATION z</td><td rowspan="5">ITEM 1=NO<br>ITEM 2=NO</td><td rowspan="5">UNPERFORMED</td></tr>
<tr><td rowspan="2">▲</td><td rowspan="2">TEXT INPUT</td><td>ITEM NAME</td><td colspan="3">INITIAL VALUE</td></tr>
<tr><td>ITEM 1</td><td colspan="3">NO PRESENCE</td></tr>
<tr><td rowspan="2">■</td><td rowspan="2">PLURAL-SELECTION SELECT</td><td>ITEM NAME</td><td colspan="3">MEMBER</td></tr>
<tr><td>ITEM 2</td><td>X:NON-SELECTION</td><td>Y:NON-SELECTION</td><td>Z:NON-SELECTION</td></tr>
<tr><td colspan="6"></td><td colspan="4"></td><td></td></tr>
</table>

| KIND | IDENTIFIER | ADDITIONAL INFORMATION |
|---|---|---|
| INPUT | INFORMATION z | ITEM 1=abc & ITEM 2= |

FIG.76

<table>
<tr><td colspan="11">USER 1</td><td>......</td></tr>
<tr><td rowspan="2">IDENTIFIER</td><td colspan="6">CONTENTS</td><td colspan="4">ACCESS INFORMATION</td><td rowspan="8">......</td></tr>
<tr><td>POSITION</td><td>KIND</td><td colspan="4">ATTRIBUTE</td><td>KIND</td><td>IDENTIFIER</td><td>ADDITIONAL INFORMATION</td><td>CONDITION</td></tr>
<tr><td rowspan="5">INFORMATION y</td><td>●</td><td>FORM</td><td colspan="4">INPUT TO INFORMATION z</td><td rowspan="5">INPUT</td><td rowspan="5">INFORMATION z</td><td rowspan="5">ITEM 1=abc<br>ITEM 2=UNPERFORMED</td><td rowspan="5">PORTION</td></tr>
<tr><td rowspan="2">▲</td><td rowspan="2">TEXT INPUT</td><td>ITEM NAME</td><td colspan="3">INITIAL VALUE</td></tr>
<tr><td>ITEM 1</td><td colspan="3">NO PRESENCE</td></tr>
<tr><td rowspan="2">■</td><td rowspan="2">PLURAL-SELECTION SELECT</td><td>ITEM NAME</td><td colspan="3">MEMBER</td></tr>
<tr><td>ITEM 2</td><td>X:NON-SELECTION</td><td>Y:NON-SELECTION</td><td>Z:NON-SELECTION</td></tr>
<tr><td>INFORMATION z'</td><td colspan="6">NO PRESENCE</td><td colspan="4">NO PRESENCE</td></tr>
</table>

| INFORMATION ACQUISITION HISTORY | |
|---|---|
| IDENTIFIER | INPUT SITUATION |
| INFORMATION y | PORTION |
| INFORMATION z' | NO PRESENCE |

FIG.87

| USER 1 | | | | | | | | …… |
|---|---|---|---|---|---|---|---|---|
| IDENTIFIER | CONTENTS | | | | LATEST REFERENCE DATE AND TIME | LOSS | | …… |
| INFORMATION w | POSITION | KIND | ATTRIBUTE | NON-DISPLAY | 97/01/20 14:26 | NO | | …… |
| | ● | LINK | INFORMATION x | NO PRESENCE | | | | |
| INFORMATION x | POSITION | KIND | ATTRIBUTE | NON-DISPLAY | 97/01/20 14:40 | NO | | |
| | ■ | TABLE | | PRESENCE | | | | |
| INFORMATION y | POSITION | KIND | ATTRIBUTE | NON-DISPLAY | 97/01/20 14:45 | NO | | |
| | | | | | | | | |
| INFORMATION z | POSITION | KIND | ATTRIBUTE | NON-DISPLAY | 97/01/20 14:50 | NO | | |
| | ▲ | TABLE | | PRESENCE | | | | |

FIG.90

| USER 1 | | | | | | | ...... |
|---|---|---|---|---|---|---|---|
| IDENTIFIER | CONTENTS | | | | LATEST REFERENCE DATE AND TIME | LOSS | ...... |
| INFORMATION w | POSITION | KIND | ATTRIBUTE | NON-DISPLAY | 97/01/20 14:26 | NO | ...... |
| | ● | LINK | INFORMATION x | NO PRESENCE | | | |
| INFORMATION x | POSITION | KIND | ATTRIBUTE | NON-DISPLAY | 97/01/20 17:30 | NO | |
| | ■ | TABLE | | NO PRESENCE | | | |
| INFORMATION y | POSITION | KIND | ATTRIBUTE | NON-DISPLAY | 97/01/20 14:45 | NO | |
| | | | | | | | |
| INFORMATION z | POSITION | KIND | ATTRIBUTE | NON-DISPLAY | 97/01/20 14:50 | NO | |
| | ▲ | TABLE | | PRESENCE | | | |

FIG.91

| | |
|---|---|
| USER 1 | • • • • • • |
| INFORMATION z | • • • • • • |
| | |

FIG.92

| USER 1 | | | | | | | ...... |
|---|---|---|---|---|---|---|---|
| IDENTIFIER | CONTENTS | | | | LATEST REFERENCE DATE AND TIME | LOSS | ...... |
| INFORMATION w | POSITION | KIND | ATTRIBUTE | NON-DISPLAY | 97/01/20 14:26 | NO | ...... |
| | ● | LINK | INFORMATION x | NO PRESENCE | | | |
| INFORMATION x | POSITION | KIND | ATTRIBUTE | NON-DISPLAY | 97/01/20 17:30 | NO | |
| | ■ | TABLE | | NO PRESENCE | | | |
| INFORMATION y | POSITION | KIND | ATTRIBUTE | NON-DISPLAY | 97/01/20 14:45 | NO | |
| | | | | | | | |
| INFORMATION z | POSITION | KIND | ATTRIBUTE | NON-DISPLAY | 97/01/20 17:33 | NO | |
| | ▲ | TABLE | | NO PRESENCE | | | |

INFORMATION ACQUISITION PROXY SYSTEM AND INFORMATION TRANSFER MANAGING SYSTEM

BACKGROUND OF THE INVENTION

1. Field of the Invention

The present invention relates to an information acquisition proxy system connected through a network to an information distributing server and further through a network to an information accessing terminal for conducting the mediation for information acquisition from the information accessing terminal, and an information transfer managing system for accomplishing the optimum information transfer to the information accessing terminal.

2. Description of the Prior Art

Recently, service for distributing information through a WAN (Wide Area Network) or Internet has been widespreading. Available for improvement of security and efficiency in access to this service, an information acquisition (obtaining) proxy system has come into widespread use. This information acquisition proxy system processes all instructions for information acquisition from an information accessing terminal (browser) the user operates. Some information acquisition proxy system has a function for deriving and recording, as history information, an information identifier specified from an instruction about information acquisition and further for converting this history information into a format, the user can easily read, to transmit the conversion result to a browser, and hence, the user can utilize the history of the information the user has accessed in the past even in the case of using a plurality of browsers (history function).

In addition, some information acquisition proxy system has an information converting feature to perform the conversion of information to be transmitted to a terminal for the purpose of coping with a terminal with a low display ability or capacity, shortening the communication time and reducing the manufacturing cost (information converting function).

Furthermore, some information acquisition proxy system has a facility to accumulate data transmitted to a terminal for a give period of time to immediately transmit the information accumulated to a browser without obtaining data from a server keeping the original information when an acquisition instruction for the same information is again issued from the browser (cache function).

On the other hand, even in the case that, like the Internet, an information acquisition proxy system is unnecessary on security, an information transfer managing system has been employed for a portable accessing terminal having limitations in transfer ability and display ability. The principal function of the information transfer managing system is to carry out automatic re-transmission at circuit disconnection, to shorten the communication time and further to cut down data quantity.

However, the history function the prior techniques have is merely to retain the history of the information the user has accessed, and therefore, for example, difficulty is experience to use, at later access, information indicative of whether or not the user has an interest. Further, the retention of the history is made in units of terminals, and hence, in the case that the same user tries to have access to information through different terminals, there is no way but depending upon the history retained in that terminal irrespective of the fact that the same user gains access.

In addition, in the case of the prior technique, the history function only carries out the record for a specific user, i.e., for one terminal, and hence, when one user gives information addresses of useful information obtained through retrievals or the like to other users belonging to business groups, a means such as a speech and an electronic mail is necessary.

Furthermore, according to the information converting function of the prior technique, when, after one terminal with a low display ability gets incomplete information undergoing conversion, this information is taken through a second terminal accessible thereto without the application of different conversion, there is a need for inputting an information identifier to the second terminal, which leads to a troublesome operation.

Still further, according to the cache function of the prior technique, since the data accumulating time period in a server depends upon access frequency or the like, even if the significance of information is high, in the case that the access frequency to that information is low, there is a probability that the information is erased from, or destroyed, on the server at the time of reading. For this reason, in the case of using information, the user gets during a business trip, at an office after return, the same information is necessary to obtain again.

Moreover, since the prior information acquisition proxy system includes only the function to send information to a browser, in the case of outputting the information to equipment such as a printer other than the browser, it is necessary that the user once takes the information in the browser and then output it to the target equipment. In this case, depending on the ability of the browser, difficulty is encountered to read all the information, so that incomplete information may be outputted to the equipment other than the browser.

Furthermore, since the prior information transfer managing system merely manages information transfer in units of information accessing terminals, in the case of using a different terminal, the continuity on operations is broken even if the same user has access to the same information. For example, even in cases where some information is already referred to through one terminal, since another terminal can not decide whether or not to refer to that information, and hence, may refer to the same information, which deteriorates the work efficiency.

Still further, in cases where information referred to through one terminal undergoes an information conversion and comes into an incomplete situation because of a limitation in its terminal ability, even if an environment occurs later which allows the use of another terminal capable of accessing the information with no application of the conversion, the user tends to forget reference to (consultation with) that information without being aware of the necessity of again referring to the same information.

In addition, in cases where information referred to through one terminal is partially incomplete because of a limitation in its terminal ability, even if an environment occurs later which allows the use of another terminal capable of completely referring to that information, the user tends to forget reference to that information without noticing the necessity of again referring to the same information.

Moreover, in cases where the input of information referred to through one terminal is partially incomplete because of a limitation in its terminal ability, even if an environment occurs later which allows the use of another terminal capable of the complete input of that information, the user tends to forget reference to that information and input without noticing the necessity of again referring to and inputting the same information.

SUMMARY OF THE INVENTION

It is therefore an object of the present invention to provide a system which manages the history of accessed information in units of users and sets additional information with respect to specific information by the user and allows the user to refer to the additional information at later access.

Another object of this invention is to realize effective information access by communizing an information identifier, one user gets, with another user belonging to a group.

A further object of this invention is to make another browser easily refer to data undergoing information conversion.

A further object of this invention is to accomplish effective information access in a manner that the user designates specific information the user wants to stay on a server or the specific information automatically remains under special conditions.

A further object of this invention is to enable information to be directly outputted to equipment other than a browser without being once loaded in the browser.

A further object of this invention is to, if the user previously refers to specific information and then has access through a different terminal, refer to its access situation to prevent the occurrence of loss of work efficiency.

A further object of this invention is to prevent the occurrence of loss of work efficiency in cooperative works in a manner that a plurality of users belonging to the same business group communize an access situation.

A further object of this invention is to, even if there is information undergoing information conversion at the previous reference and the user has access to that information through a different terminal afterwards, refer to its access situation to allow reference to complete information.

A further object of this invention is to, even if there is information including a portion incompletely referred to at the previous time and the user has access to that information, refer to its access situation to allow reference to complete information, and further to realize an effective system which permits reference without separately or specifically obtaining the information about this access situation.

A further object of this invention is to, even if there is information including a portion incompletely inputted at the previous reference and input and the user has access thereto afterwards, refer to its input situation to prevent the omission or drop-out of input of complete information, and further to realize an effective system which permits reference without separately obtaining the information about this input situation.

A further object of this invention is to enhance the work efficiency by assisting that the user makes the termination of the incomplete work in a lump in the case that repeated use is made through one terminal and there are many information each including a portion incompletely referred to and inputted because of its terminal ability and an environment occurs later which permits the use of another terminal capable of the complete reference and input, and further to improve the batch or collective work efficiency by preferentially making the termination of the incomplete works in the order of decreasing significance.

For the purposes, in accordance with a first aspect of the present invention, an information acquisition proxy system comprises a user authentication section, an information acquisition history managing section for retaining and managing a demand for information acquisition from an information accessing terminal, with the information acquisition history managing section retaining and managing the demand in units of users, and an additional information managing section for managing additional information for the demand the information acquisition history managing section manages. Accordingly, the user sets additional information with respect to specific information, and even if having access through a different terminal, the additional information can be referred to when trying information access later.

Furthermore, the information acquisition history managing section has a function to manage information at every group comprising a plurality of users. Thus, an information identifier one user gets can be communized with different users belonging to the group, which can present effective information access.

In accordance with another aspect of this invention, an information acquisition proxy system is composed of a user authentication section, a terminal identifying section for finding out an ability of an information accessing terminal, an information converting section for converting the contents of information in accordance with a terminal ability, an information acquisition history managing section for retaining and managing a demand for information acquisition from an information accessing terminal in units of users, and an additional information managing section for managing additional information on the information acquisition demand the information acquisition history managing section manages, wherein, when the information converting section performs conversion to reduce a quantity of information, specific additional information is given to the information acquisition demand recorded in the information acquisition history managing section. With this arrangement, another browser can easily recognize data undergoing information conversion and the reference to the information becomes easy.

In addition, the information acquisition proxy system further includes a cache managing section for retaining or storing information once obtained, and therefore, when specific additional information is given to a demand the information acquisition history managing section manages, the period taken until the cache managing section erases the retained information corresponding to that demand is changed in accordance with the additional information. Accordingly, the user can designate that specific information remains on a server or the specific information can automatically be designated under specific conditions, which achieves effective information access.

Furthermore, the information acquisition proxy system is provided with an information redirect feature for forwarding information to equipment other than the information accessing terminal in accordance with an instruction from the user. This allows information to be outputted to equipment other than a browser without once loaded in the browser.

In accordance with a further aspect of this invention, an information transfer managing system is made up of a user authentication section and a transfer history managing section for retaining and managing a demand on reference to and input of information from an information accessing terminal, with the transfer history managing section having a function to retain and manage a demand in units of users. Thus, even if the user previously refers to specific information and has access to the information through the use of a different terminal afterwards, the occurrence of loss of work efficiency is preventable by the reference to the access situation.

In addition, the transfer history managing section has a function to manage information at every group comprising a plurality of users. This can prevent the occurrence of loss of work efficiency in cooperative work in a manner that a plurality of users belonging to the same business group communize the access situation.

In accordance with a further aspect of this invention, an information transfer managing system comprises a user authentication section, a terminal identifying section for finding out an ability of an information accessing terminal, an information converting section for performing the conversion of the contents of information in accordance with the terminal ability, and a transfer history managing section for retaining and managing a demand on reference to and input of information from the information accessing section, wherein, when the information converting section performs the conversion to reduce the quantity of information, specific information is added to the transfer history of the information recorded in the transfer history managing section. Thus, even if there is information subjected to the information conversion at the previous reference and the user has access to the information afterwards, it is possible to prevent the omission of the reference to the complete information by referring to the access situation.

In accordance with a further aspect of this invention, an information transfer managing system is composed of a user authentication section, a terminal identifying section for finding the ability of an information accessing terminal, a referred information analyzing section for analyzing the contents of information to be presented to the information accessing terminal to compare it with the terminal ability, and a transfer history managing section for retaining and managing a demand relating to reference to and input of information from the information accessing terminal in units of users together with the analysis result of the referred information. Thus, even if there is information including a portion incompletely referred to at the previous reference and the user has access to the information through a different terminal afterwards, it is possible to prevent the omission of reference to the complete information by referring to the access situation.

Moreover, a referred information editing section is further provided to partially change the contents of information to be supplied to the information accessing terminal. With this further provision of the referred information editing section, even if there is information including a portion incompletely referred to at the previous reference and the user has access to the information through a different terminal afterwards, in preventing the omission of reference to the complete information by referring to the access situation, it is possible to realize an effective system which allows the reference thereto without separately obtaining the information about the access situation.

In accordance with a further aspect of this invention, an information transfer managing system comprises a user authentication section, a terminal identifying section for finding the ability of an information accessing terminal, a referred information analyzing section for analyzing the contents of information to be supplied to the information accessing terminal to compare the analysis result with the terminal ability, an operation information extracting section for extracting an item relating to an operation by the user from the analysis result of the referred information analyzing section, an access information analyzing section for analyzing demand information concerning reference and input of information from the information accessing terminal to compare its analysis result with the terminal ability, and a transfer history managing section for retaining and managing a demand on the reference to and input of the information from the information accessing terminal in units of users together with the analysis results of the referred information and access information, wherein, when the access information analyzing section decides that a portion of input is incomplete in the information accessing terminal, specific information is added to the transfer history of the information recorded in the transfer history managing section. With this arrangement, even if there is information including a portion incompletely inputted at the previous reference and input and the user has access to the information through a different terminal afterwards, it is possible to prevent the omission of input of the complete information by referring to the input situation.

In addition, a referred information editing section is further provided to partially change the contents of the information to be referred or offered to the information accessing terminal. Accordingly, even if there is information including a portion incompletely inputted at the previous reference and input and the user has access to the information through a different terminal afterwards, in preventing the omission of input of the complete information by referring to the input situation, it is possible to realize an effective system which allows the reference thereto without separately obtaining the information about the input situation, and further which permits the re-use of the information previously partially inputted.

In the information transfer managing systems according to this invention, a batch or collective processing managing section is additionally provided which is made to continuously supply the information presented in accordance with the incomplete access to the information accessing terminal. Accordingly, in the case that there are many information including a portion incompletely referred to and inputted because of limitation in its terminal ability and an environment occurs later which permits the use of another terminal capable of the complete reference and input, it is possible to enhance the work efficiency by assisting that the user finishes the incomplete work in a lump.

Still further, in the information transfer managing system, the batch processing managing section is provided with a function to give a precedence to the referred information subjected to a plurality of incomplete access. Thus, in the case that there are many information including a portion incompletely referred to and inputted because of limitation in its terminal ability and an environment occurs later which permits the use of another terminal capable of the complete reference and input, it is possible to further enhance the batch work efficiency by preferentially making the termination of the incomplete works in the order of decreasing significance when the user finishes the incomplete works together.

BRIEF DESCRIPTION OF THE DRAWINGS

The object and features of the present invention will become more readily apparent from the following detailed description of the preferred embodiments taken in conjunction with the accompanying drawings in which:

FIG. 11 is an illustration of one example of group information in the first embodiment of this invention;

FIG. 12 is an illustration of one example of information acquisition history lists including group information in the first embodiment of this invention;

FIG. 20 is an illustration of one example of cache managing tables after the addition of cache control information in the second embodiment of this invention FIG. 21 is an illustration of one example of additional information lists, an additional information managing section manages, in the second embodiment of this invention;

FIG. 22 is a flow chart showing cache overflow processing in the second embodiment of this invention;

FIG. 23 is an illustration of one example of cache managing tables before overflow processing in the second embodiment of this invention;

FIG. 24 is an illustration of one example of cache managing tables after overflow processing in the second embodiment of this invention;

FIG. 33 is an illustration of one example of terminal abilities in the third embodiment of this invention;

FIG. 34 is a flow chart showing information transfer in the third embodiment of this invention;

FIG. 35 is a block diagram showing the whole arrangement of an information service system according to a fourth embodiment of this invention;

FIG. 56 is an illustration of one example of transfer history information in the fifth embodiment of this invention;

FIG. 58 is an illustration of one example of transfer history information in the fifth embodiment of this invention;

FIG. 73 is an illustration of one example of transfer history information in the seventh embodiment of this invention;

FIG. 76 is an illustration of one example of transfer history information in the seventh embodiment of this invention;

FIG. 87 is an illustration of one example of transfer history information in the ninth embodiment of this invention;

FIG. 90 is an illustration of one example of transfer history information in the ninth embodiment of this invention;

FIG. 91 is an illustration of one example of batch processing management information in the ninth embodiment of this invention; and FIG. 92 is an illustration of one example of transfer history information in the ninth embodiment of this invention.

DETAILED DESCRIPTION OF THE INVENTION (First Embodiment)

Figure 1:
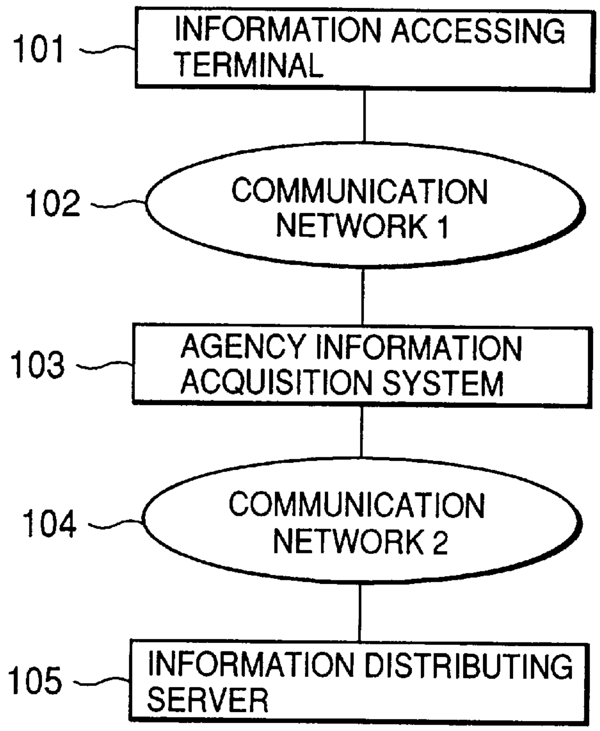
FIG. 1 is a block diagram showing the entire arrangement of an information service system according to a first embodiment of the present invention.

Referring to the drawings, a description will be made hereinbelow of a first embodiment of the present invention. FIG. 1 is an illustration of the entire arrangement of an information service system according to the first embodiment of this invention. Reference numeral 101 represents an information accessing terminal for accessing information presented on a network, numeral 103 designates an information acquisition proxy system (server), numeral 102 denotes a communication network for establishing a communication between the information accessing terminal 101 and the information acquisition proxy system 103 using wire or wireless connections, numeral 105 depicts an information distributing (offering) server existing on a network, and numeral 104 signifies a communication network for establishing a communication between the information acquisition proxy server 103 and the information distributing server 105 using wire or wireless connections.

Figure 2:
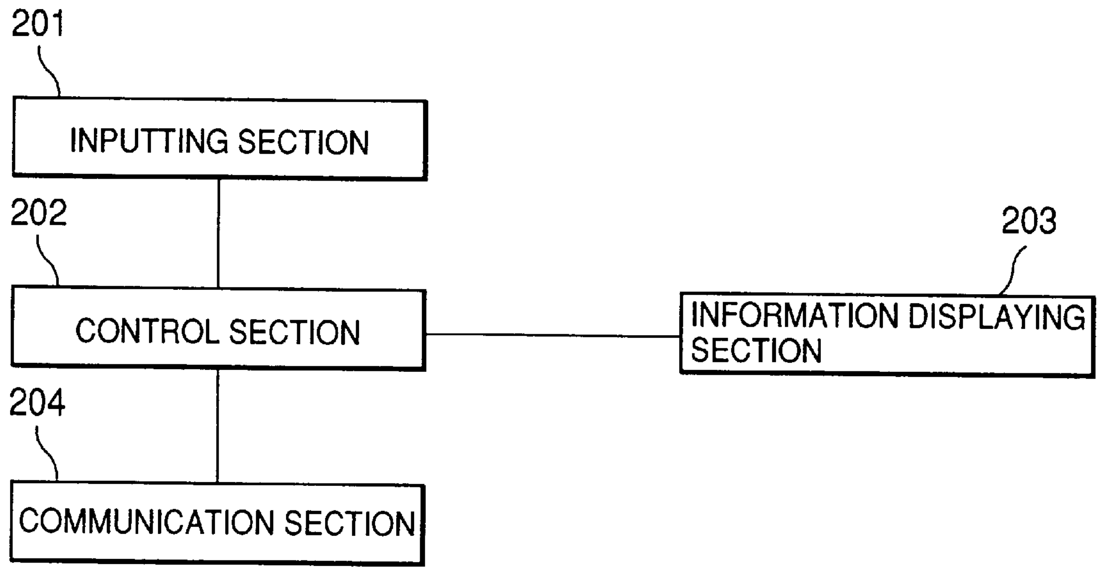
FIG. 2 is a block diagram showing an internal arrangement of an information accessing terminal in the first embodiment of this invention.

FIG. 2 is a block diagram showing an internal arrangement of the information accessing terminal 101. In FIG. 2, the information accessing terminal 101 includes an inputting section 201 for accepting input from the user, a control section for taking the charge of control of the entire terminal 101, an information displaying (outputting) section 203 for presenting the display of information to the user, and a communication section 204.

Figure 3:
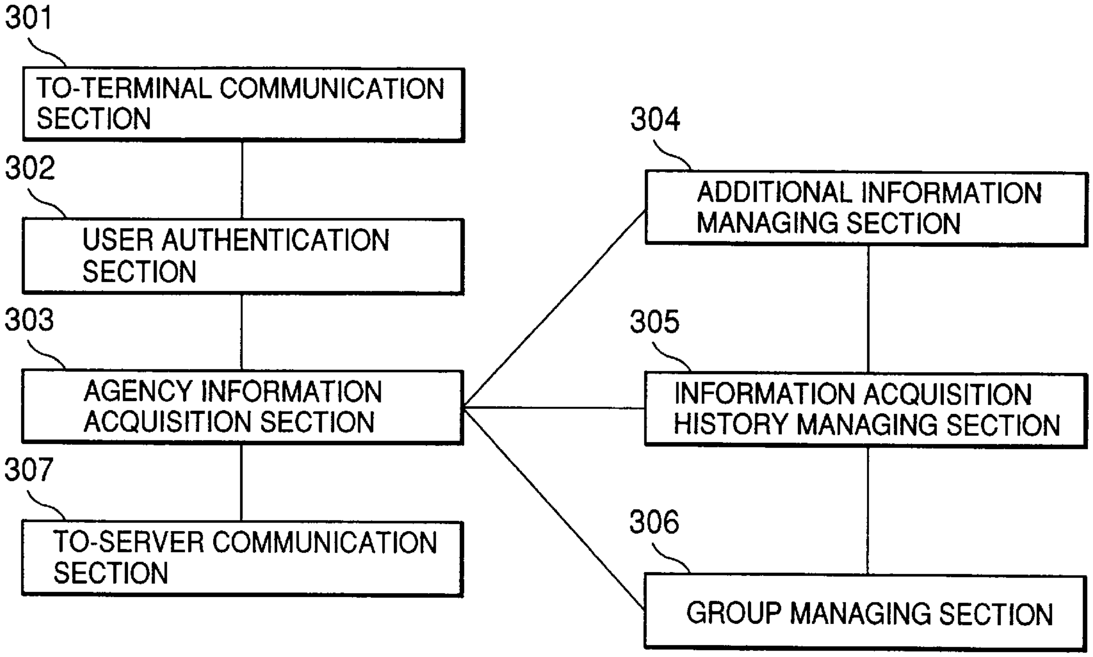
FIG. 3 is a block diagram showing an internal arrangement of an information acquisition proxy system in the first embodiment of this invention.

FIG. 3 is a block diagram showing an internal arrangement of the information acquisition proxy system 103. In FIG. 3, the information acquisition proxy system 103 comprises a to-terminal communication section 301, a user authentication section 302, an information acquisition proxy section 303, an additional information managing section 304, an information acquisition history managing section 305, a group managing section 306, and a to-server communication section 307.

Figure 4:
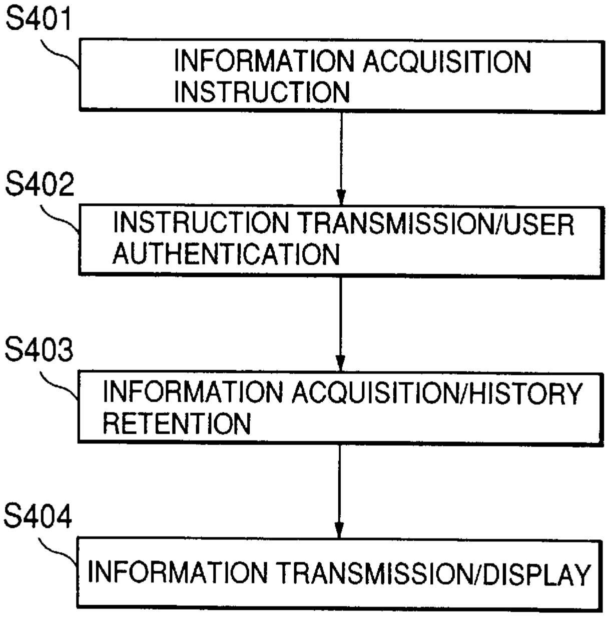
FIG. 4 is a flow chart showing the first information acquisition in the first embodiment of this invention.

A description will be made hereinbelow of an operation of the information system thus arranged, where one specific user 1 sets additional information relative to specific information and uses the additional information at the later information access. First, referring to FIG. 4 a description will be taken of an operation conducted till the retention of acquired history.

In a step S401, the user 1 gives an instruction for acquisition of information through the inputting section 201 of the information accessing terminal 101, and the instruction is communicated through the communication section 204 to the information acquisition proxy system 103. The information acquisition proxy system 103 receives the instruction through the communication section 301. Secondly, in a step S402, the user authentication section 302 identifies the user 1 being the sender of the instruction. This user information and the instruction from the user 1 are given to the information acquisition proxy section 303.

Figures 5, 6:
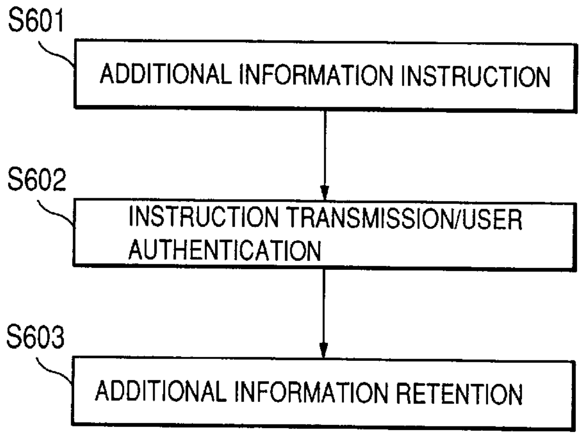
FIG. 5 is an illustration of one example of information acquisition histories in the first embodiment of this invention.
FIG. 6 is a flow chart showing additional information retention in the first embodiment of this invention.

Subsequently, in a step S403, the information acquisition proxy section 303 interprets the instruction and obtains information through the communication section 307 from the information distributing server 105. At the acquisition of the information, the information acquisition proxy section 303 stores an identifier for the acquired information to a history list retained at every user in the information acquisition history managing section 305. FIG. 5 shows one example of history lists in this embodiment. In this embodiment, the history list has, as a label, a descriptive text concerning the information presented from the information distributing server 105.

Thereafter, in a step S404, the information acquisition proxy section 303 transmits the information from the information distributing server 105 through the communication section 301 to the information accessing terminal 101. The information accessing terminal 101 displays the information coming through the communication section 204 on the information displaying section 203.

Furthermore, referring to FIG. 6, a description will be taken hereinbelow of an operation conducted when the user adds specific information to the currently displayed information and the additional information is retained.

First, in a step S601, the user 1 gives an instruction through the inputting section 201 to the information accessing terminal to add special additional information, for example "use for making out conference data", to an information entry displayed. The contents of this instruction are communicated through the communication section 204 to the information acquisition proxy system 103. Then, in a step S602, as in the case of the information acquisition, the user authentication section 302 identifies the user 1 who has given the instruction.

Figures 7, 8:
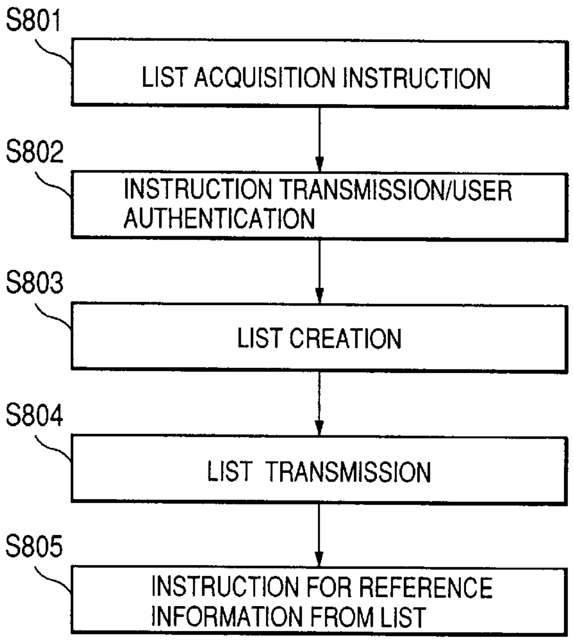
FIG. 7 is an illustration of one example of additional information lists in the first embodiment of this invention.
FIG. 8 is a flow chart showing an information acquisition instruction based upon a list in the first embodiment of this invention.

Subsequently, in a step S603, in the information acquisition proxy system 103, this user information and the instruction are handed over to the information acquisition proxy section 303, and the information acquisition proxy section 303 gives an instruction for storing the additional information to the additional information managing section 304. The additional information managing section 304 updates the list comprising a pair of information identifier and additional information retained at every user. FIG. 7 shows one example of additional information lists in this embodiment.

Still further, referring to FIG. 8, a description will be made hereinbelow of an operation taken for when the history of information the user refers to in the past is displayed and the information is obtained on the basis of the displayed additional information.

First, in a step S801, for obtaining information on the basis of the additional information produced in the past, the user 1 issues an instruction for display of an information acquisition history through the use of the inputting section 210. Then, in a step 802, the communication section 301 receives the instruction from the user 1 and the user authentication section 302 identifies the user 1 who has transmitted the instruction. This information acquisition instruction and the user information are together communicated to the information acquisition proxy section 303 of the information acquisition proxy system 103.

Figures 9, 10:
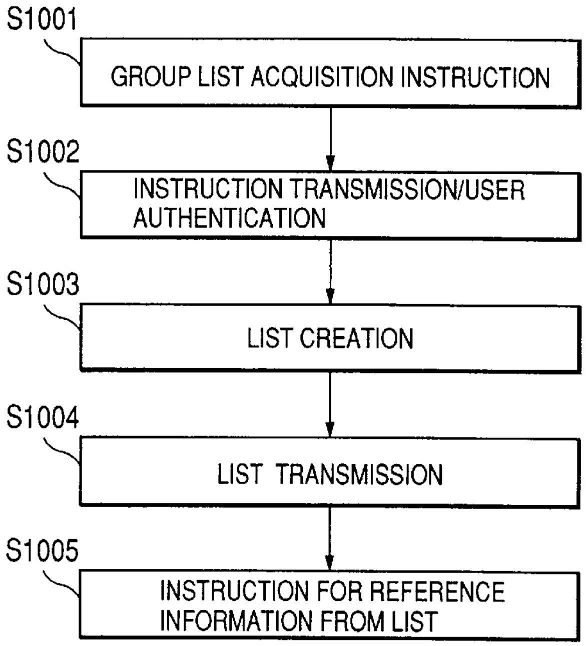
FIG. 9 is an illustration of one example of displayed pictures of an information acquisition history in the first embodiment of this invention.
FIG. 10 is a flow chart showing an information acquisition instruction using a group list in the first embodiment of this invention.

Subsequently, in a step S803, in terms of the user 1 the information acquisition proxy section 303 reads out the information acquisition history from the information acquisition history managing section 305 and the additional information from the additional information managing section 304, and further forms them into a format the user 1 can easily read. Further, in a step S804, a list created in the information acquisition proxy section 303 is sent through the communication section 301 to the information accessing terminal 101. In the information accessing terminal 101, the communication section 204 receives the information acquisition history data and the additional information and the information displaying section 203 displays them thereon. FIG. 9 is an illustration of one example of displayed pictures of the information acquisition history in this embodiment.

Following this, in a step S805, the user 1 sees the additional information on the picture display example of FIG. 9 to find out the history of the necessary information. In the case of obtaining the contents of the information shown in that history, the user 1 issues an instruction for acquisition of information corresponding to the displayed history through the use of the inputting section 201. This instruction is the same as that for the common information acquisition, and the desired information is displayed on the information displaying section 203 through an operation similar to that for the common information acquisition.

With the above-mentioned operations, the user 1 can refer to the additional information personally added to some information together with the information acquisition history and can quickly obtain the information on the basis of the additional information.

Moreover, referring to FIG. 10, a description will be made hereinbelow of one example in which another user 2 belonging to the same group as the user 1 communizes or shares the additional information recorded by the user 1, that is, an operation taken for when the user 2 makes the display of information acquisition history occurring at every group to conduct the information acquisition.

First, in a step S1001, the user 2 issues an instruction through the use of the inputting section 201 to make the information accessing terminal 204 refer to the information acquisition history of a group. This instruction is sent through the communication section 204 to the information acquisition proxy system 103. Then, in a step S1002, the information acquisition proxy system 103 uses the user authentication section 302 to identify the user 2 being the sender of the instruction. This user information and the instruction from the user 2, the information acquisition proxy system 103 gets, are delivered to the information acquisition proxy section 303.

Subsequently, in a step S1003, the information acquisition proxy section 303 takes the information relating to the group to which the instruction issuing user 2 belongs from the group managing section 306. FIG. 11 is an illustration of one example of group information in this embodiment. On the basis of the obtained group information the information acquisition proxy section 303 obtains the information acquisition history concerning the users belonging to the same group from the information acquisition history managing section 305 and the additional information from the additional information managing section 304. The information acquisition proxy section 303 forms the obtained information into a format the user can easily read and makes out a list thereof.

After this, in a step S1004, the information acquisition proxy section 303 transmits the created list through the communication section 301 to the information accessing terminal 101. In the information accessing terminal 101, the communication section 204 receives the information acquisition history data and the additional information and the information displaying section 203 displays them. FIG. 12 is an illustration of one example of the information acquisition history including the group information in this embodiment. Further, in a step S1005, the user is allowed to have access to the information on the basis of the history data and additional information displayed thereon.

With this operations, the user, together with the different users belonging to the group, can communizes the recorded additional information.

(Second Embodiment)

Figure 13:
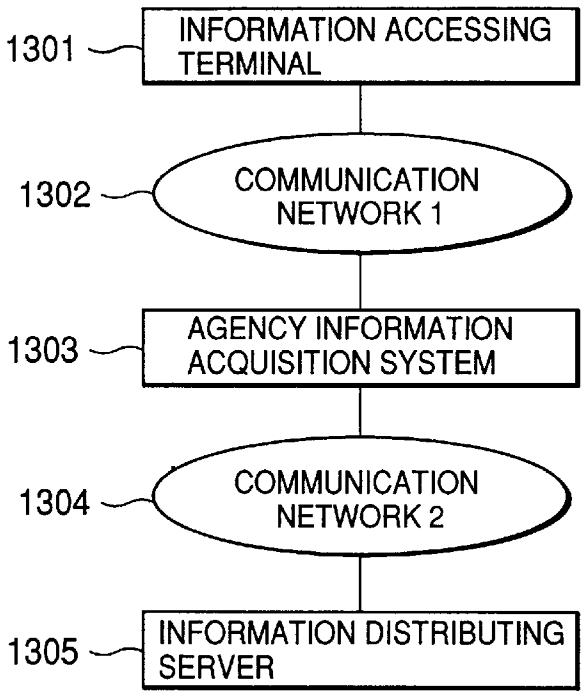
FIG. 13 is a block diagram showing the entire arrangement of an information service system according to a second embodiment of this invention.

Furthermore, a description will be taken hereinbelow of a second embodiment of the present invention with reference to the drawings. FIG. 13 shows the entire arrangement of an information system according to the second embodiment of this invention. In FIG. 13, numeral 1301 represents an information accessing trminal for accessing information to be presented on a network, numeral 1303 designates an information acquisition proxy system, numeral 1302 denotes a communication network for setting up a communication between the information accessing terminal 1301 and the information acquisition proxy system 1303 through wire or wireless connections, numeral 1305 depicts an information distributing server existing on a network, and numeral 1304 signifies a communication network for making a connection between the information acquisition proxy system 1303 and the information distributing server 1305 through wire or wireless connections.

Figure 14:
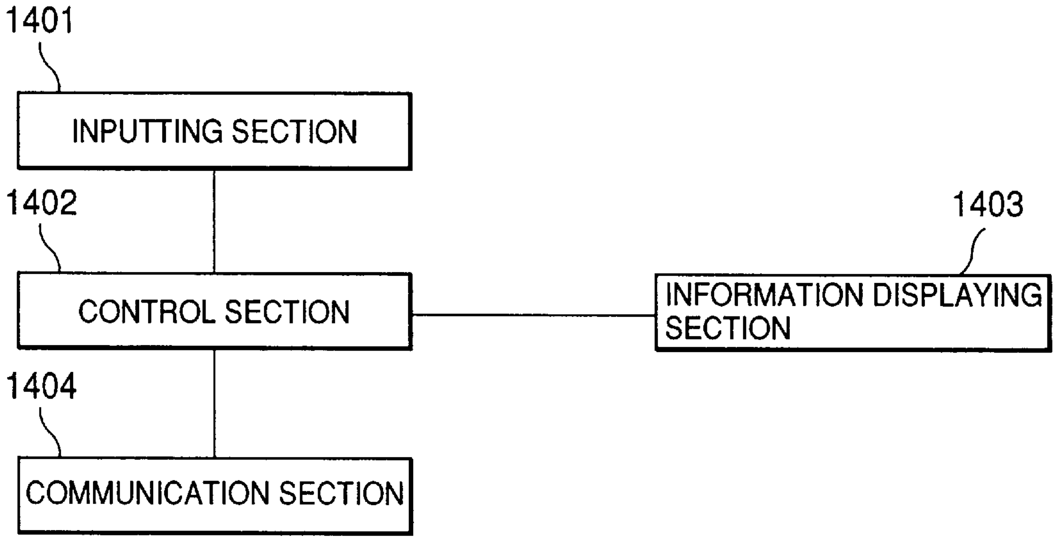
FIG. 14 is a block diagram showing an internal arrangement of an information accessing terminal in the second embodiment of this invention.

FIG. 14 is an illustration of an internal arrangement of the information accessing trminal 1301. In FIG. 14, the information accessing terminal 1301 includes an inputting section 1401 for accepting input from the user, a control section 1402 for controlling the entire terminal 1301, an information displaying section 1403 for displaying information to the user, and a communication section 1404.

Figure 15:
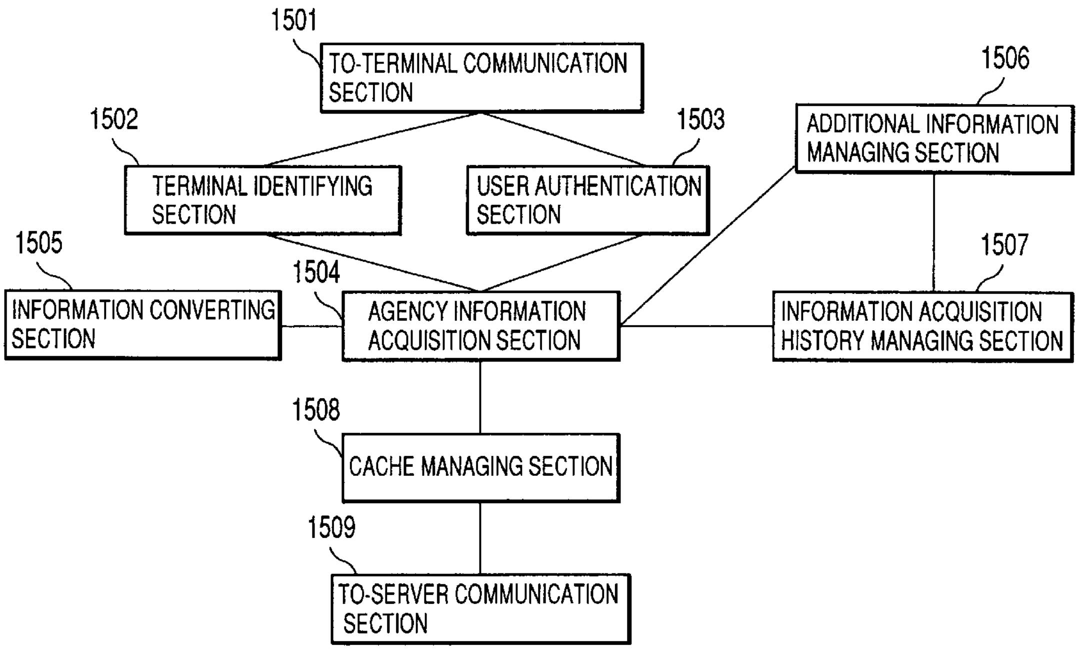
FIG. 15 is a block diagram showing an internal arrangement of an information acquisition proxy system in the second embodiment of this invention.

FIG. 15 is an illustration of an internal arrangement of the information acquisition proxy system 1303. In FIG. 15, the information acquisition proxy system 1303 is composed of a toterminal communication section 1501, a terminal identifying section 1502, a user authentication section 1503, an information acquisition proxy section 1504, an information converting section 1505, and an additional information managing section 1506, an information acquisition history managing section 1507, a cache managing section 1508, and a to-server communication section 1509.

Figure 16:
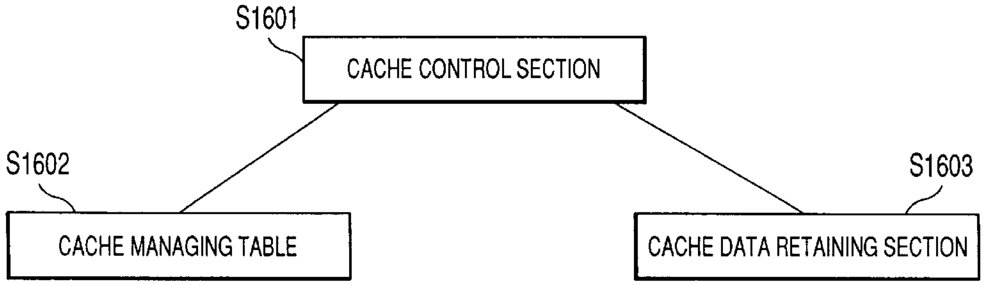
FIG. 16 is a block diagram showing an internal arrangement of a cache control section in the second embodiment of this invention.

FIG. 16 is a block diagram showing an internal arrangement of the cache managing section 1508 in this embodiment. In FIG. 16, the cache managing section 1508 includes a cache control section 1601, a cache managing table 1602, and a cache data retaining section 1603.

A description will be made hereinbelow of an operation of the information system thus arranged, that is, an operation taken for when a user 1 displays data, that a loss occurs due to the information conversion, on one terminal and refers to the same data through another browser afterwards. First, referring to FIG. 17 a description will be taken of an operation conducted for when the user 1 issues an instruction for information acquisition and displays the information after the information conversion on a terminal.

Figures 17, 18, 19:
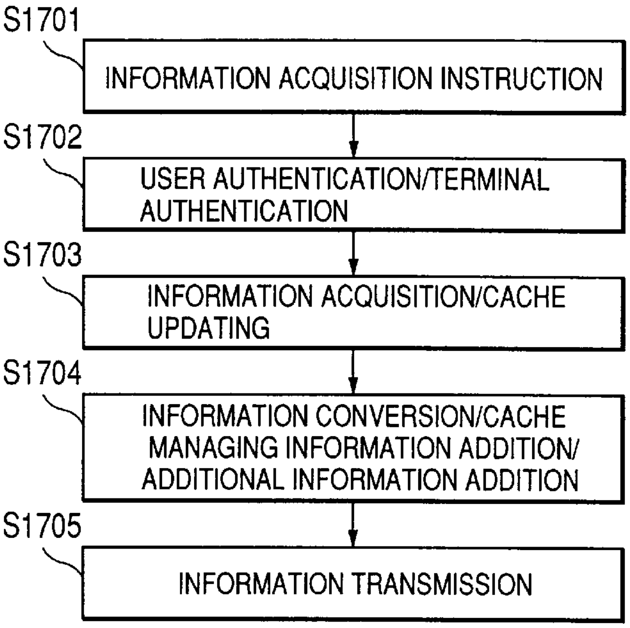
FIG. 17 is a flow chart showing the first information acquisition in the second embodiment of this invention.
FIG. 18 is an illustration of one example of terminal abilities in the second embodiment of this invention.
FIG. 19 is an illustration of one example of cache managing tables in the second embodiment of this invention.

In a step S1701, the user 1 issues an instruction for acquisition of information through the use of the inputting section 1401 of the information accessing terminal 1301, with this instruction being communicated through the communication section 1404 to the information acquisition proxy system 1303. Further, in a step S1702, the information acquisition proxy system 1303 identifies the user being the sender of the instruction through the use of the user authentication section 1503 and finds out the terminal ability of the sender through the use of the terminal identifying section 1502. FIG. 18 is an illustration of one example of terminal abilities in this embodiment. In FIG. 18, because the terminal has only an ability to display monochromatic pictures, it is found that it is necessary to once convert the information into a monochromatic picture when transmitting a color picture.

Subsequently, in a step S1703, the information acquisition proxy section 1504 receives the user information, the terminal ability information and the instruction from the user 1. The information acquisition proxy section 1504 interprets the instruction from the user 1 and gives an instruction for the information acquisition to the cache managing section 1508. Through the communication section 1509 the cache managing section 1508 gets the information from the information distributing server 1305. At this time, the information itself is stored in the cache data retaining section 1603 and an identifier corresponding to the information and the position of the retained information on the cache data retaining section 1603 are paired and retained in the cache managing table 1602. Further, the date of the final access for determining the data to be erased at the time of cache overflow is concurrently stored therein. FIG. 19 is an illustration of one example of cache managing tables in this embodiment.

Following this, in a step S1704, at the acquisition of information, the information acquisition history managing section 1507 stores an identifier of the obtained information in the history list retained at every user. Through the information converting section 1505 the information acquisition proxy section 1504 converts the information obtained from the information distributing server 1305 into data agreeing with the terminal ability on the basis of the terminal ability information shown in FIG. 18.

In this embodiment, the conversion of a color picture into a monochromatic picture is conducted on the assumption that the obtained information is a 768×512 pixel color picture. At this time, the information acquisition proxy section 1504 gives an instruction for the addition of cache control information to the cache managing section 1508 because of the occurrence of the information conversion and the loss of information quantity due to the conversion of the color picture into the monochromatic picture. Further, in this embodiment, let it be assumed that added is information indicative of not erasing the contents of the cache until the user 1 has access or three days pass.

In response to an instruction from the information acquisition proxy section 1504, the cache control section 1601 adds the information "wait for access from user 1 for 3 days" to extended information of the cache managing table 1602. Whereupon, it becomes possible to secure the read-out of a picture free from the loss of information quantity from the cache for 3 days.

FIG. 20 is an illustration of one example of cache managing tables 1602 after the addition of information in this embodiment.

In addition to the updating of the cache, the information acquisition proxy section 1504 gives an instruction to the additional information managing section 1506 to add additional information representative of that the loss of information occurs in the corresponding entry. FIG. 21 is an illustration of one example of additional information lists the additional information managing section 1506 manages in this embodiment. FIG. 21 shows the fact that the information loss occurs at the transmission of the information A to the user 1.

Thereafter, in a step S1705, the information acquisition proxy section 1504 transmits information after the conversion through the communication section 1501 to the information accessing terminal 1301. In the information accessing terminal 1301, the communication section 1401 the information coming through the communication section 1404 is displayed on the information displaying section 1403.

Moreover, referring to FIG. 22, a description will be made hereinbelow of an operation to be taken by the cache managing section 1508 when the overflow in the cache data retaining section 1603 nearly occurs after the elapse of 2 days from the time that the user 1 gets the information A.

First, in a step S2201, at the occurrence of the information acquisition and the retention of the acquired data in the cache, the cache control section 1601 refers to the cache managing table 1602 to select as information to be erased, the information created at the old final access time. FIG. 23 is an illustration of one example of the contents of the cache managing table 1602 at this time. In this case, the information corresponding to the identifier A is selected as the information to be erased.

Subsequently, in a step S2202, the cache managing section 1601 reads out the cache managing information corresponding to this information A from the cache managing table 1602. In this case, since its contents show "wait for access of user 1 for 3 days", the cache control section 1601 excludes the information A from the erasion, and then the operational flow returns to the step 2201 for the erasion of information C at the old final access time next to that of the information A.

Following this, in a step S2203, the cache control section 1601 eliminates the information from the cache data retaining section 1603 on the basis of the positional information in the entry and then deletes the entry corresponding to the information C from the cache managing table 1602. FIG. 24 is an illustration of a state of the information managing table 1602 after the deletion of the entry concerning the information C.

Figures 25, 26:
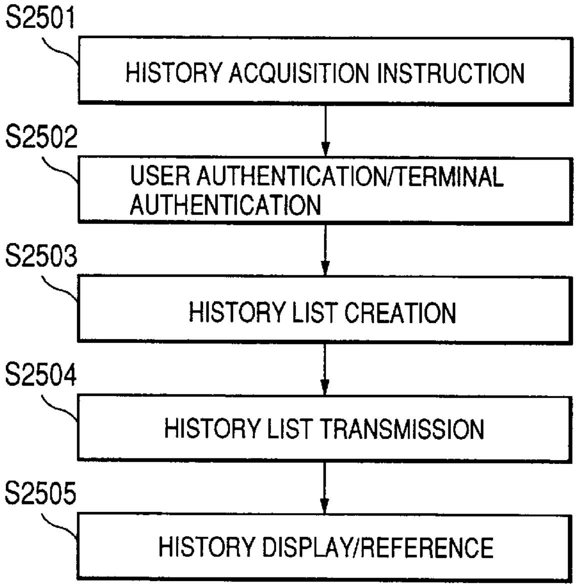
FIG. 25 is a flow chart showing history acquisition by a second terminal in the second embodiment of this invention.
FIG. 26 is an illustration of one example of display of information acquisition history by the second terminal in the second embodiment of this invention.

Furthermore, referring to FIG. 25, a description will be made hereinbelow of an operation to be taken for when the user 1 sees the information in which the information loss occurs after the conversion, through the use of a terminal having a higher ability. Assuming that the terminal having a higher ability is the same arrangement as that shown in FIG. 14, the description thereof will be taken using the same reference numerals.

First, in a step S2501, the user 1 gives an instruction through the use of the inputting section 1401 so that its own information acquisition history is referred to in the information accessing terminal 1404. This instruction is communicated through the communication section 1404 to the information acquisition proxy system 1303. Then, in a step S2502, the information acquisition proxy system 1303 identifies the user 1 being the sender of the instruction through the use of the user authentication section 1503. This user information and the instruction from the user 1, caught by the information acquisition proxy system 1303, are handed over to the information acquisition proxy section 1504.

Subsequently, in a step S2503, the information acquisition proxy section 1504 gets the information acquisition history regarding that user from the information acquisition history managing section 1507 and the additional information from the additional information managing section 1506 to create a list in a format the user can easily read. Then, in a step S2504, the information acquisition proxy section 1504 transmits the created list through the communication section 1501 to the information accessing terminal 1301.

After this, in a step S2505, the information accessing terminal 1301 receives the information acquisition history data and the additional information through the communication section 1404 and displays the list on the information displaying section 1403. FIG. 26 is an illustration of one example of information acquisition histories in this embodiment. In FIG. 26, the entry 3 "ecology of wild birds" corresponds to the aforesaid information in which the information loss occurs, and the occurrence of the information loss is indicated in the additional information column of this entry.

Figures 27, 28:
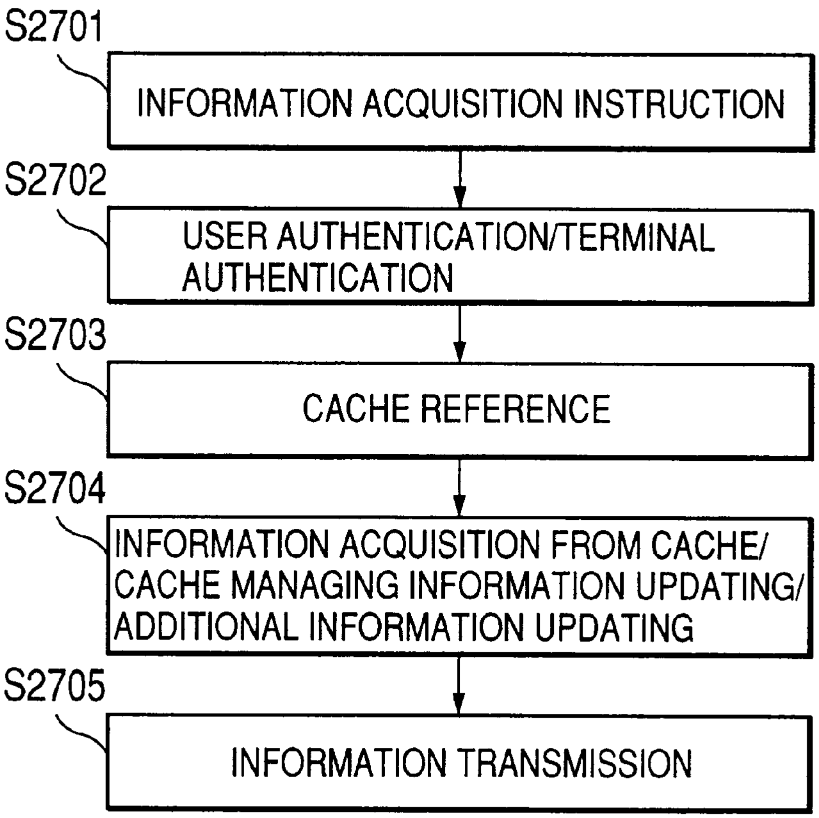
FIG. 27 is a flow chart showing information acquisition by the second terminal in the second embodiment of this invention.
FIG. 28 is an illustration of one example of the second terminal abilities in the second embodiment of this invention.

Referring to FIG. 27, a description will be made hereinbelow of an operation to be taken for when the user 1 gains the information undergoing the information loss from the information acquisition history list and displays it.

First, in a step S2701, the user 1 gives an instruction for the acquisition of the corresponding information to the inputting section 1401. This instruction is communicated through the communication section 1404 to the information acquisition proxy system 1303. Then, in a step S2702, the information acquisition proxy system 1303 identifies the user being the sender of the instruction through the use of the user authentication section 1503 and finds out the terminal ability of the sender through the use of the terminal identifying section 1502. FIG. 28 is an illustration of one example of terminal abilities in this embodiment. In FIG. 28, it is found that the terminal has an ability to display a color picture and is capable of transmitting the color picture without conversion.

Subsequently, in a step S2703, the user information, the terminal ability information and the instruction from the user 1, the information acquisition proxy system 1303 gets, are given to the information acquisition proxy section 1504. The information acquisition proxy section 1504 interprets the instruction from the user 1 to give an instruction for the acquisition of information to the cache managing section 1508. The cache control section 1601 checks the identifier for the designated information with the identifier within the cache managing table 1602 to find out the data being in a coincident relation. In the table of FIG. 24, the data at the position X are in the coincident condition, and hence the cache managing section 1508 takes out the designated information from the cache data retaining section 1603 through the use of the communication section 1509 without having access to an external network, and then hands it over to the information acquisition proxy section 1504.

Following this, in a step S2704, the cache control section 1601 deletes "wait for access of user 1 for 3 days" of the cache control information of that entry in the cache managing table 1602. The information acquisition proxy section 1504 gets the information and refers to the terminal ability in FIG. 28 to decide that there is no need for carrying out the information conversion for the acquired information, i.e., the 768×512 pixel color picture, and further transmits the information through the communication section 1501 to the information accessing terminal 1301. At this time, the information acquisition proxy section 1504 gives an instruction to the additional information managing section 1506 to erase the additional information concerning the information loss, so that the additional information managing section 1506 removes that information.

After this, in a step S2705, the information acquisition proxy section 1504 sends the information derived from the cache through the communication section 1501 to the information accessing terminal 1301. The information accessing terminal 1301 receives the information through the communication section 1404 and displays it on the information display section 1403.

As described above, in the information acquisition proxy system according to this embodiment, the information regarding the conversion conducted in the information converting section is stored in the additional information managing section, and if the information displayed in one terminal is one after the information conversion, that fact can be shown in the information acquisition history, with the result that the user can quickly know that information, thus enabling easy access.

In addition, in the information acquisition proxy system according to this embodiment, the information regarding the conversion conducted in the information converting section is stored in the cache managing section, and hence, the possibility of the removal of the cache data lowers when the user tries to see the information before the conversion, thus enabling the quick access to the information.

(Third Embodiment)

Figure 29:
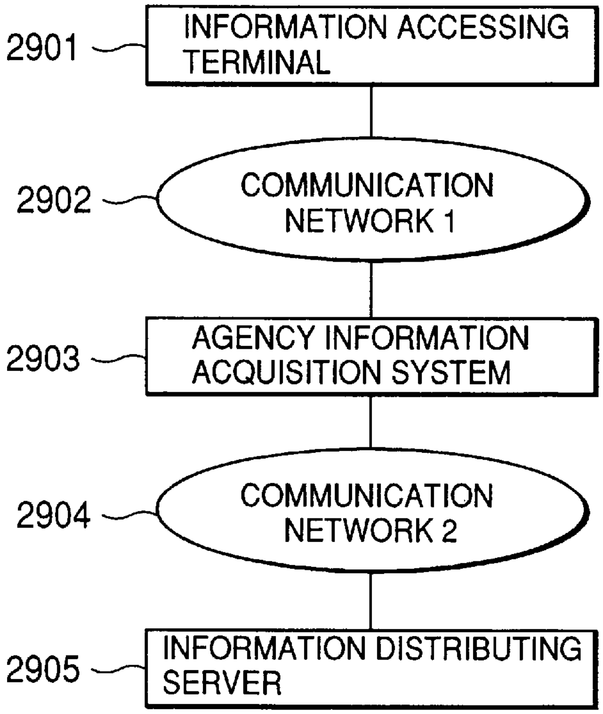
FIG. 29 is a block diagram showing the entire arrangement of an information service system according to a third embodiment of this invention.

FIG. 29 shows the entire arrangement of an information system according to a third embodiment of the present invention. In FIG. 29, numeral 2901 depicts an information accessing terminal for accessing information presented on a network, numeral 2903 signifies an information acquisition proxy system, numeral 2902 shows a communication network for establishing a communication between the information accessing terminal 2901 and the information acquisition proxy system 2903 through wire or wireless connections, numeral 2905 denotes an information distributing server existing on a network, and numeral 2904 designates a communication network for setting up a communication between the information acquisition proxy system 2903 and the information distributing server 2905 through wire or wireless connections.

Figure 30:
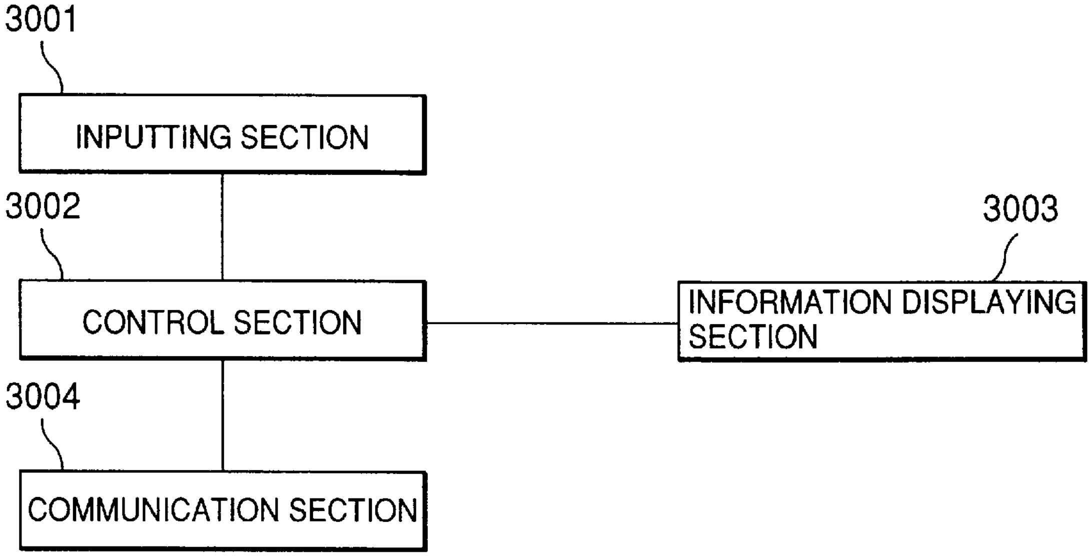
FIG. 30 is a block diagram showing an internal arrangement of an information accessing terminal in the third embodiment of this invention.

FIG. 30 is a block diagram showing an internal arrangement of the information accessing terminal 2901. In FIG. 30, the information accessing terminal 2901 comprises an inputting section 3001 for accepting input from the user, a control section 3002 for controlling the whole terminal 2901, an information displaying section 3003 for displaying information to the user, and a communication section 3004.

Figure 31:
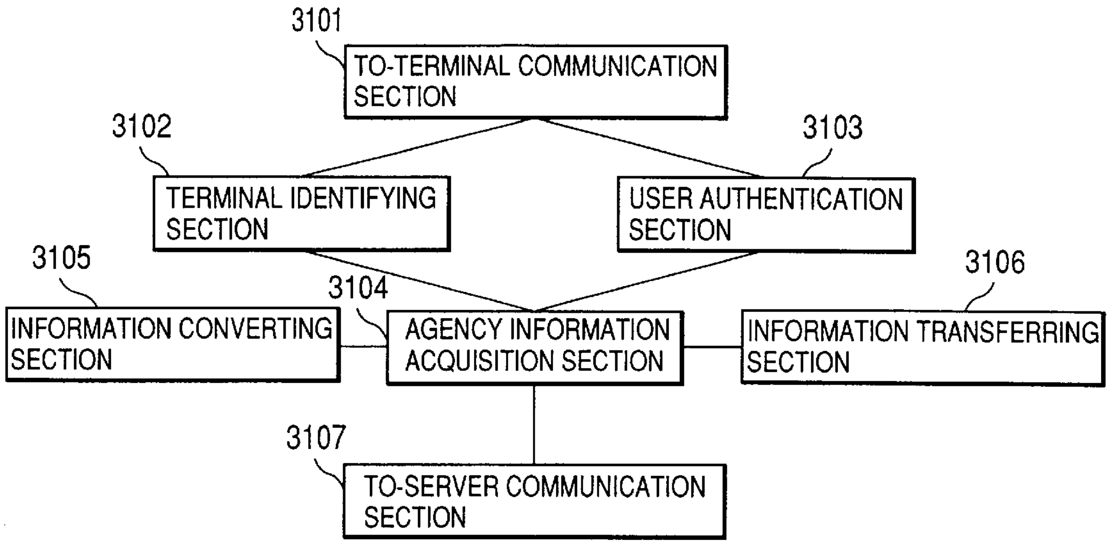
FIG. 31 is a block diagram showing an internal arrangement of an information acquisition proxy system in the third embodiment of this invention.

FIG. 31 is a block diagram showing an arrangement of the information acquisition proxy system 2903. In FIG. 31, the information acquisition proxy system 2903 includes a to-terminal communication section 3101, a user authentication section 3103, a terminal identifying section 3102, an information acquisition proxy section 3104, an information converting section 3105, an information transferring section 3106, and a to-server communication section 3107.

A description will be made hereinbelow of an operation of the information system thus arranged, that is, an operation to be taken for when the user 1 displays, in one terminal, data in which loss occurs due to information conversion and outputs that information to equipment different from the information accessing terminal.

Figure 32:
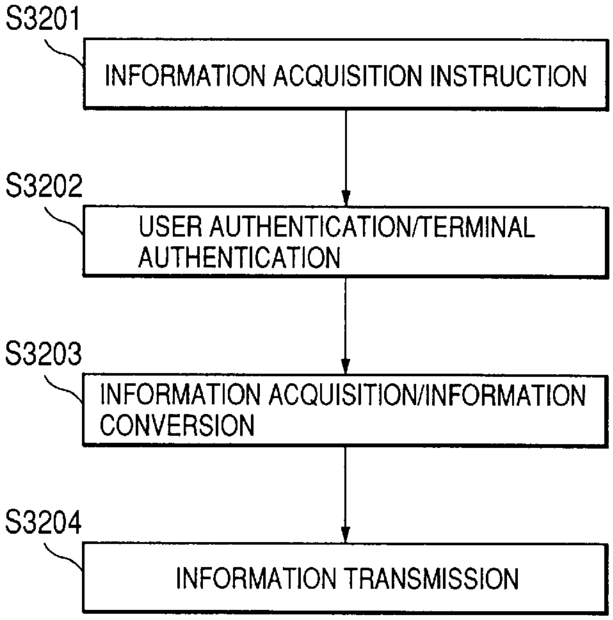
FIG. 32 is a flow chart showing the first information acquisition in the third embodiment of this invention.

First of all, referring to FIG. 32 a description will be made hereinbelow of an operation to be taken until the user 1 issues an instruction for information acquisition and displays the information after the information conversion in the terminal.

In a step S3201, the user 1 issues an instruction for acquisition of information through the inputting section 3001 of the information accessing terminal 2901, with the instruction being communicated through the communication section 3004 to the information acquisition proxy system 2903. Then, in a step S3202, the information acquisition proxy system 2903 identifies the user being the sender of the instruction through the use of the user authentication section 3103 and finds the terminal ability through the use of the terminal identifying section 3102. FIG. 33 is an illustration of one example of terminal abilities in this embodiment. In FIG. 33, since the terminal has only an ability to display a picture up to 160 pixels in horizontal directions and 80 pixels in vertical directions, for the transmission of a picture having a larger size, it is necessary to once reduce the picture.

Subsequently, in a step S3203, the user information, the terminal ability information and the instruction from the user 1, the information acquisition proxy system 2903 gets, are sent to the information acquisition proxy section 3104. The information acquisition proxy section 3104 interprets the instruction from the user 1 and gets the information through the communication section 3107. Through the use of the information converting section 3105 the information acquisition proxy section 3104 converts the information obtained from the information distributing server 2905 into data agreeing with the ability of the terminal in accordance with the terminal ability information shown in FIG. 33.

In this embodiment, assuming that the acquired information is 640×480 pixel monochromatic picture, the picture is subjected to the reduction conversion.

Following this, the information after the conversion is transmitted through the communication section 3101 to the information accessing terminal 2901. In the information accessing terminal 2901, the communication section 3004 receives the information and the information displaying section 3003 displays it.

Furthermore, referring to FIG. 34, a description will be made hereinbelow of an operation to be taken for when the user 1 outputs the display picture to an outputting device, for example a printer, which can output it without loss.

First, in a step S3401, the user 1 issues an instruction through the use of the inputting section 3001 to output the displayed information to a printer different from the information accessing terminal. In this case, the corresponding identifier and an identifier for the printer receiving the output are communicated through the communication section 3004 to the information acquisition proxy system 2903. Then, in a step S3402, the information acquisition proxy system 2903 identifies the user 1 being sender of the instruction through the use of the user authentication section 3103, with the instruction from the user 1 and the user information being given to the information acquisition proxy section 3104.

Subsequently, in a step S3403, the information acquisition section 3104 gets the output instructed information through the communication section 3107. Further, the information acquisition section 3104 communicates the obtained information, the information on the destination of the output and the user information to the information transferring section 3106. The information transferring section 3106 checks, using the user information it receives, whether or not it holds an output authority to that destination. If holding the output authority, that information is outputted to the equipment being the destination.

As described above, in the information system according to this embodiment, even if the user terminal receives the information involving the loss due to the information conversion, through the use of another terminal, it is possible to output the information involving no loss to the outputting equipment.

(Fourth Embodiment)

FIG. 35 is an illustration of the entire arrangement of an information service system according to a fourth embodiment of the present invention. In FIG. 35, numeral 3501 signifies an information accessing terminal A, numeral 3502 shows an information accessing terminal B, numeral 3504 depicts an information transfer managing system, numeral 3505 stands for an information distributing server, and numeral 3506 designates a communication network for establishing a communication between the information accessing terminals 3501, 3502 and the information transfer managing system through wire or wireless connections. The information transfer managing system 3504 can also be connected through a communication network to the information distributing server 3505 or is also realizable as a part of the information distributing server 3505.

Figure 36:
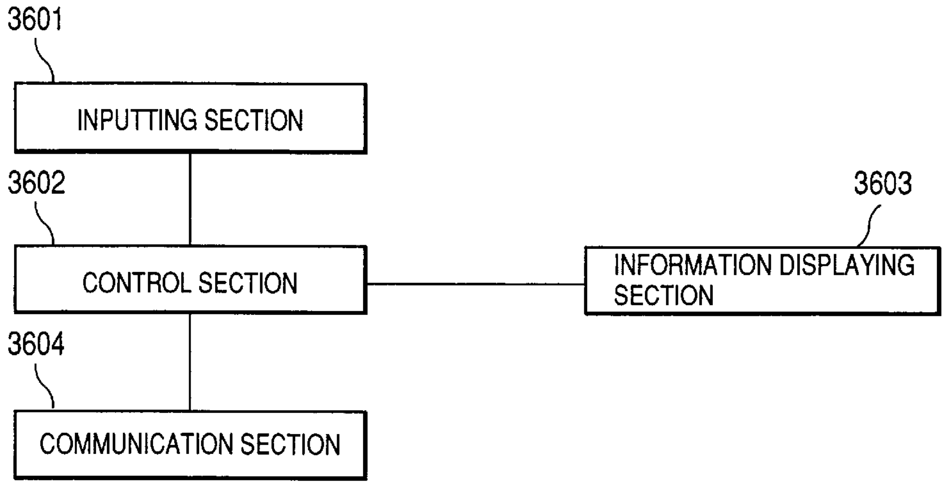
FIG. 36 is a block diagram showing an internal arrangement of an information accessing terminal in the fourth embodiment of this invention.

FIG. 36 is a block diagram showing an internal arrangement of the information accessing terminal A 3501 and the information accessing terminal B 3502. In FIG. 36, the terminal arrangement is composed of an inputting section 3601 for accepting input from the user, a control section 3602 for controlling the whole terminal, an information displaying section 3603 for presenting the display of information to the user, and a communication section 3604 for carrying out the input and output of data through the communication network 3503.

Figure 37:
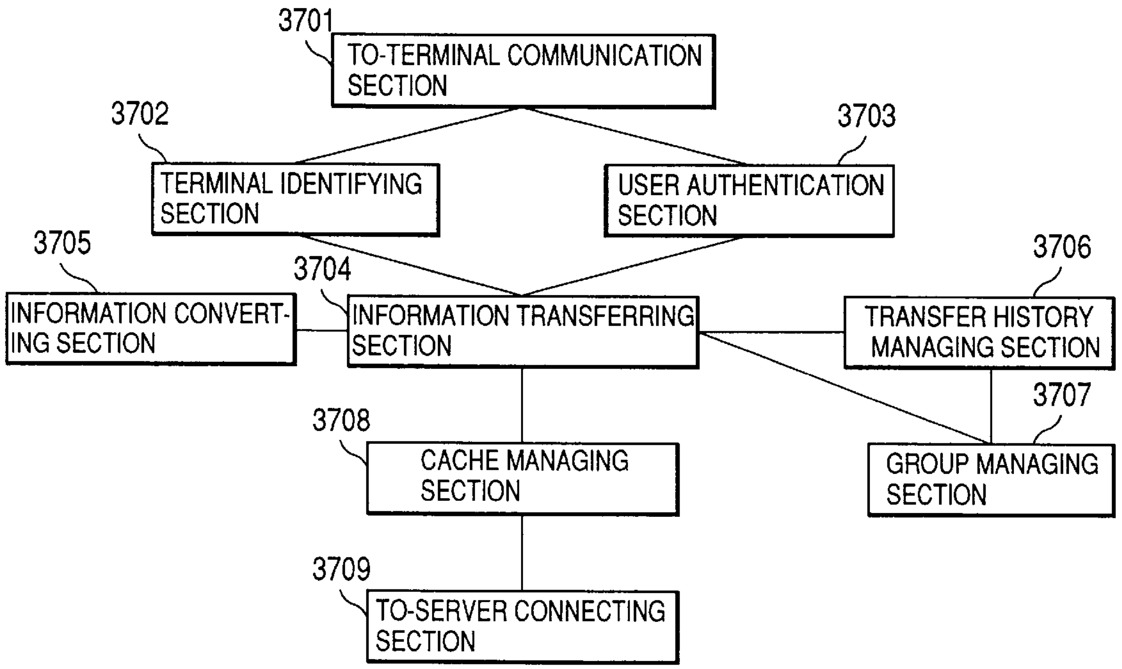
FIG. 37 is a block diagram showing an internal arrangement of an information transfer managing unit in the fourth embodiment of this invention.

FIG. 37 is a block diagram showing an arrangement of the information transfer managing system 3504. In FIG. 37, the information transfer managing system 3504 comprises a to-terminal communication section 3701 for taking the charge of the input and output of data from and to the information accessing terminals 3501, 3502 through the communication network 3503, a terminal identifying section 3702 for identifying the ability of information accessing terminals, a user authentication section 3703 for identifying the user, an information transferring section 3704 for carrying out data transfer between the information distributing server 3505 and the information accessing terminals 3501, 3502, an information converting section 3705 for converting the contents of information in accordance with the terminal ability, a transfer history managing section 3706 for retaining and managing a demand for reference and input of information from an information accessing terminal and information corresponding to the additional information the additional information managing section 304 manages in the first embodiment, a group managing section 3707 for managing group information concerning a plurality of users, a cache managing section 3708 for storing information once obtained, and a to-server connecting section 3709 for conducting the input and output of data from and to the information distributing server 3505.

A description will be made hereinbelow of an operation of the information system thus arranged, that is, an operation to be taken for when, in the case that there is information to which the user 1 already refers through one information accessing terminal A, reference to its situation is made through the different information accessing terminal B to avoid the repetition of reference to the information.

Figures 38, 39:
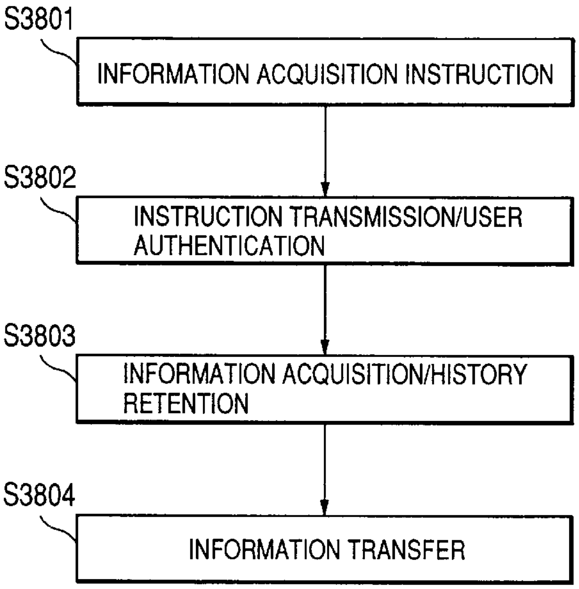
FIG. 38 is a flow chart showing the first information acquisition in the fourth embodiment of this invention.
FIG. 39 is an illustration of one example of transfer history information in the fourth embodiment of this invention.

First of all, referring to FIG. 38, a description will be made hereinbelow of an operation to be taken until the user 1 issues an instruction for the acquisition of information w through the use of the information accessing terminal A and the information accessing terminal A displays the information w.

In a step S3801, the user 1 issues an instruction for the acquisition of the information w through the use of the inputting section 3601 of the information accessing terminal A 3501, with the instruction being communicated through the communication section 3604 to the information transfer managing system 3504. In a step S3802, the information transfer managing system 3504 identifies the user being the sender of the instruction through the use of the user authentication section 3703.

Subsequently, in a step S3803, this user information and the instruction from the user 1, the information transfer managing system 3504 gets, are sent to the information transferring section 3704. The information transferring section 3704 interprets the instruction from the user 1 and gets the information w through the connecting section 3709. Further, the transfer history managing section 3706 adds the acquisition of the information w to the transfer history information. FIG. 39 is an illustration of transfer history information at this time. In this embodiment, as the information elements of the transfer history information there are taken the identifier for the information presented, the latest reference date and time, and the occurrence or no occurrence of the loss of information quantity.

After this, in a step S3804, the information transferring section 3704 transmits the information w obtained from the information distributing server 3505 through the communication section 3701 to the information accessing terminal A 3501. In the information accessing terminal A 3501, the communication section 3604 receives the information w and the information displaying section 3603 displays it.

Secondly, referring to FIG. 40, a description will be made hereinbelow of an operation to be taken until the user 1 starts a work using the information accessing terminal B after the completion of the above-mentioned work and stops the reference to the information w.

In a step S4001, the user 1 issues an instruction through the use of the inputting section 3601 of the information accessing terminal B 3502 to display the information acquisition history, with this instruction being communicated through the communication section 3604 to the information transfer managing system 3504. Then, in a step S4002, the communication section 3701 receives the instruction from the user 1 while the user authentication section 3702 identifies the user 1 being the sender of the instruction, with this instruction being delivered to the information transferring section 3704.

Subsequently, in a step S4003, the information transferring section 3704 reads out the history information about the user 1 from the transfer history managing section 3706 and changes it into a format the user 1 can easily read. Further, in a step S4004, the information acquisition history about the user 1 created by the information transferring section 3704 is transmitted through the communication section 3701 to the information accessing terminal B 3502. In the information accessing terminal B 3502, the communication section 3604 receives the information acquisition history about the user 1 while the information displaying section 3603 displays it.

Figures 40, 41:
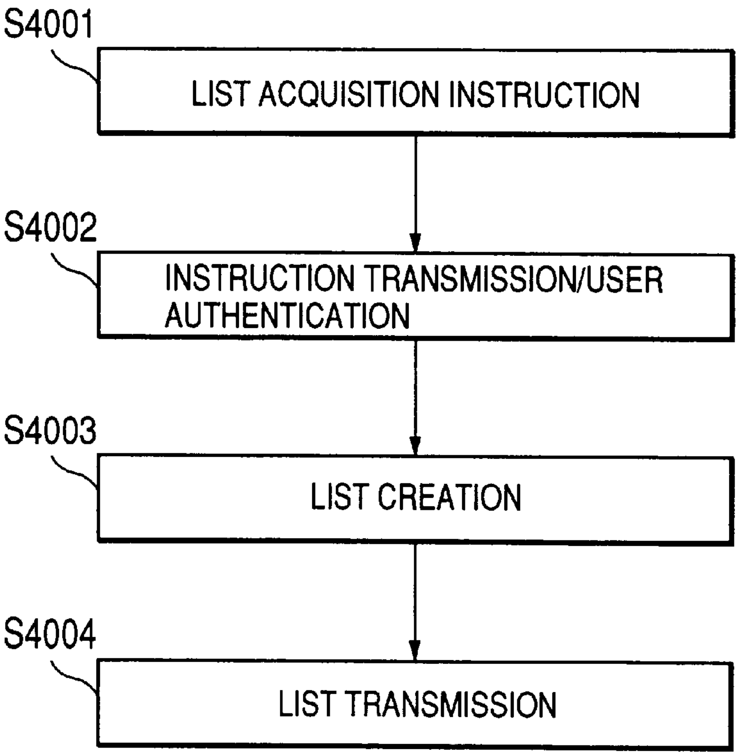
FIG. 40 is a flow chart showing listed information acquisition in the fourth embodiment of this invention.
FIG. 41 is an illustration of one example of display of information acquisition history in a second terminal in the fourth embodiment of this invention.

FIG. 41 is an illustration of one example of displayed pictures of the information acquisition histories in this embodiment. By looking at the displayed picture shown in FIG. 41, the user 1 can confirm the fact that the information w is already referred to, thus stopping the repetition of the reference thereto.

As described above, in the information system according to this embodiment, even if the user previously refers to the specific information and, afterwards, has access thereto, it is possible to prevent the work loss by referring to its access situation.

Moreover, referring to FIG. 42, a description will be made hereinbelow of an operation to be taken for when the user 2 belonging to the same business group as that of the user 1 refers to the situation through the information accessing terminal B so that the repetition of the reference in the same group is avoidable.

In a step S 4201, the user 2 issues an instruction for the display of the information acquisition history in the group through the inputting section 3601 of the information accessing terminal B 3502, with this instruction being communicated through the terminal history managing section 3605 and the communication section 3604 to the information transfer managing system 3504. Then, in a step S4202, the communication section 3701 receives the instruction from the user 2 while the user authentication section 3702 identifies the user 2 being the sender of the instruction, with this instruction and the user information being sent to the information transferring section 3704.

Subsequently, in a step S4203, the information transferring section 3704 obtains the information about the group to which the user 2 issuing the instruction belongs, from the group managing section 3707. FIG. 43 is an illustration of one example of group information in this embodiment. The information transferring section 3704 obtains from the transfer history managing section 3706 the information acquisition history about the users belonging to the same group as that of the instruction issuing user 2. The information transferring section 3704 changes the acquired information into a format the user can easily read and makes out a list thereof.

Following this, in a step S4204, the information transferring section 3704 transmits that list through the communication section 3701 to the information accessing terminal B 3502. In the information accessing terminal B 3502, the communication section 3604 receives the list while the information displaying section 3603 displays it.

Figures 42, 43, 44:
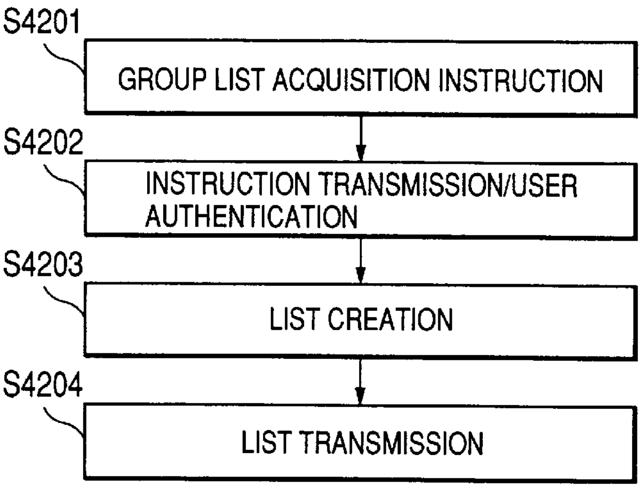
FIG. 42 is a flow chart showing an information acquisition instruction based on a group list in the fourth embodiment of this invention.
FIG. 43 is an illustration of one example of group information in the fourth embodiment of this invention.
FIG. 44 is an illustration of lists of information acquisition histories including group information in the fourth embodiment of this invention.

FIG. 44 is an illustration of one example of displayed pictures of the information acquisition histories in this embodiment. By looking at the displayed picture shown in FIG. 44, the user 2 can confirm the fact that the user 1 already refers to the information w, thus stopping the repetition of the reference thereto in the same group.

As described above, in the information system according to this embodiment, a plurality of users belonging to the same business group communize the access situation, thereby preventing the occurrence of work loss in cooperative works.

Furthermore, a description will be made hereinbelow of an operation taken in order to, in the case that there is information undergoing the loss of information quantity due to the information conversion when the user 1 makes reference through the use of one information accessing terminal A, prevent the omission of reference to the complete information in a manner of referring to its situation in a different information accessing terminal B. First, referring to FIG. 45, a description will be made hereinbelow of an operation to be taken until the user 1 gives an instruction for acquisition of the information y through the use of the information accessing terminal A and displays the information after the information conversion in the information accessing terminal A.

Figures 45, 46, 47:
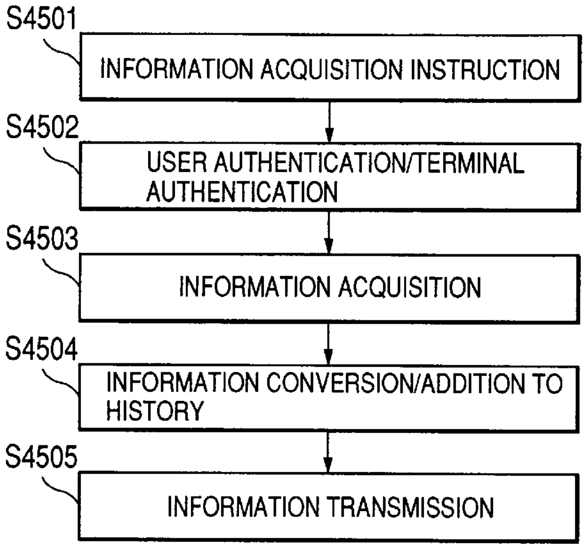
FIG. 45 is a flow chart showing information acquisition including information conversion in the fourth embodiment of this invention.
FIG. 46 is an illustration of one example of terminal abilities in the fourth embodiment of this invention.
FIG. 47 is an illustration of one example of transfer history information in the fourth embodiment of this invention.

In a step S4501, the user 1 issues an instruction for the information acquisition through the use of the inputting section 3601 of the information accessing terminal A 3501, with the instruction being communicated through the communication section 3604 to the information transfer managing system 3504. Then, in a step S4504, the information transfer managing system 3504 identifies the user being the sender of the instruction through the use of the user authentication section 3703 and further finds the terminal ability of the sender through the use of the terminal identifying section 3702. FIG. 46 is an illustration of one example of terminal abilities in this embodiment. In FIG. 46, the terminal has only an ability to display a monochromatic picture, for the transmission of a color picture, it is necessary to once make the conversion into a monochromatic picture.

Subsequently, in a step S4503, the information transferring section 3704 receives the user information, the terminal ability information and the instruction from the user 1. The information transferring section 3704 interprets the instruction from the user 1 and obtains the information y through the connecting section 3709. Further, in a step S4504, through the use of the information converting section 3705 the information transferring section 3704 makes a data conversion of the information y agreeing with the terminal ability in accordance with the terminal ability information shown in FIG. 46. Moreover, the transfer history managing section 3706 adds information indicative of the fact that the loss of information quantity occurs when the user 1 gets the information y, to the transfer history information. FIG. 47 shows the transfer history information at this time.

Following this, in a step S4504, the information transferring section 3704 transmits the converted information y through the communication section 3701 to the information accessing terminal A 3501. In the information accessing terminal A 3501, the communication section 3604 receives the information y after the conversion while the information displaying section 2603 displays it.

Figures 48, 49:
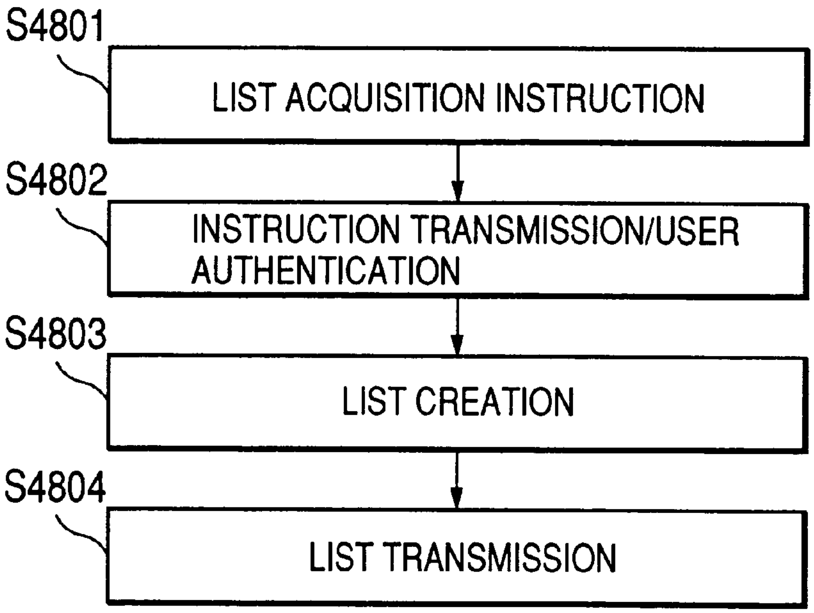
FIG. 48 is a flow chart showing listed information acquisition by the second terminal in the fourth embodiment of this invention.
FIG. 49 is an illustration of one example of display of information acquisition history in the second terminal in the fourth embodiment of this invention.

Still further, referring to FIG. 48, a description will be made hereinbelow of an operation to be taken until the user 1 starts a work using the information accessing terminal B after the termination of the aforesaid work and again refers to the information y.

First, in a step S4801, the user 1 gives an instruction for the display of the information acquisition history through the use of the inputting section 3601 of the information accessing terminal B 3502, with this instruction being communicated through the terminal history managing section 3605 and the communication section 3604 to the information transfer managing system 3504. Then, in a step S4802, the communication section 3701 receives the instruction from the user 1 while the user authentication section 3702 identifies the user 1 being the sender of the instruction, with this instruction and the user information being sent to the information transferring section 3704.

Subsequently, in a step S4803, the information transferring section 3704 reads out the history information about the user 1 from the transfer history managing section 3706 and forms it into a format the user can easily read. Further, in a step S4804, the information acquisition history of the user 1 created by the information transferring section 3704 is transmitted through the communication 3701 to the information accessing terminal B 3502. In the information accessing terminal B 3502, the communication section 3604 receives the information acquisition history of the user 1 while the information displaying section 3603 displays it. FIG. 49 is an illustration of one example of displayed pictures of the information acquisition histories in this embodiment. Looking at the displayed picture shown in FIG. 49, the user 1 can confirm the fact that the loss of information quantity occurs at the reference to the information y, and gives an instruction for the acquisition of the information y.

As described above, in the information system according to this embodiment, even if there is information previously subjected to the information conversion at the reference and the information is accessed from a different terminal, it is possible to prevent the omission of reference to the complete information by referring to its access situation.

Incidentally, in the case that the information transfer managing system 3504 is made to be connected through a network to the information distributing server 3505, it is possible to shorten the communication time and further to lower the cost in a manner that the corporation with the cache managing function is made as in the case of the second embodiment of this invention. Further, although in the above description the display demand for the information acquisition history is done by the input from the user, the setting of the display demand is free, for example, it is also appropriate that the display is made at the beginning of use of the terminal or at the occurrence of change of the history.

(Fifth Embodiment)

Figure 50:
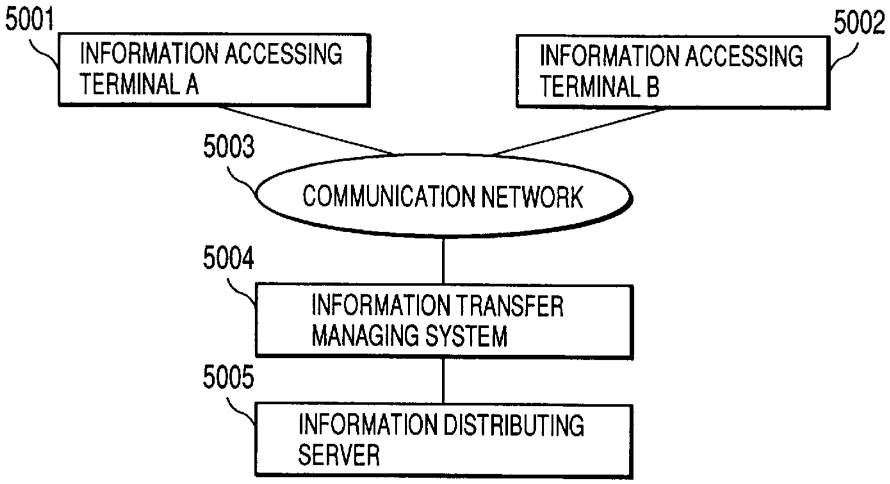
FIG. 50 is a block diagram showing the whole arrangement of an information service system according to a fifth embodiment of this invention.

FIG. 50 is an illustration of the entire arrangement of an information service system according to a fifth embodiment of the present invention. In FIG. 50, numeral 5001 represents an information accessing terminal A, numeral 5002 designates an information accessing terminal B, numeral 5004 denotes an information transfer managing system, numeral 5005 depicts an information distributing server, and numeral 5003 signifies a communication network for establishing a communication between the information accessing terminals 5001, 5002 and the information transfer managing system 5004 through wire or wireless connections. It is also appropriate that the information transfer managing system 5004 is connected through a communication network to the information distributing server 5005 or realized as a part of the information distributing server 5005.

Figure 51:
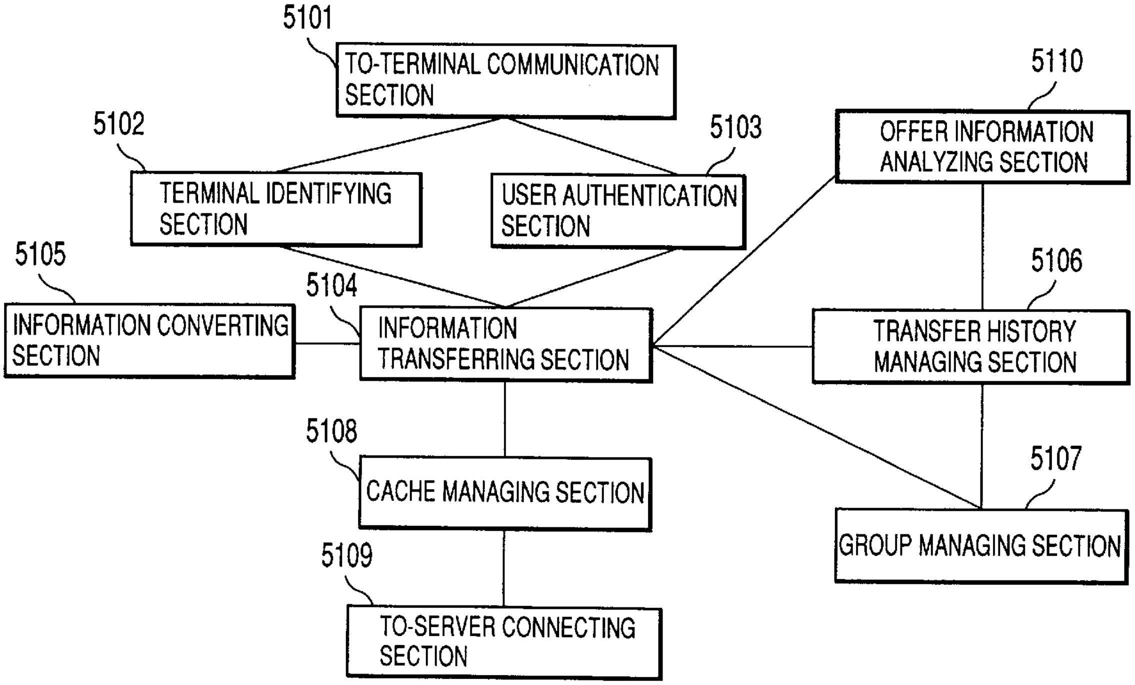
FIG. 51 is a block diagram showing an internal arrangement of an information transfer managing unit in the fifth embodiment of this invention.

FIG. 51 is a block diagram showing an arrangement of the information transfer managing system 5004. In FIG. 51, the information transfer managing system 5004 comprises a to-terminal communication section 5101 for carrying out the input and output of data from and to the information accessing terminals 5001, 5002, a terminal identifying section 5102 for finding the ability of the information accessing terminals 5001, 5002, a user authentication section 5103 for identifying the user, an information transferring section 5104 for performing the data transfer between the information distributing server 5005 and the information accessing terminals 5001, 5002, an information converting section 5105 for making a conversion of the contents of information in accordance with the terminal ability, a transfer history managing section 5106 for retaining and managing a demand for reference and input of information from an information accessing terminal and information corresponding to the additional information the additional information managing section 304 manages in the first embodiment, a group managing section 5107 for managing group information about a plurality of users, a cache managing section 5108 for retaining information once acquired, a to-server connecting section 5109 for performing the input and output of data from and to the information distributing server 5005, and a referred information analyzing section 5110 for analyzing the contents of information to be presented to the information accessing terminals A5001, B5002 and further for comparing the analysis result with the terminal ability.

Figure 52:
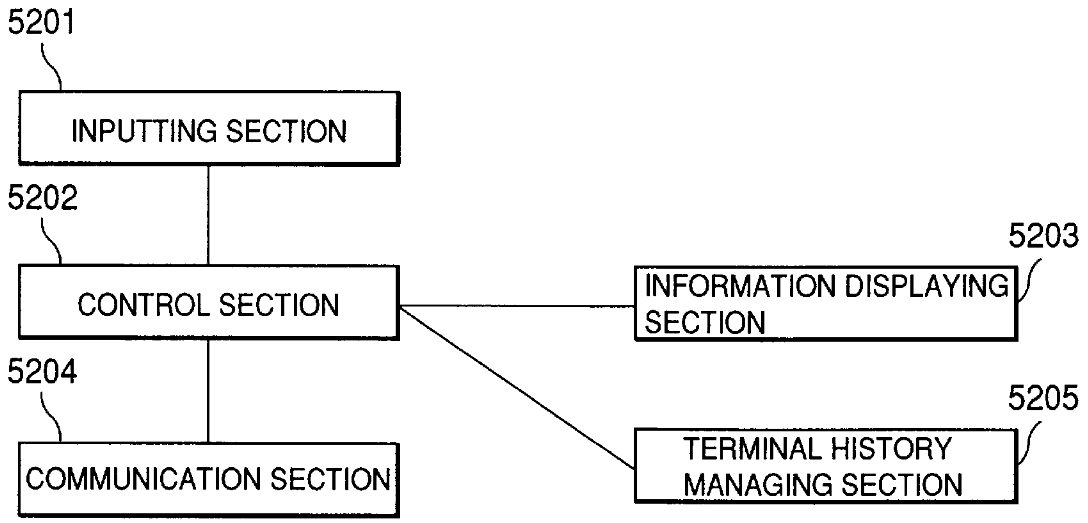
FIG. 52 is a block diagram showing an internal arrangement of an information accessing terminal in the fifth embodiment of this invention.

FIG. 52 is a block diagram showing an internal arrangement of each of the information accessing terminals A 5001, B 5002. In FIG. 52, the arrangement is composed of an inputting section 5201 for accepting the input from the user, a control section 5202 for controlling the whole terminal, an information displaying section 5203 for presenting information to the user, a communication section 5204 for conducting the input and output of data through the communication network 5003, and a terminal history managing section 5205 for managing the terminal's work history.

A description will be made hereinbelow of an operation of the information system thus arranged, that is, an operation to be taken for when, in the case that there is information whose portion is incompletely referred to by the user 1 through the information accessing terminal A, its situation is referred to from the different information accessing terminal B to prevent the omission of reference to the complete information.

Figure 53:
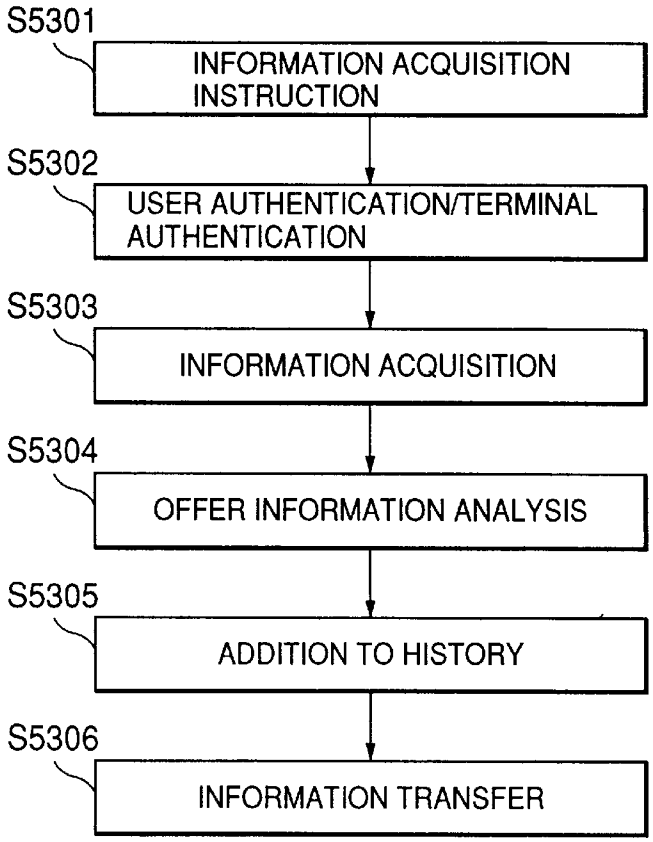
FIG. 53 is a flow chart showing the first information acquisition in the fifth embodiment of this invention.

First, referring to FIG. 53, a description will be made hereinbelow of an operation to be taken until the user 1 gives an instruction for the acquisition of information w being the so-called homepage information and information x being general information through the use of the information accessing terminal A and displays the respective contents in the information accessing terminal A.

At the acquisition of the information w, in a step S5301, the user 1 issues an instruction for the acquisition of the information w through the use of the inputting section 5201 of the information accessing terminal A 5001, with the instruction being communicated through the communication section 5204 to the information transfer managing system 5004. Then, in a step S5202, the information transfer managing system 5004 identifies the user being the sender of the instruction through the use of the user authentication section 5003 and finds the terminal ability of the sender through the use of the terminal identifying section 5002.

Figures 54, 55:
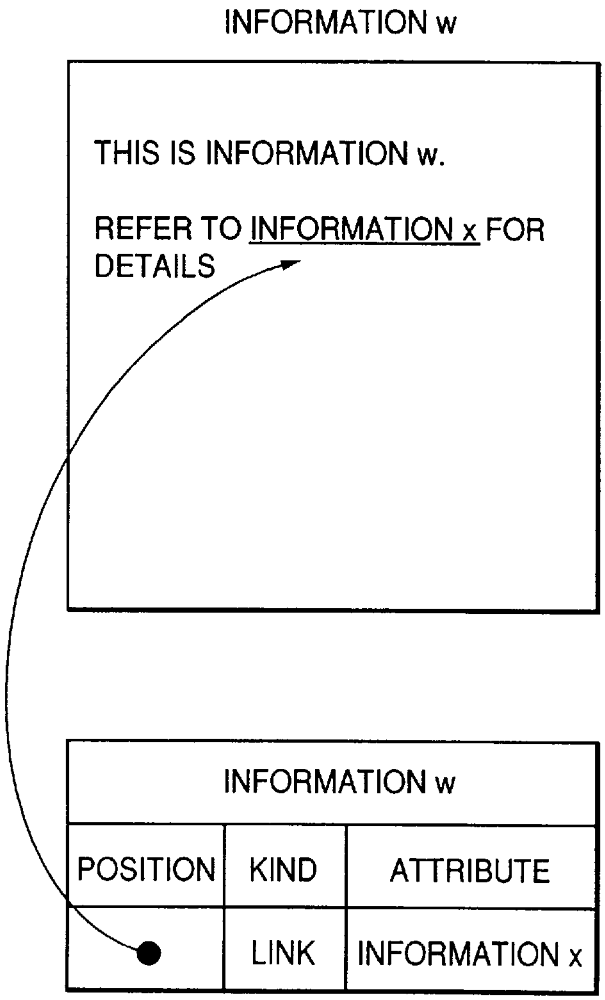
FIG. 54 is an illustration of one example of terminal abilities in the fifth embodiment of this invention.
FIG. 55 is an illustration of examples of referred information and analysis results in the fifth embodiment of this invention.

FIG. 54 is an illustration of one example of terminal abilities in this embodiment. In this embodiment, as the information elements of the terminal ability, there are taken only two items: color picture display and table display. In FIG. 54, the terminal A does not hold an ability to display a table.

Subsequently, in a step S5303, the information transferring section 5104 receives the user information, the terminal ability information and the instruction from the user 1. The information transferring section 5104 interprets the instruction from the user 1 and gets the information w through the connecting section 5109. Further, in a step S5304, the referred information analyzing section 5110 analyzes the information w and separates it in accordance with its contents. FIG. 55 is an illustration of one example of the referred information and the corresponding analysis results. In this embodiment, as the information elements of the analysis result, there are taken positions, kinds and attributes in the information. Assuming that the information w is composed of a text including a link to the information x, the analysis is made as shown in FIG. 55.

Following this, in a step S5305, the transfer history managing section 5106 compares the terminal ability information with the referred information analysis result and then adds to the transfer history information the fact that the user 1 has acquired the information w. FIG. 56 is an illustration of the transfer history information at this time. In this embodiment, as the information elements of the transfer history information there are taken the identifier for the referred information, the position, the kind, the attribute of the information taken at every contents, the display or non-display in the terminal at the reference, the date and time of latest reference, and the occurrence or no occurrence of loss of the information quantity. Since all the contents of the information w can be displayed in the terminal A, the flag indicative of non-display does not rise.

After this, in a step S5306, the information transferring section 5104 transmits the information w, obtained from the information distributing server 5005, through the communication section 5101 to the information accessing terminal A 5001. In the information accessing terminal A 5001, the communication section 5204 receives the information w while the information displaying section 5203 displays it. Subsequently, in a similar way, for the acquisition of the information x the operational flow proceeds to S5301, S5302 and S5303.

Figure 57:
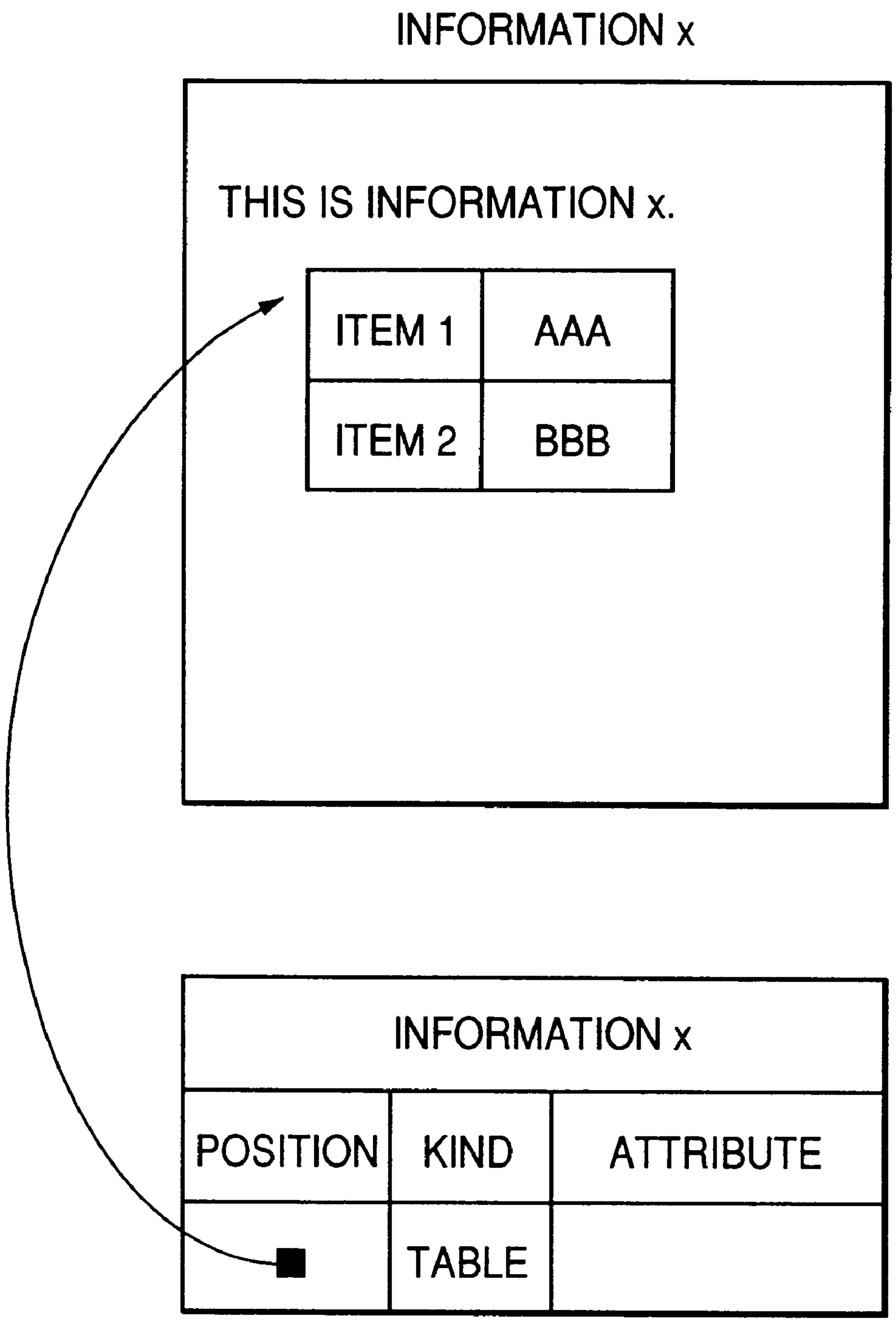
FIG. 57 is an illustration of examples of referred information and analysis results in the fifth embodiment of this invention.

Then, in a step S5304, the referred information analysis section 5110 analyzes the information x and separates it in accordance with its contents. Assuming that the information x is composed of a text including a table, it is analyzed as shown in FIG. 57. Further, in a step S5305, the transfer history managing section 5106 compares the terminal ability information with the referred information analysis result and then adds to the transfer history information that the user 1 has acquired the information x. FIG. 58 is an illustration of the transfer history information at this time. Since the table portion of the information x can not be displayed in the terminal A, a flag representative of non-display of this portion rises. Moreover, in a step S5306, similarly, the information x is transmitted through the communication section 5101 to the information accessing terminal A 5001. In the information accessing terminal A 5001, the information x fed through the communication section 5204 is displayed on the information displaying section 5203. However, in this case, the table portion can not be displayed.

Figures 59, 60:
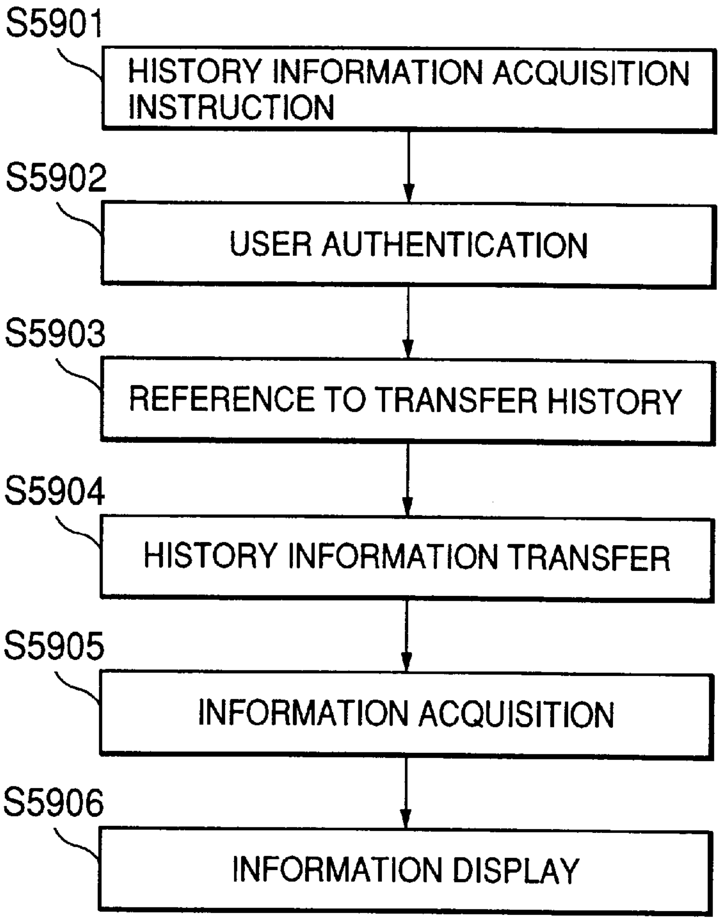
FIG. 59 is a flow chart showing history information acquisition by a second terminal in the fifth embodiment of this invention.
FIG. 60 is an illustration of one example of display of information acquisition history in the second terminal in the fifth embodiment of this invention.

Furthermore, referring to FIG. 59, a description will be made hereinbelow of an operation to be taken until the user 1 starts a work through the information accessing terminal B after the completion of the foregoing work and again refers to the information x.

First, in a step S5901, the user 1 issues an instruction for the acquisition of the information acquisition history through the use of the inputting section 5201 of the information accessing terminal B 5002, with this instruction being fed through the communication section 5204 to the information transfer managing system 5004. Then, in a step S5902, the communication section 5101 receives the instruction from the user 1 while the user authentication section 5102 identifies the user being the sender of the instruction, with this instruction and the user information being given to the information transferring section 5104.

Subsequently, in a step S5903, the information transferring section 5104 reads out the transfer history information about the user 1 shown in FIG. 58 from the transfer history managing section 5106 and creates the information acquisition history shown in FIG. 60. In this embodiment, as the information elements of the information acquisition history there are taken the latest reference date and time and a flag indicative of the completion/incompletion of the reference. Because of partially having non-displayed contents, in the referred information x the flag representative of the incomplete reference rises. Further, in a step S5904, the information acquisition history of the user 1 made out by the information transferring section 5104 is transmitted through the communication section 5101 to the information accessing terminal B 5002. In the information accessing terminal B 5002, the information acquisition history of the user 1 fed through the communication section 5204 is retained in the terminal history managing section 5205.

Following this, in a step S5905, as well as the aforesaid case of using the information accessing terminal A 5001, the instruction for information acquisition is made in the information accessing terminal B 5002 while the information w is transferred in the information transfer managing system 5004. Further, in a step S5906, the control section 5205 of the information accessing terminal B 5002 creates a picture to be displayed, in which an access situation is added to the link, on the basis of the information w sent through the communication section 5204 and the information acquisition history retained in the terminal history managing section 5205, and the information displaying section 5203 displays it.

Figure 61:
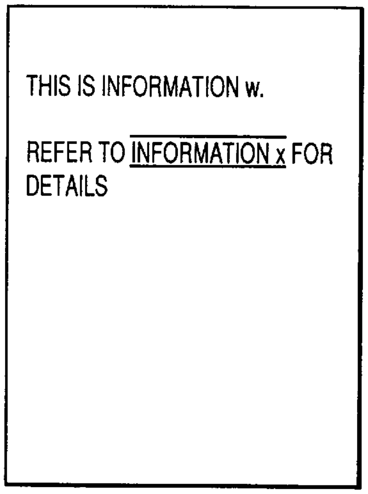
FIG. 61 is an illustration of one example of acquired information in the second terminal in the fifth embodiment of this invention.

FIG. 61 is an illustration of one example of displayed pictures of the information w. In this embodiment, since it is found from the information acquisition history that the information x involves the incomplete reference, a line is drawn above the link to the information x, thereby informing the user of this fact. Looking at the displayed picture shown in FIG. 61, the user 1 makes a decision that there is a need for again referring to the information x, and tries the re-reference.

As described above, in the information system according to this embodiment, even if there is the information whose portion is incompletely referred to at the previous reference and the user has access thereto through a different terminal afterwards, it is possible to prevent the omission of reference to the complete information by referring to its access situation.

Incidentally, if the analysis results of the referred information analyzing section 5110 are retained in the cache managing section 5108 and are used at the second access or the following access, the processing efficiency of the information transfer managing system can improve. Further, as in the case of the fourth embodiment, if the group managing section 5107 is used so that the group can communize the transfer history information, the efficiency in the cooperative work can improve. Moreover, although in this embodiment a line is drawn above the link in order to inform the user of the presence of the information involving the incomplete reference, it is also possible to change the color of the characters or letters indicative of the link or to make the link go on and off.

(Sixth Embodiment)

Figure 62:
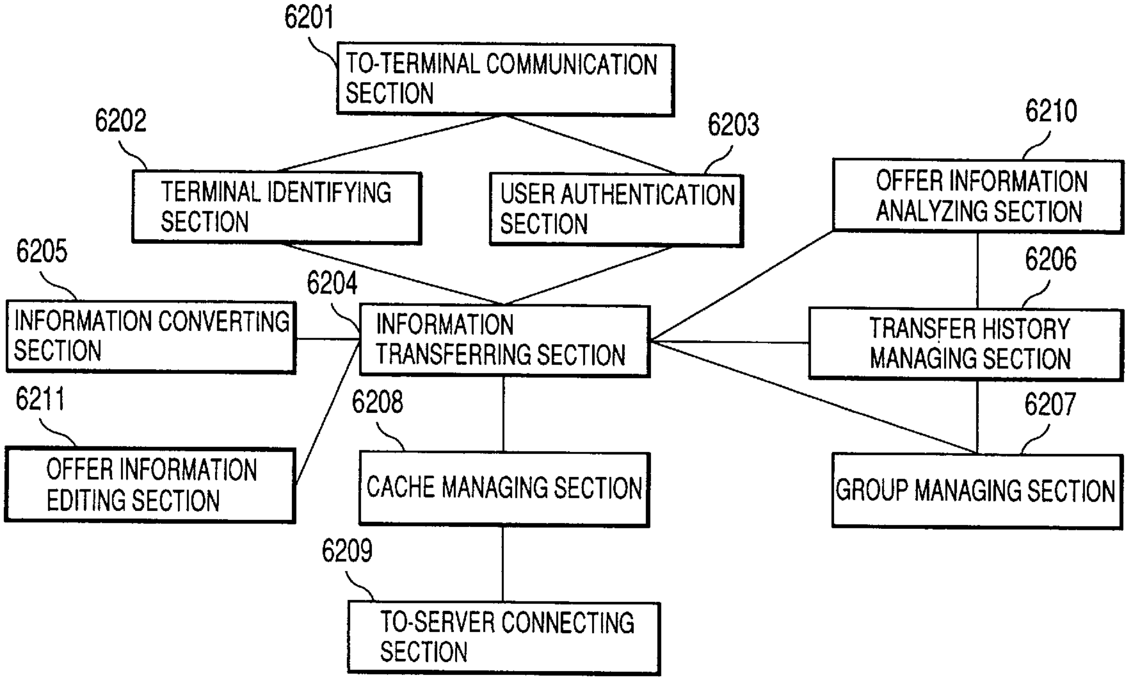
FIG. 62 is a block diagram showing an internal arrangement of an information transfer managing system according to a sixth embodiment of this invention.

A description will be made hereinbelow of a sixth embodiment of the present invention. The whole arrangement of this sixth embodiment is the same as that of the fifth embodiment shown in FIG. 50. FIG. 62 is a block diagram showing an arrangement of an information transfer managing system 5004. In FIG. 62, the information transfer managing system 5004 comprises a to-terminal communication section 6201 for carrying out the input and output of data from and to information accessing terminals through a communication network, a terminal identifying section 6202 for finding the ability of an information accessing terminal, a use authentication section 6203 for conducting the authentication of the user, an information transferring section 6204 for performing the data transfer between an information distributing server and the information accessing terminals, an information converting section 6205 for making a conversion of the contents of information in accordance with the terminal ability, a transfer history managing section 6206 for retaining and managing a demand for reference and input of information from an information accessing terminal and information corresponding to the additional information the additional information managing section 304 manages in the first embodiment, a group managing section 6207 for managing group information concerning a plurality of users, a cache managing section 6208 for storing information once obtained, a to-server connecting section 6209 for conducting the input and output of data from and to the information distributing server, a referred information analyzing section 6210 for analyzing the contents of information to be presented to the information accessing terminal and further for comparing the analysis result with the terminal ability, and a referred information editing section 6211 for partially changing the contents of information to be given to the information accessing terminal.

Figure 63:
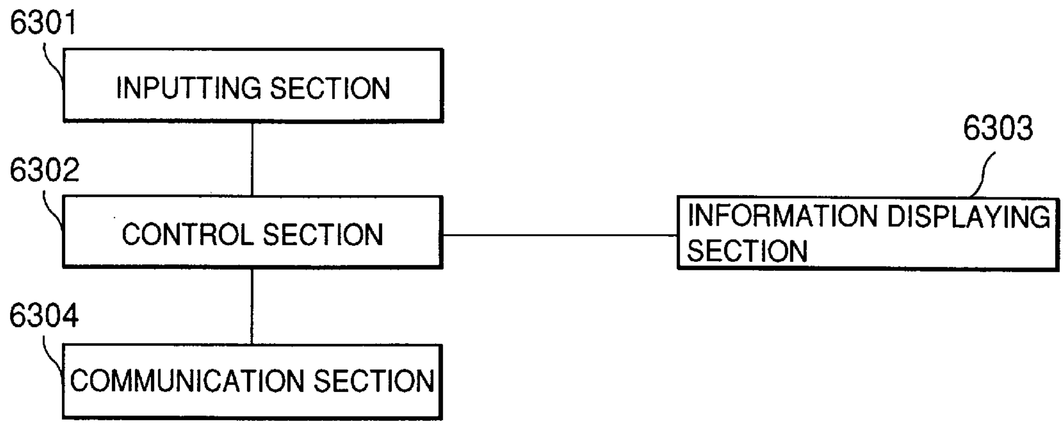
FIG. 63 is a block diagram showing an internal arrangement of an information accessing terminal in the sixth embodiment of this invention.

FIG. 63 is a block diagram showing an internal arrangement of each of the information accessing terminal A 5001 and the information accessing terminal B 5002. In FIG. 63, numeral 6301 represents an inputting section for accepting the input from the user, numeral 6302 designates a control section for controlling the whole terminal, numeral 6303 depicts an information displaying section for giving information to the user, and numeral 6304 denotes a communication section.

A description will be made hereinbelow of an operation of the information system thus arranged, that is, an operation to be taken for when, in the case that there is information whose portion is incompletely referred to by the user 1 through the information accessing terminal A, its situation is referred to from the different information accessing terminal B to prevent the omission of reference to the complete information.

Figure 64:
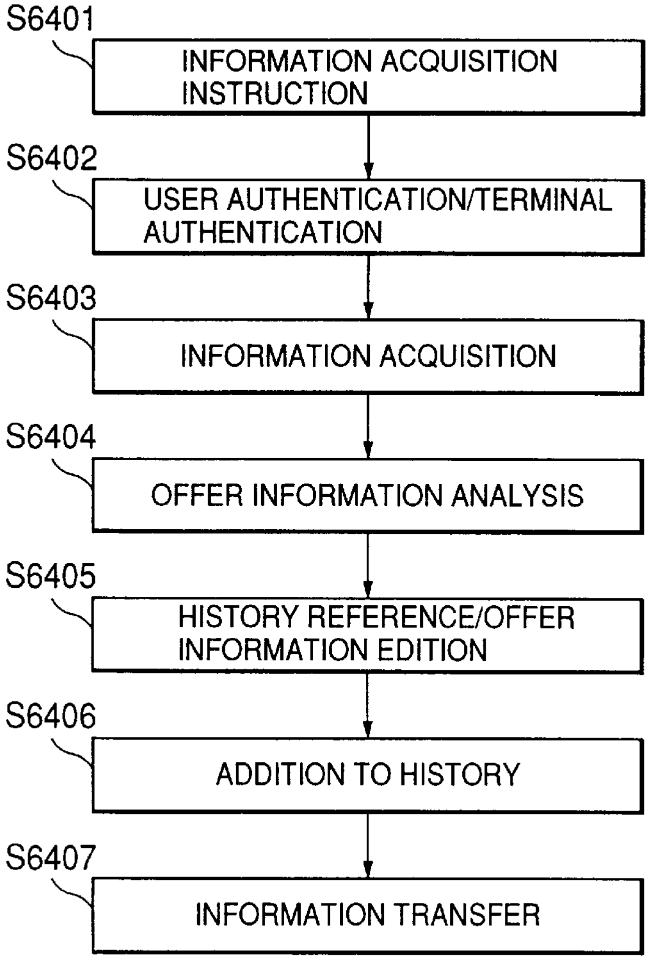
FIG. 64 is a flow chart showing information acquisition in the sixth embodiment of this invention.

First, referring to FIG. 64, a description will be made hereinbelow of an operation to be taken until the user 1 gives an instruction for the acquisition of information w being homepage information through the use of the information accessing terminal A and displays the respective contents in the information accessing terminal A.

First, in a step S6401, the user 1 issues an instruction for the acquisition of the information w through the use of the inputting section 6301 of the information accessing terminal A 5001, with this instruction being communicated through the communication section 6304 to the information transfer managing system 5004. Then, in a step S6402, the information transfer managing system 5004 identifies the user being the sender of the instruction through the use of the user authentication section 6203 and further finds the terminal ability of the sender through the use of the terminal identifying section 6202. The terminal ability in this embodiment is the same as that in the fifth embodiment, and let it be assumed that the terminal A does not hold the ability to display a table.

Subsequently, in a step S6403, the information transferring section 6204 receives the user information, the terminal ability information and the instruction from the user 1. The information transferring section 6204 interprets the instruction from the user 1 and gets the information w through the connecting section 6209. Then, in a step S6404, the referred information analyzing section 6210 analyzes the information w and separates it in accordance with its contents. In this embodiment, assuming that the information w comprises a text including a link to the information x, the analysis result which is the same as that in the fifth embodiment shown in FIG. 55 is obtainable.

Following this, in a step S6405, the referred information editing section 6211 performs an edition to put an access situation in the referred information on the basis of the analysis result by the referred information analyzing section 6210 and the transfer history information in the transfer history managing section 6206. In this embodiment, since a description on the information x does not exist in the transfer history information about the user 1 at this time, a train of letters "<unperformed>" representative of not yet making reference is put in the link portion as shown in FIG. 65.

After this, in a step S6406, the transfer history managing section 6206 compares the terminal ability information with the referred information analysis result and then adds to the transfer history information that the user 1 has obtained the information w. In this embodiment, let it be assumed that the transfer history information is the same as that of the fifth embodiment shown in FIG. 56. Further, in a step S6407, the information transferring section 6204 sends the information w after the edition by the referred information editing section 6211 through the communication section 6201 to the information accessing terminal A 5001. In the information accessing terminal A 5001, the information w coming through the communication section 6304 is displayed on the information display section 6303.

Figure 65:
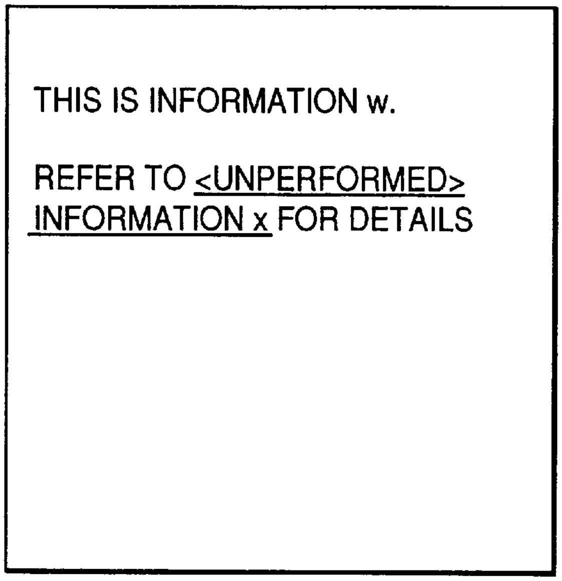
FIG. 65 is an illustration of one example of acquired information in the sixth embodiment of this invention.

FIG. 65 is an illustration of one example of displayed pictures of the information w. In this embodiment, since the information transfer managing system 5004 conducts the edition of the referred information, the train of letters "<unperformed>" is put in the link to the information x, so that the user can see that this information is not referred to yet.

Subsequently, referring to FIG. 64, a description will be made hereinbelow of an operation to be taken until the user 1 gives an instruction for the acquisition of the information x through the use of the information accessing terminal A and displays the respective contents in the information accessing terminal A. For the acquisition of the information x, the operations taken in S6401, S6402 and S6403 are the same as the acquisition operations for the information w.

In a step S6404, the referred information analyzing section 6210 analyzes the information x and separates it in accordance with the contents. In this embodiment, assuming that the information x is composed of a text including a table, the analysis result which is the same as that of the fifth embodiment shown in FIG. 57 is obtainable. Then, in a step S6405, the referred information editing section 6211 performs the edition to put the access situation in the referred information on the basis of the analysis result by the referred information analyzing section 6210 and the transfer history information in the transfer history managing section 6206.

In this embodiment, since the information y has no link information, no edition is particularly made.

Subsequently, in a step S6406, the transfer history managing section 6206 compares the terminal ability information with the referred information analysis result and then adds to the transfer history information that the user 1 has acquired the information x. In this embodiment, it has transfer history information similar to that of the fifth embodiment shown in FIG. 58, and since the table portion of the information x can not be displayed in the terminal A, a flag indicative of non-display of this portion rises.

Thereafter, in a step S6407, the information transferring section 6204 transmits the information x after the edition by the referred information editing section 6211 through the communication section 6201 to the information accessing terminal A 5001. In the information accessing terminal A 5001, the information x fed through the communication section 6304 is displayed on the information displaying section 6303.

Secondly, referring to FIG. 64, a description will be made hereinbelow of an operation to be taken until the user 1 starts a work through the information accessing terminal B 5002 after the completion of the foregoing work and again refers to the information x. The operations conducted in steps S6401, S6402, S6403 and S6404 are the same as the operations for the acquisition of the information w, except the use of the information accessing terminal B 5002. In the step S6402, the terminal B 5002 has the ability to display a table.

In a step S6405, the referred information editing section 6211 performs the edition to put the access situation in the referred information on the basis of the analysis result by the referred information analyzing section 6210 and the transfer history information in the transfer history managing section 6206. In this embodiment, the transfer history information about the user 1 at this time is as shown in FIG. 58. Although the information x is already referred to, the table portion is in the non-displayed condition, and hence a train of letters "<portion>" indicative of no reference is put in the link portion. Unlike the example of this embodiment, if the terminal B has no ability to display a table, because it is impossible to obtain the additional information irrespective of re-reference, for example a train of letters "<finished>" indicative of the completion of reference will be put therein.

Figure 66:
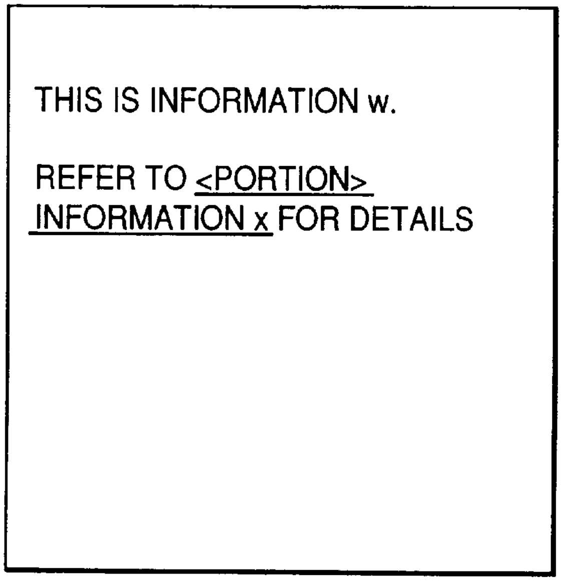
FIG. 66 is an illustration of display of acquired information in a second terminal in the sixth embodiment of this invention.

The operations conducted in steps S6406 and S6407 are the same as the operations for the acquisition of the information w, except the use of the information accessing terminal B. FIG. 66 is an illustration of one example of displayed pictures of the information w in the information accessing terminal B. In this embodiment, since the information transfer managing system performs the referred information edition, a train of letters "<portion>" is put in the link to the information x, so that the user finds that this information partially involves no reference. The user 1 sees the displayed picture example shown in FIG. 66 to decide whether or not there is a need for again making reference. If so, re-reference is done.

As described above, in the information system according to this embodiment, even if there is the information whose portion is incompletely referred to at the previous reference time and the user has access through a different terminal, it is possible to realize an effective system which allows the reference to the access situation to prevent the omission of reference to the complete information without additionally acquiring the information about the access situation.

Incidentally, if the analysis result of the referred information analyzing section 6210 is retained in the cache managing section 6208 and used at the second access or the following access, the processing efficiency of the information transfer managing system can improve. In addition, for example, if the referred information editing section 6211 puts a train of letters "<table>" indicative of the presence of a table at a table position in the information x, the referred information recognition by the user can improve. Moreover, in this embodiment, although the train of letters "<unperformed>" or "<portion>" is put in the link in order to inform the user of the access situation, it is also possible to change the color of the letters indicative of the link or to make the link go on and off.

(Seventh Embodiment)

A description will be made hereinbelow of a seventh embodiment of the present invention. The whole arrangement of the seventh embodiment is the same as that of the fifth embodiment shown in FIG. 50.

Figure 67:
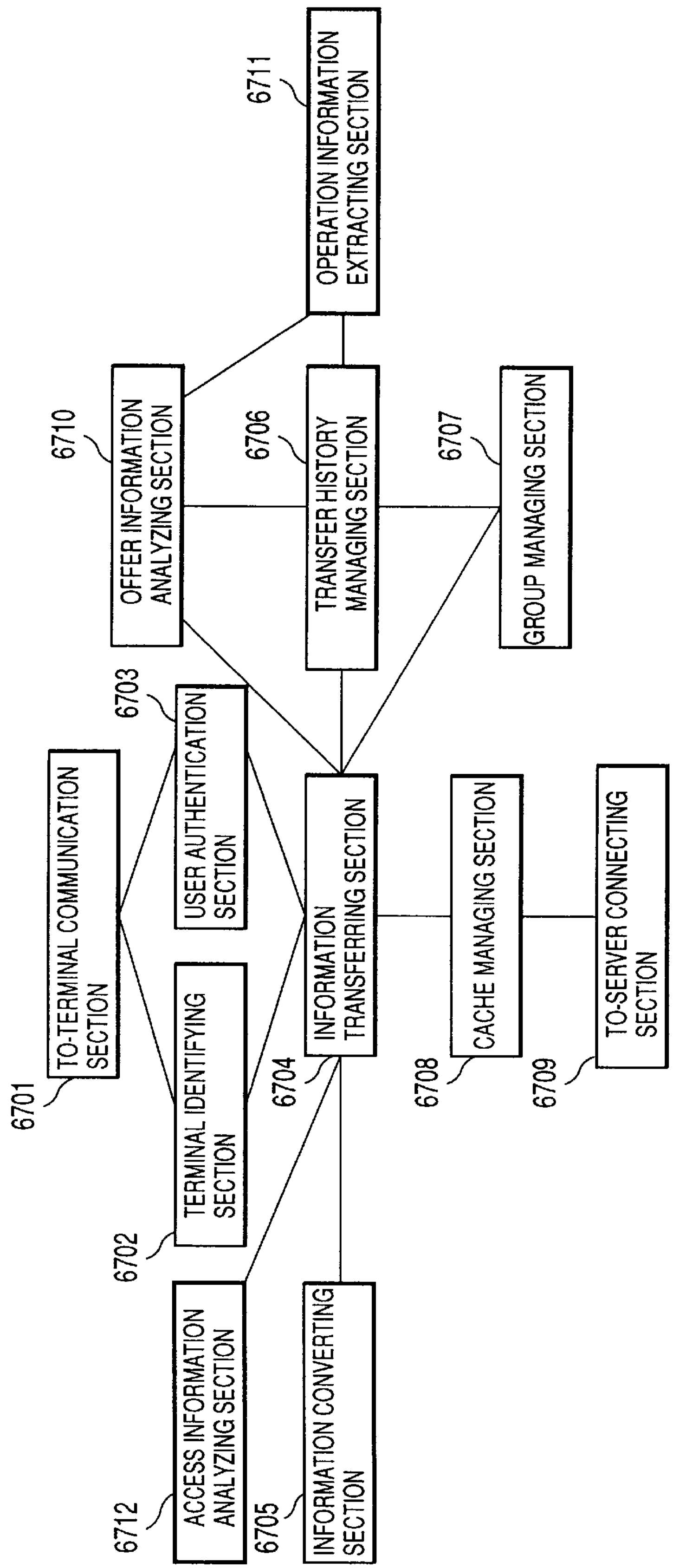
FIG. 67 is a block diagram showing an internal arrangement of an information transfer managing system according to a seventh embodiment of this invention.

FIG. 67 is a block diagram showing an arrangement of an information transfer managing system 5004 comprises a to-terminal communication section 6701 for carrying out the input and output of data from and to information accessing terminals A5001, B5002, a terminal identifying section 6702 for finding the ability of the information accessing terminals A5001, B5002, a user authentication section 6703 for performing the authentication of the user, an information transferring section 6704 for conducting the data transfer between an information distributing server and the information accessing terminals A5001, B5002, and an information converting section 6705. Also included in the information transfer managing system 5004 are a transfer history managing section 3706 for retaining and managing a demand for reference and input of information from the information accessing terminals A5001, B5002 and information corresponding to the additional information the additional information managing section 304 manages in the first embodiment, a group managing section 6707 for managing group information concerning a plurality of users, a cache managing section 6708 for storing information once obtained, a to-server connecting section 6709 for conducting the input and output of data from and to the information distributing server, a referred information analyzing section 6710 for analyzing the contents of information to be presented to the information accessing terminals A5001, B5002 and further for comparing the analysis result with the terminal ability, an operation information extracting section 6711 for extracting an item relating to an operation by the user from the analysis result by the referred information analyzing section 6710, and an access information analyzing section 6712 for analyzing demand information concerning the reference and input of information from the information accessing terminals A5001, B5002 to compare the analysis result with the terminal ability.

The internal arrangement of each of the information accessing terminals A5001, B5002 is the same as that of the fifth embodiment shown in FIG. 52.

A description will be made hereinbelow of an operation of the information system thus arranged, that is, an operation to be taken for, in the case that there is the information whose portion is incompletely inputted when the user 1 makes reference through the use of one information accessing terminal A, preventing the omission of input of the complete information by referring to that access situation through a different information accessing terminal B.

First of all, referring to FIG. 68, a description will be taken hereinbelow of an operation to be conducted until the user 1 issues an instruction for the acquisition of information y being input information through the use of the information accessing terminal A and displays it in the information accessing terminal A.

In a step S6801, the user 1 gives an instruction for the acquisition of the information y through the inputting section 5201 of the information accessing terminal A 5001, with this instruction being sent through the communication section 5204 to the information transfer managing system 5004. Then, in a step S6802, the information transfer managing system 5004 identifies the user being the sender of the instruction through the use of the user authentication section 5003 and finds the terminal ability of the sender through the use of the terminal identifying section 5002. FIG. 69 is an illustration of one example of terminal abilities in this embodiment. In this embodiment, as the information elements of the terminal ability there are taken four items: color picture display, table display, text input and multiple selection. In FIG. 69, the terminal A has the ability for input as a text but not having the ability for input with the multiple selection item.

Subsequently, in a step S6803, the information transferring section 6704 receives the user information, the terminal ability information and the instruction from the user 1, while the access information analyzing section 6712 interprets the instruction from the user 1.

Figures 68, 69, 70:
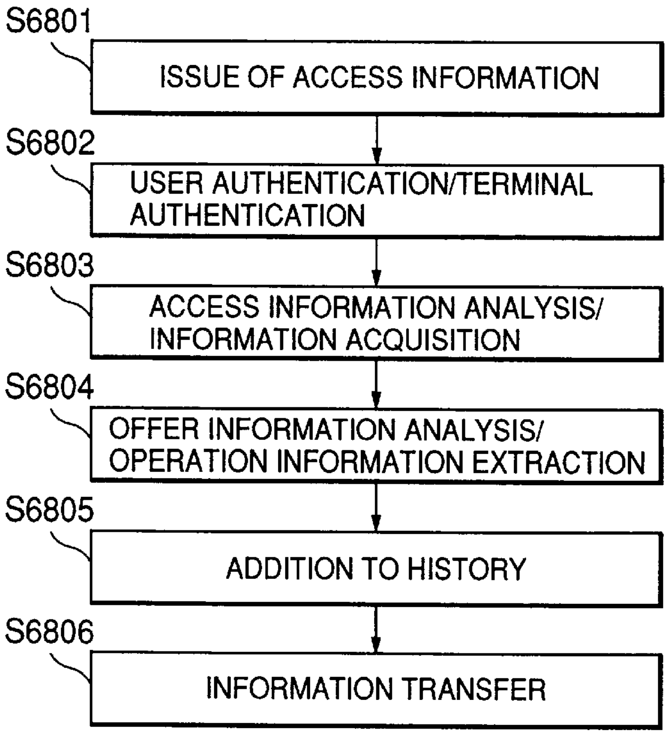
FIG. 68 is a flow chart showing the first information acquisition in the seventh embodiment of this invention.
FIG. 69 is an illustration of one example of terminal abilities in the seventh embodiment of this invention.
FIG. 70 is an illustration of one example of access information in the seventh embodiment of this invention.

FIG. 70 is an illustration of one example of access information (instruction from the user) in this embodiment. In this embodiment, as the information elements of the access information there are taken only three items: the kind of access, the identifier for the referred information and the additional information such as an input value. In this case, as shown in FIG. 70, the kind is "acquisition", the identifier is "information y" and the additional information does not exist. Because of the instruction for the mere acquisition of the information y, the information y is obtained through the connection section 6709.

Figures 71, 72:
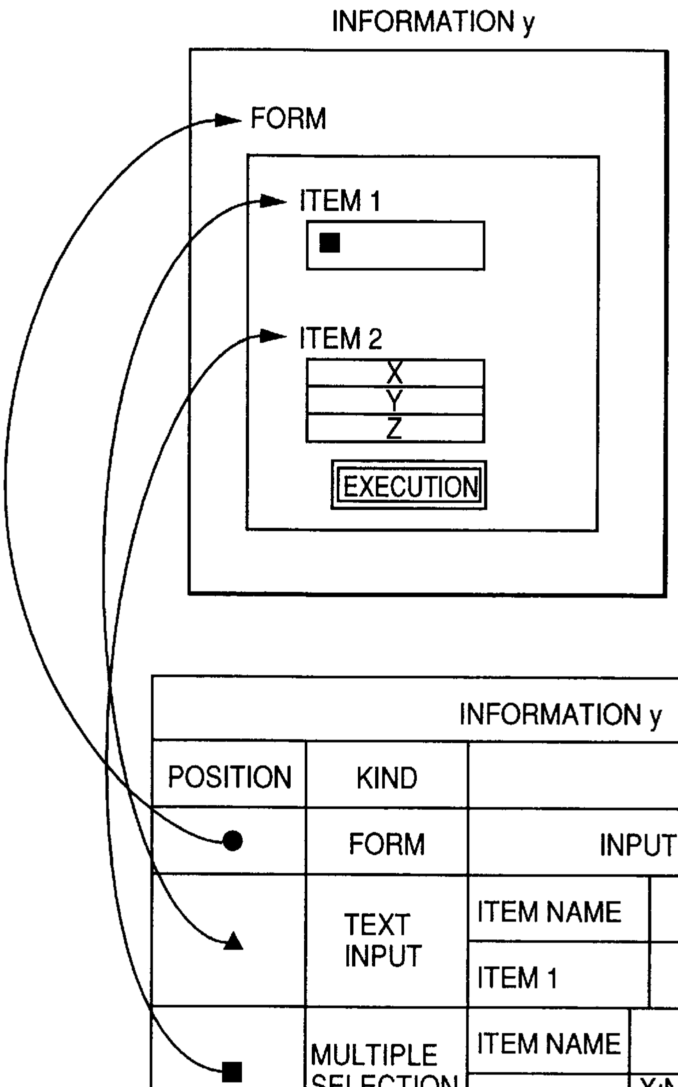
FIG. 71 is an illustration of one example of referred information and analysis results in the seventh embodiment of this invention.
FIG. 72 is an illustration of one example of access information produced in the seventh embodiment of this invention.

Following this, in a step S6804, the referred information analyzing section 6710 analyzes the information y and separates it in accordance with its contents. FIG. 71 is an illustration of examples of referred information and the analysis result corresponding thereto. In this embodiment, as the information elements of the analysis result there are taken the position, kind and attribute of the information.

Assuming that the information y includes a text input with the item name "item 1", multiple selection with the item name "item 2" comprising three members X, Y and Z and a form where the action is "input to information y", the analysis is made as shown in FIG. 71. Further, the operation information extracting section 6711 interprets the aforesaid analysis result and, in the case that there are the contents relating to the operation, it creates access information at the operation. Since in the analysis result example the form is based on the contents relating to the operation, the access information is created. FIG. 72 is an illustration of one example of the created access information. The kind is set to "input", the identifier is set to "information y" and the additional information is not set in terms of the item 1 and item 2.

Thereafter, in a step S6805, the transfer history managing section 6706 adds the acquisition of the information y to the transfer history information on the basis of the referred information analysis result and the access information created by the operation information extracting section 6711. FIG. 73 is an illustration of the transfer history information at this time.

In this embodiment, as the information elements of the transfer history information there are taken the identifier for the referred information, the position, kind and attribute taken at every information contents, the input data, and the access information including the input situation. In this case, since the input for the information y is not yet made, as shown in FIG. 73 the input condition to be added to the access information for the form of the information y assumes a non-inputted condition.

After this, in a step 6806, the information transferring section 6704 transmits the information y, obtained from the information distributing server 5005, through the communication section 6701 to the information accessing terminal A 5001. In the information accessing terminal A 5001, the information y fed through the communication section 5204 is displayed on the information displaying section 5203.

Furthermore, referring again to FIG. 68, a description will be made hereinbelow of an operation to be taken until the user 1 conducts the input to the information y being the input information through the use of the information accessing terminal A and displays the access result information.

Figures 74, 75:
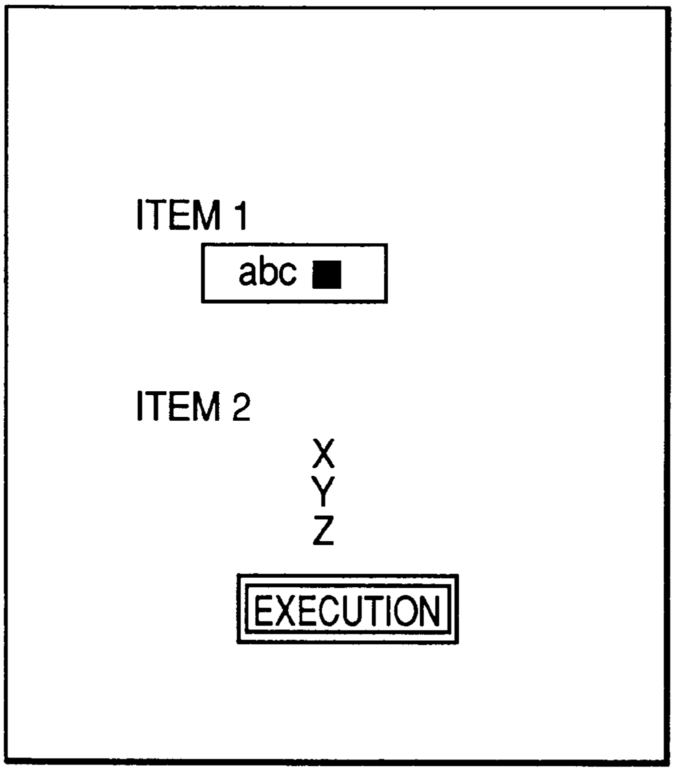
FIG. 74 is an illustration of examples of acquired information and inputted pictures in the seventh embodiment of this invention.
FIG. 75 is an illustration of one example of access information in the seventh embodiment of this invention.

In a step S6801, the user 1 conducts the input to an input-allowed portion of the information y through the use of the inputting section 5201 of the information accessing terminal A 5001. FIG. 74 is an illustration of one example of displayed pictures during the inputting work in this embodiment. Since the terminal A does not have the input ability for the multiple selection item, it is be assumed that only a train of letters "abc" is set in the text input portion. In this state, an access instruction is made using an executing button, this access information is communicated through the communication section 5204 to the information transfer managing system 5004.

The following steps S6802 and S6803 are executed as in the case of the foregoing acquisition instruction for the information y. At this time, the analysis result of the access information analyzing section 6712 becomes as shown in FIG. 75. In this case, in the access information, as shown in FIG. 75, the kind is "input", the identifier is "information z", and the additional information is "item 1=abc & item 2=". Since this is the access instruction to the information z, the information z' being the access result information to the information z is obtained through the connecting section 6709.

Subsequently, in a step S6804, the referred information analyzing section 6710 analyzes the information z' being the access result information to the information z and separates it in accordance with its contents. In this case, since the information z' has only a text but not having the access-related information, the operation information extracting section 6711 does not produce the access information.

Following this, in a step S6805, the transfer history managing section 6706 adds to the transfer history information that the user 1 has had access to the information z. At this time, when the kind and identifier of the access information are in coincidence as a result of referring to the transfer history information about the user 1, the analysis result of the access information analyzing section 6712 is compared with the terminal ability, and the additional information is superscribed on that information. FIG. 76 is an illustration of the transfer history information taken at this time.

In this case, although the train of letters "abc" is set for the input value of the item 1, because the information accessing terminal A has no input ability for the multiple selection item, the item 2 remains in the non-inputted condition as shown in FIG. 76. Further, because of the occurrence of the incomplete input, the input condition to be added to the accessing information with respect to the form of the information y assumes a partial input.

Thereafter, in a step S6806, the information transferring section 6704 transmits the access result information to the information z, obtained from the information distributing server 5005, through the communication section 6701 to the information accessing terminal A 5001. In the information accessing terminal A 5001, the access result information to the information z, coming through the communication section 5204, is displayed on the information displaying section 5203.

Figures 77, 78:
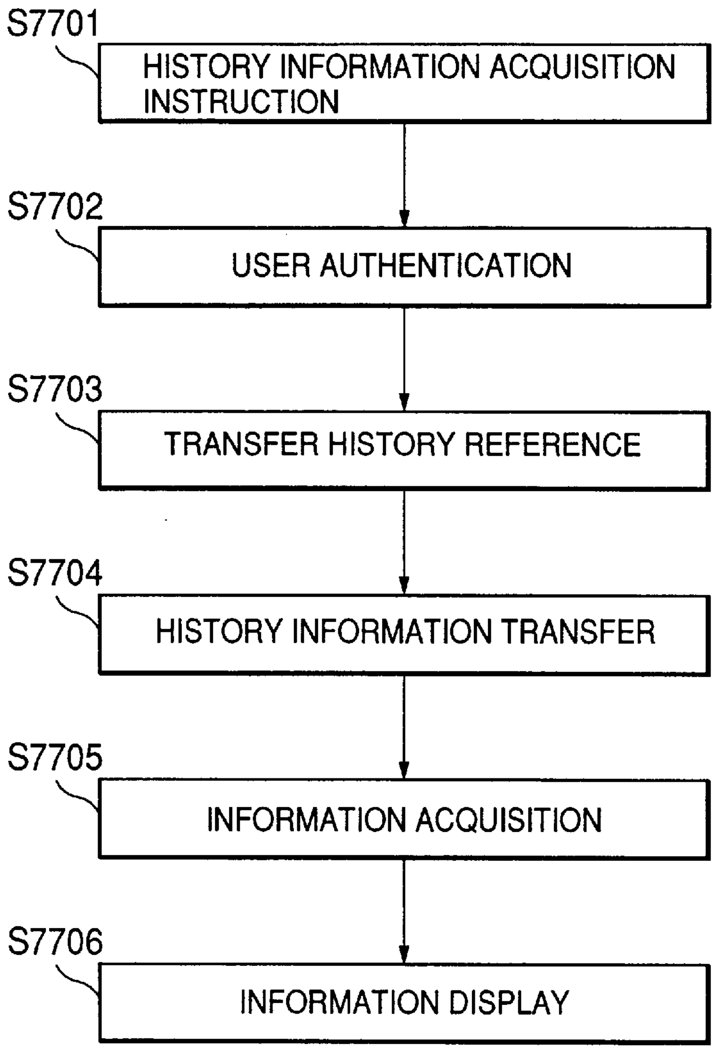
FIG. 77 is a flow chart showing history information acquisition by a second terminal in the seventh embodiment of this invention.
FIG. 78 is an illustration of one example of display of information acquisition history in the second terminal in the seventh embodiment of this invention.

Moreover, referring to FIG. 77, a description will be made hereinbelow of an operation to be taken until the user 1 starts a work through the use of the information accessing terminal B after the completion of the foregoing work and again has access to the information z.

First, in a step S7701, the user 1 issues an instruction for the acquisition of the information acquisition history through the use of the inputting section 5201 of the information accessing terminal B 5002, with this instruction being sent through the communication section 5204 to the information transfer managing system 5004. Then, in a step S7702, the communication section 6701 receives the instruction from the user 1 while the user authentication section 6702 identifies the user being the sender of the instruction, with this instruction and the user information being fed to the information transferring section 6704.

Subsequently, in a step S7703, the information transferring section 6704 reads out the transfer history information about the user 1 shown in FIG. 76 from the transfer history managing section 6706 and produces the information acquisition history shown in FIG. 78. In this embodiment, as the information element of the information acquisition history, taken is the input condition. The input condition of the referred information y involving the partially non-inputted contents becomes a partial input as shown in FIG. 78.

Following this, in a step S7704, the information acquisition history about the user 1 produced by the information transferring section 6704 is transmitted through the communication section 6701 to the information accessing terminal B 5002. In the information accessing terminal B 5002, the information acquisition history about the user 1 fed through the communication section 5204 is retained in the terminal history managing section 5205. Further, in a step S7705, as in the case of the use of the information accessing terminal A 5001, an instruction for the information acquisition is made in the information accessing terminal A 5001, whereas the transfer of the information y is made in the information transfer managing system 5004.

Figure 79:
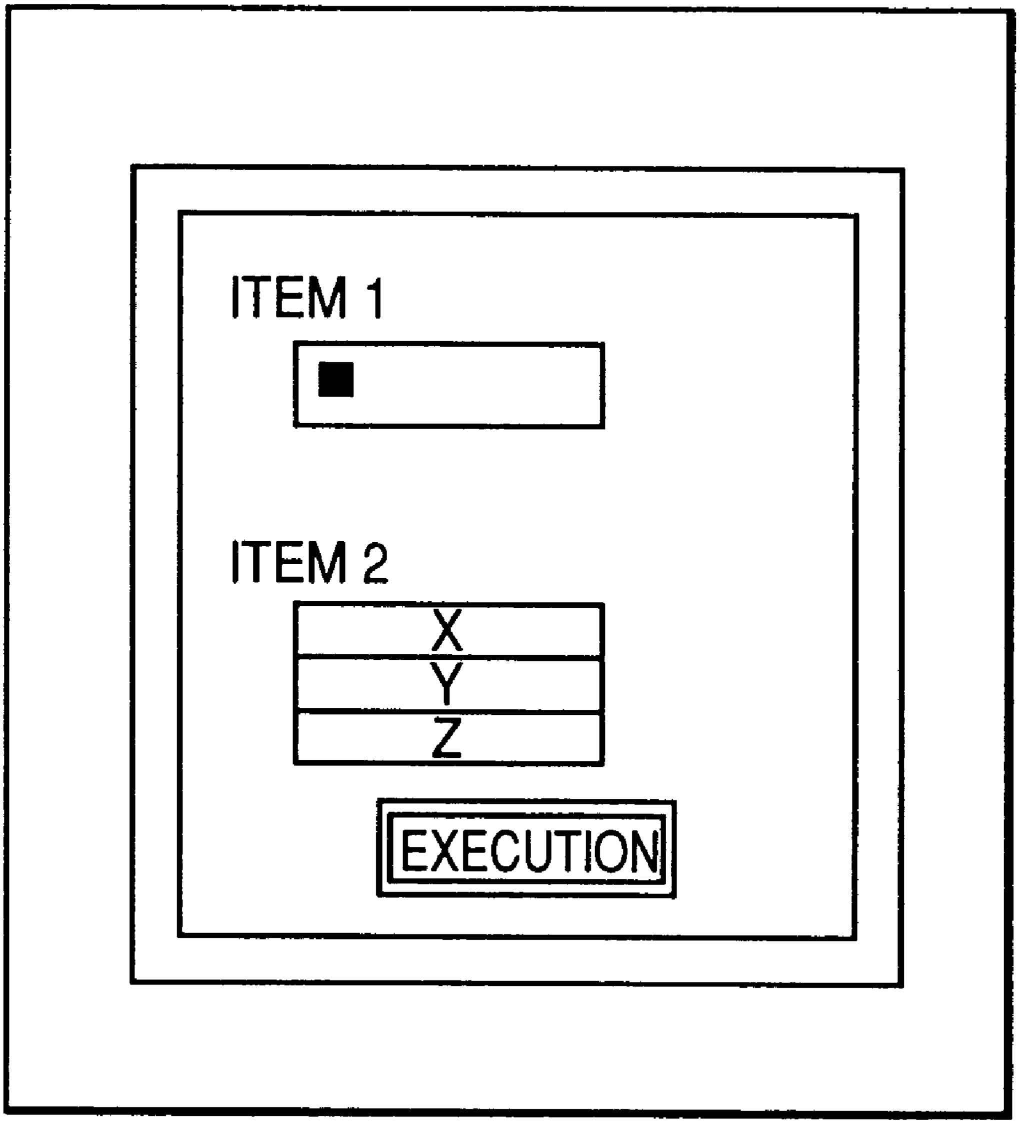
FIG. 79 is an illustration of one example of display of information acquisition in the second terminal in the seventh embodiment of this invention.

Thereafter, in a step S7706, the control section 5205 of the information accessing terminal B 5002 produces a display picture with added input situation on the basis of the information y coming through the communication section 5204 and the information acquisition history retained in the terminal history managing section 5205, and displays it on the information displaying section 5203. FIG. 79 is an illustration of one example of displayed pictures of the information y. In this embodiment, since it is found from the information acquisition history that the input of the information y is incomplete, the form is surrounded by a double line to inform the user of that fact. Through the displayed picture example shown in FIG. 79, the user 1 decides that it is necessary to again tray the access to the information z after the complete input, and performs the re-reference.

As described above, in the information system according to this embodiment, even if the there is the information whose portion is incompletely inputted at the previous reference and input and the user has access thereto through a different terminal afterwards, it is possible to prevent the omission of input of the complete information by referring to its input situation.

Incidentally, if the analysis result by the referred information analyzing section 6710 is retained in the cache managing section 6708 and used at the second access or the following access, it is possible to enhance the processing efficiency of the information transfer managing system 5004. In addition, if a group communizes the transfer history information through the use of the group managing section 5107 similar to that of the fourth embodiment, it is possible to enhance the efficiency in cooperative works.

Furthermore, as well as the case of the fifth embodiment, if through the use of the access situation a line is drawn above the link information to the partially non-inputted information in the transfer history information and the information acquisition history in the information accessing terminal, it is possible to prevent the omission of reference to the partially non-inputted information and hence to further improve the input omission preventing effects. When the information acquisition history includes the additional information of the access information, it is possible to change the display at every inputted portion in the information accessing terminal or to reuse the information previously inputted, which enhances the work efficiency.

Still further, although in this embodiment the form is employed as one example of the contents relating to the operation information, it is also applicable to various scripts. In addition, although in this embodiment the user knows the occurrence of the incomplete input in such a manner as to surround the form with a double line, it is also possible to change the color of the form parts or to make the form go on and off.

(Eighth Embodiment)

A description will be made hereinbelow of an eighth embodiment of the present invention. The whole arrangement of the eighth embodiment is the same as that of the fifth embodiment shown in FIG. 50.

Figure 80:
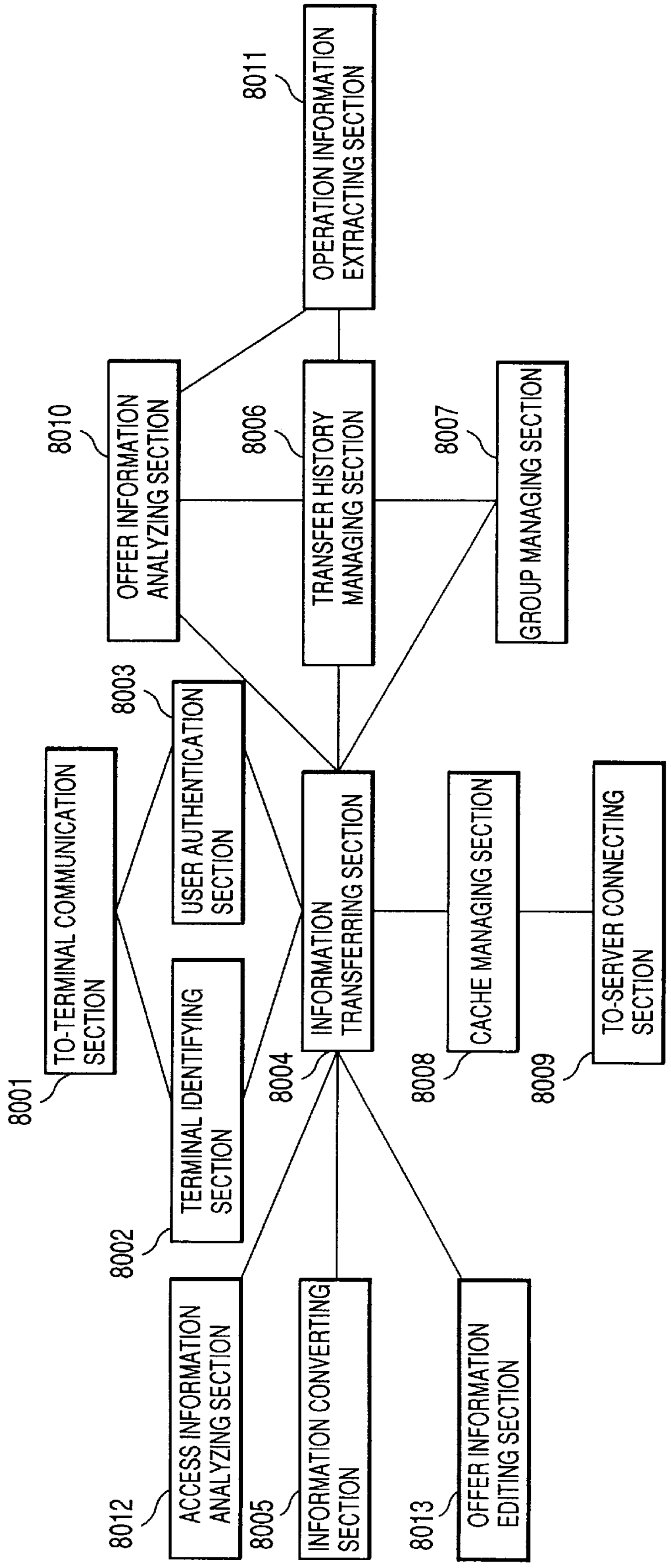
FIG. 80 is a block diagram showing an internal arrangement of an information transfer managing system according to an eighth embodiment of this invention.

FIG. 80 is a block diagram showing an arrangement of an information transfer managing system 5004. In FIG. 80, the information transfer managing system 5004 comprises a to-terminal communication section 8001 for carrying out the input and output of data from and to information accessing terminals through a communication network, a terminal identifying section 8002 for finding the ability of the information accessing terminals, a user authentication section 8003 for performing the authentication of the user, an information transferring section 8004 for conducting the data transfer between an information distributing server and the information accessing terminals, an information converting section 8005 for converting the contents of information in accordance with the terminal ability, a transfer history managing section 8006 for retaining and managing a demand for reference and input of information from an information accessing terminal and information corresponding to the additional information the additional information managing section 304 manages in the first embodiment, a group managing section 8007 for managing group information concerning a plurality of users, a cache managing section 8008 for storing information once obtained, and a to-server connecting section 8009 for conducting the input and output of data from and to the information distributing server. Also included in the information transfer managing system 5004 are a referred information analyzing section 8010 for analyzing the contents of information to be presented to the information accessing terminals and further for comparing the analysis result with the terminal ability, an operation information extracting section 8011 for extracting an item relating to the operation of the user from the analysis result of the referred information analyzing section 8010, an access information analyzing section 8012 for analyzing the demand information concerning the reference to and input of information from the information accessing terminals and further for comparing the analysis result with the terminal ability, and a referred information editing section 8013 for partially changing the contents of information to be given to the information accessing terminals.

The internal arrangement of each of the information accessing terminal A 5001 and the information accessing terminal A 5002 is the same as that of the sixth embodiment shown in FIG. 63.

A description will be made hereinbelow of an operation of the information system thus arranged, that is, an operation to be taken for, in the case that there is the information whose portion is incompletely inputted when the user 1 makes reference through the use of one information accessing terminal A, preventing the omission of input of the complete information by referring to that access situation through a different information accessing terminal B.

Figure 81:
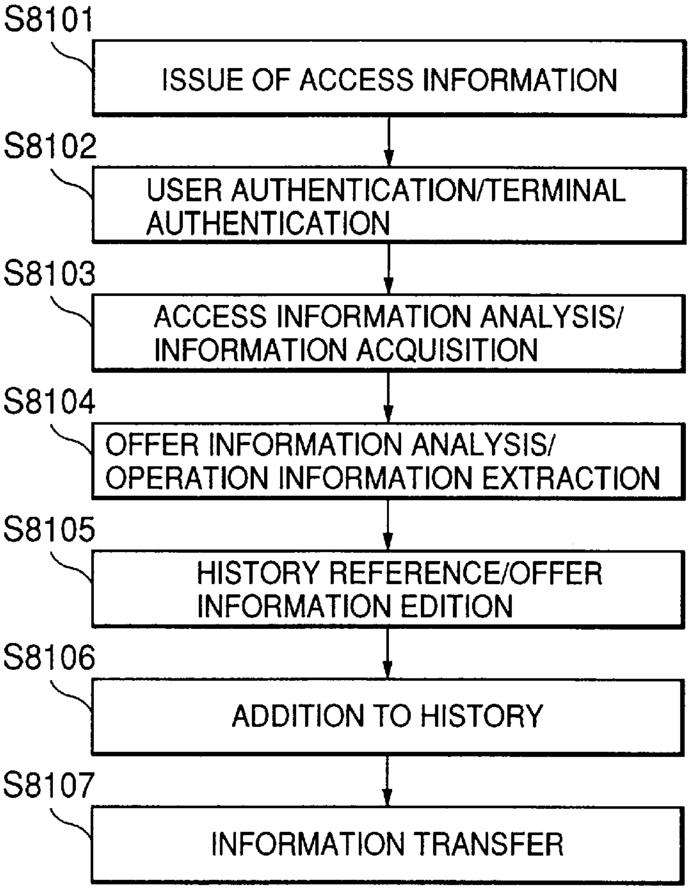
FIG. 81 is a flow chart showing information acquisition in the eighth embodiment of this invention.

First of all, referring to FIG. 81, a description will be made hereinbelow of an operation to be taken until the user 1 gives an instruction for the acquisition of the information y being the input information through the use of the information accessing terminal A and displays it in the information accessing terminal A.

In a step S8101, the user 1 issues an instruction for the acquisition of the information w through the inputting section 5201 of the information accessing terminal A 5001, with this instruction being given through the communication section 5204 to the information transfer managing system 5004. Then, in a step S8102, the information transfer managing system 5004 identifies the user being the sender of the instruction through the use of the user authentication section 5003 and further finds out the terminal ability of the sender through the use of the terminal identifying section 5002. In this embodiment, let it be assumed that the terminal ability is the same as that of the seventh embodiment shown in FIG. 54 and the terminal A has the ability for performing the input of the text input but not having the ability for conducting the input on the multiple selection item.

Subsequently, in a step S8103, the information transferring section 8004 receives the user information, the terminal ability information and the instruction from the user 1, whereas the access information analyzing section 8012 interprets the instruction from the user 1. In this embodiment, the access information is the same as that of the seventh embodiment shown in FIG. 70, where the kind is “acquisition”, the identifier is “information y, and no additional information exists. Since this is merely the instruction for the acquisition of the information y, the information y is obtained through the connecting section 8009.

Following this, in a step S8104, the referred information analyzing section 8010 analyzes the information y and separates it in accordance with its contents. In this case, let it be assumed that the information y is composed of a text input with the item name “item 1”, multiple selection with the item name “item 2” comprising three members X, Y and Z, and a form where the action is “input to information z”. In this case, the information y and the analysis result of the referred information analyzing section 8010 are the same as those of the seventh embodiment shown in FIG. 71.

Furthermore, the operation information extracting section 8011 interprets the aforesaid analysis result, and in the case of the presence of the contents relating to the operation, produces the access information at the operation. In the case of the aforesaid analysis result example, since the form takes the operation-related contents, it produces the access information. In this embodiment, the produced access information is the same as that of the seventh embodiment shown in FIG. 72, where the kind is “input”, the identifier is “information z”, and the additional information is not set in terms of both the items 1 and 2.

After this, in a step S8105, the referred information editing section 8013 conducts the edition to put an input situation in an input-related portion of the referred information on the basis of the analysis result of the referred information analyzing section 8010 and the transfer history information in the transfer history managing section 8006. In this embodiment, since the information y is not described in the transfer history information about the user 1 at this time, a train of letters “<unperformed>” indicative of not yet performing the input is inserted into the text input item being the input-related portion and the multiple selection item. Further, in a step S8106, on the basis of the referred information analysis result and the access information produced by the operation information extracting section 8011 the transfer history managing section 8006 adds to the transfer history information that the user 1 has obtained the information y. In this embodiment, the transfer history information is the same as that of the fifth embodiment shown in FIG. 73.

Figure 82:
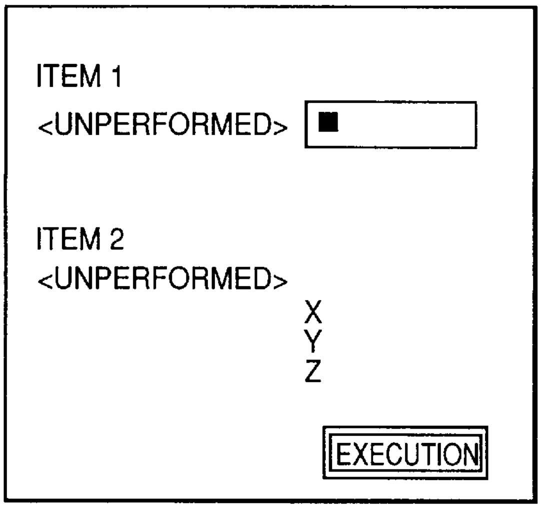
FIG. 82 is an illustration of one example of display of acquired information in the eighth embodiment of this invention.

Thereafter, in a step 8107, the information transferring section 8004 transmits the information y after the edition by the referred information editing section 8013 through the communication section 8001 to the information accessing terminal A 5001. In the information accessing terminal A 5001, the information y coming through the communication section 5204 is displayed on the information displaying section 5203. FIG. 82 is an illustration of one example of displayed pictures of the information y. In this embodiment, since the information transfer managing system 5004 performs the referred information edition, a train of letters “<unperformed>” is inserted into the text input item and the multiple selection item, so that the user can see that this portion is in the non-inputted condition yet.

Furthermore, referring to FIG. 81, a description will be made hereinbelow of an operation to be taken until the user 1 performs the input to the information y being the input information through the information accessing terminal A.

Figure 83:
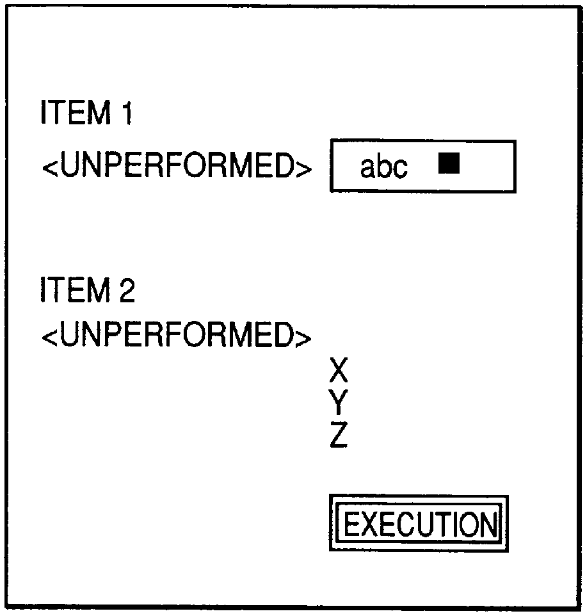
FIG. 83 is an illustration of examples of displays of acquired information and inputted pictures in the eighth embodiment of this invention.

First, in a step S8101, the user 1 performs the input to the input-allowed portion of the information y through the inputting section 5201 of the information accessing terminal A. FIG. 83 is an illustration of one example of displayed pictures during the inputting work. Since the terminal A does not have the input ability for the multiple selection item, it is be assumed that only a train of letters “abc” is set in the text input portion. In this state, an access instruction is made using an executing button, this access information is communicated through the communication section 5204 to the information transfer managing system 5004.

The following steps S8102 and S8103 are executed as in the case of the foregoing acquisition instruction for the information y. At this time, the analysis result of the access information analyzing section 8012 is the same as that of the seventh embodiment shown in FIG. 75, where the kind is “input”, the identifier is “information z”, and the additional information is “item 1=abc & item 2=”. Since this is the access instruction to the information z, the information z' being the access result information to the information z is obtained through the connecting section 8009.

Subsequently, in a step S8104, the referred information analyzing section 8010 analyzes the information z' being the access result information to the information z and separates it in accordance with its contents. In this case, since the information z' has only a text but not having the access-related information, the operation information extracting section 8011 does not produce the access information. Further, in a step S8105, the referred information editing section 8013 conducts the edition to put the input situation in the input-related portion of the referred information on the basis of the analysis result of the referred information analyzing section 8010 and the transfer history information in the transfer history managing section 8006. In this case, since the access result information to the information z has no input-related portion, the edition is not particularly done.

Following this, in a step S8106, the transfer history managing section 8006 adds to the transfer history information that the user 1 has had access to the information z. At this time, the transfer history information about the user 1 is referred to, and if the kind and identifier of the access information are in coincidence as a result of referring to the transfer history information about the user 1, the analysis result of the access information analyzing section 8012 is compared with the terminal ability, and the additional information is superscribed on that information.

In this embodiment, the transfer history information is the same as that of the seventh embodiment shown in FIG. 76, and a train of letters "abc" is set for the input value of the item 1 while the item 2 remains in a non-inputted condition, and the value of the input condition to be added to the access information with respect to the form of the information y assumes a partial input.

Thereafter, in a step S8107, the information transferring section 8004 transmits the access result information to the information z, obtained from the information distributing server 5005, through the communication section 8001 to the information accessing terminal A 5001. In the information accessing terminal A 5001, the access result information to the information z, fed through the communication section 5204, is displayed on the information displaying section 5203.

Furthermore, referring again to FIG. 81, a description will be made hereinbelow of an operation to be taken until the user 1 starts a work through the information accessing terminal B after the completion of the foregoing work and again has access to the information z. The operations conducted in steps S8101, S8102, S8103 and S8104 are the same as those for the aforesaid acquisition of the information y, except the use of the information accessing terminal B. In the step S8102, the terminal B has the ability for the multiple selection input.

In a step S8105, the referred information editing section 8013 conducts the edition to put the input situation in the input-related portion of the referred information on the basis of the analysis result by the referred information analyzing section 8010 and the transfer history information in the transfer history managing section 8006. In this embodiment, the transfer history information about the user 1 is, at this time, as shown in FIG. 76, and since a set value is put in the text input portion, a train of letters "<performed>" representative of the fact that the value is previously set is inserted thereinto. On the other hand, since the multiple selection portion is in the non-set condition, a train of letters "<unperformed>" indicative of the fact that input is not inserted thereinto yet. Moreover, a train of letters "abc" already set is inserted into the text input portion.

Figure 84:
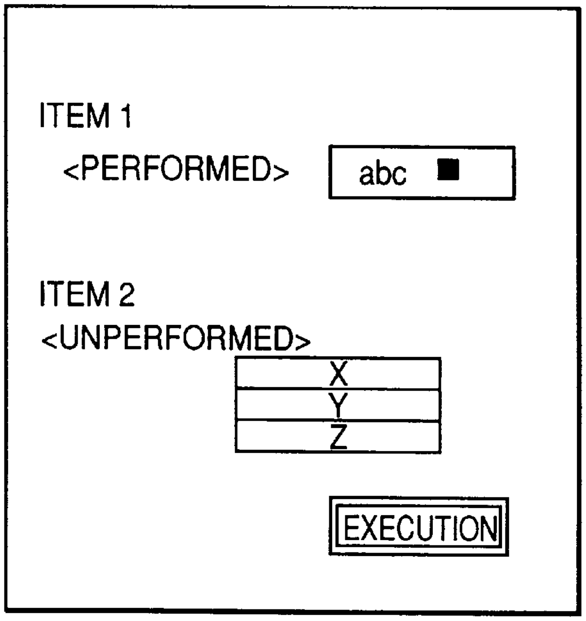
FIG. 84 is an illustration of examples of displays of acquired information and inputted pictures in a second terminal in the eighth embodiment of this invention.

The operations to be conducted in steps S8106 and S8107 are the same as those for the aforesaid acquisition of the information y, except the use of the information accessing terminal B. FIG. 84 is an illustration of one example of displayed pictures of the information y in the information accessing terminal B. Since in this embodiment the information transfer managing system 5004 conducts the referred information edition, the train of letters "<performed>" is inserted into the text input portion and the train of letters "<unperformed>" is inserted into the multiple selection portion. Thus, the user can know that only the multiple selection is in the non-inputted condition.

In addition, the train of letters "abc" inputted through the information accessing terminal A is already set in the text input portion. Looking at the displayed picture example, the user 1 decides that the input of only the multiple selection is necessary, and hence inputs this and again has access to the information z.

As described above, in the information system according to this embodiment, even if the there is the information whose portion is incompletely inputted at the previous reference and input and the user has access thereto through a different terminal afterwards, it is possible to realize an effective system which is capable of preventing the omission of input of the complete information by referring to its input situation, and of referring to the input situation without separately obtaining it, and further of reusing the information previously partially inputted.

Incidentally, if the analysis result of the referred information analyzing section 8010 is retained in the cache managing section 8008 and used at the second access or the following access, it is possible to enhance the processing efficiency of the information transfer managing system 5004. In addition, if a group communizes the transfer history information through the use of the group managing section 5107 similar to that of the fourth embodiment, it is possible to enhance the efficiency in cooperative works.

Furthermore, as well as the case of the sixth embodiment, if through the use of the access situation a train of letters is inserted into the link information to the partially non-inputted information in the transfer history information and the information acquisition history in the information accessing terminal, it is possible to prevent the omission of reference to the partially non-inputted information and hence to further improve the input omission preventing effects. Further, although in this embodiment the form is employed as one example of the contents relating to the operation information, it is also applicable to various scripts. Still further, In addition, although in this embodiment the user knows the occurrence of the incomplete input by inserting the train of letters "<unperformed>" or "<performed>", for example, it is also possible to change the color of the form parts.

(Ninth Embodiment)

A description will be made hereinbelow of a ninth embodiment of the present invention. The whole arrangement of this embodiment is the same as that of the fifth embodiment shown in FIG. 50.

Figure 85:
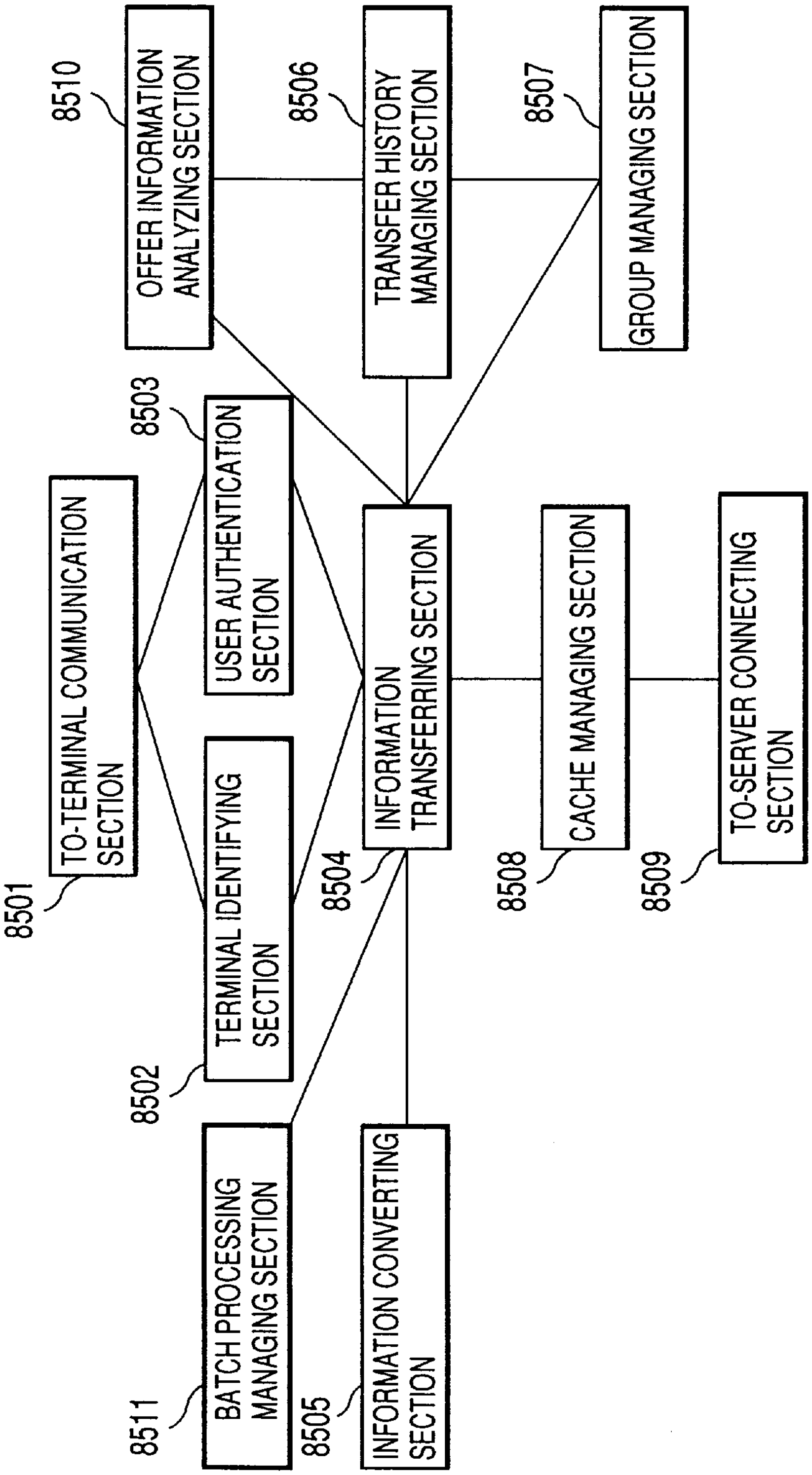
FIG. 85 is a block diagram showing an internal arrangement of an information transfer managing system according to a ninth embodiment of this invention.

FIG. 85 is a block diagram showing an arrangement of an information transfer managing system 5004. In FIG. 85, the information transfer managing system 5004 comprises a to-terminal communication section 8501 for carrying out the input and output of data from and to the information accessing terminals, a terminal identifying section 8502 for finding the ability of the information accessing terminals, a user authentication section 8503 for conducting the authentication of the user, an information transferring section 8504 for performing the data transfer between an information distributing server and the information accessing terminals, an information converting section 8505 for making a conversion of the contents of information in accordance with the terminal ability, a transfer history managing section 8506 for retaining and managing a demand for reference and input of information from an information accessing terminal and information corresponding to the additional information the additional information managing section 304 manages in the first embodiment, a group managing section 8507 for managing group information about a plurality of users, a cache managing section 8508 for retaining information once acquired, a to-server connecting section 8509 for performing the input and output of data from and to the information distributing server, a referred information analyzing section 8510 for analyzing the contents of information to be presented to the information accessing terminals and further for comparing the analysis result with the terminal ability, and a batch processing managing section 8511 for continuously presenting the referred information, to which an incomplete access occurs, to the information accessing terminals.

The internal arrangement of each of the information accessing terminal A 5001 and the information accessing terminal B 5002 is the same as that of the fifth embodiment shown in FIG. 52.

A description will be made hereinbelow of an operation to be taken for, in the case that an environment which allows a different information accessing terminal B capable of the complete reference and input occurs after the user 1 repeatedly makes reference through one information accessing terminal A and there are many information a portion of each of which is incompletely referred to because of the limitation in the terminal ability, when the user terminates incomplete works in a lump.

In this embodiment, the terminal ability, the transfer history information and the referred information analysis result are all the same as those in the fifth embodiment.

Figure 86:
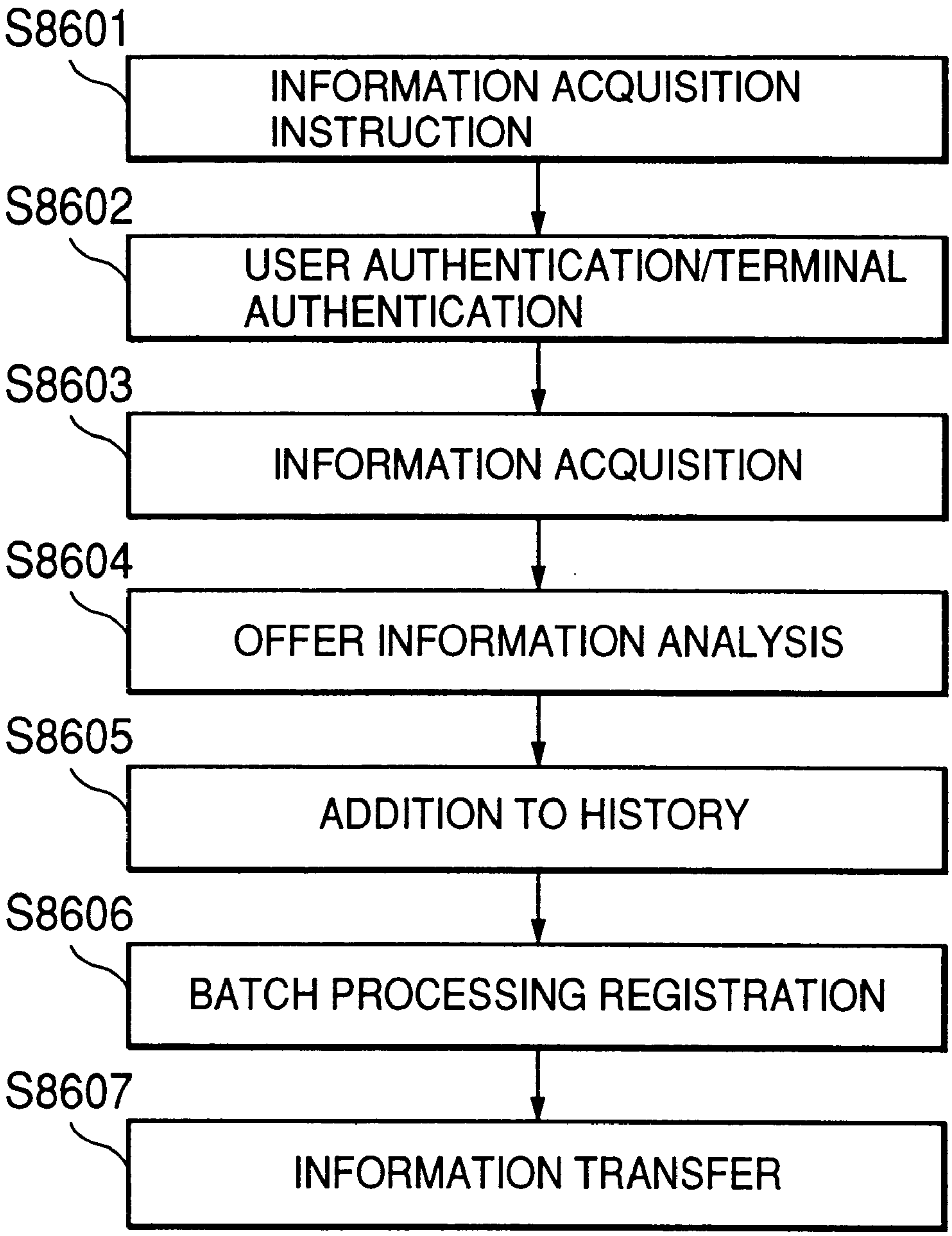
FIG. 86 is a flow chart showing information acquisition in the ninth embodiment of this invention.

First, referring to FIG. 86, a description will be made hereinbelow of an operation to be taken until the user 1 issues instructions for the acquisition of the information w, x, y and z through the information accessing terminal A and displays them in the information accessing terminal A.

For the acquisition of the information w, the operations from a step S8601 to a step S8605 are the same as those in the fifth embodiment. In this case, assuming that the information w is the same as the information w of the fifth embodiment, a flag indicative of non-display does not rise in terms of the transfer history information.

Figure 88:
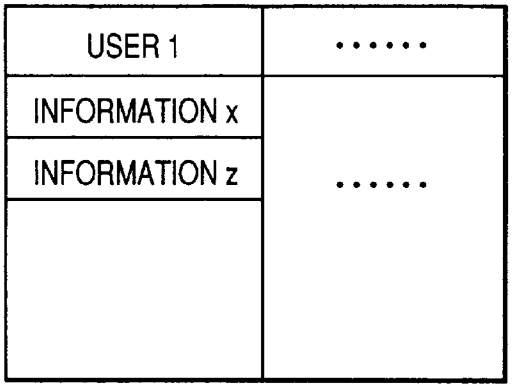
FIG. 88 is an illustration of one example of batch processing management information in the ninth embodiment of this invention.

In a step S8606, the batch processing managing section 8511 refers to the transfer history information added in the step S8605 registers the identifier for that information with a list of the batch operation information about the user 1 if the flag indicative of non-display rises. In this case, since the no-display contents do not exist, the registration is not made. Then, in a step S8607, an operation is conducted as well as the operation of the step S5306 in the fifth embodiment. Further, for the acquisition of the information x, y and z, the steps S8601 to S8607 are repeatedly conducted. In this embodiment, assuming that the information x is the same as the information x in the fifth embodiment, and the information y includes only a text and the information includes a table, the transfer history information becomes as shown in FIG. 87 at the time of the completion of the acquisition of the information z. Still further, the information x and z are registered with the list of the batch operation information about user 1 as shown in FIG. 88.

Figure 89:
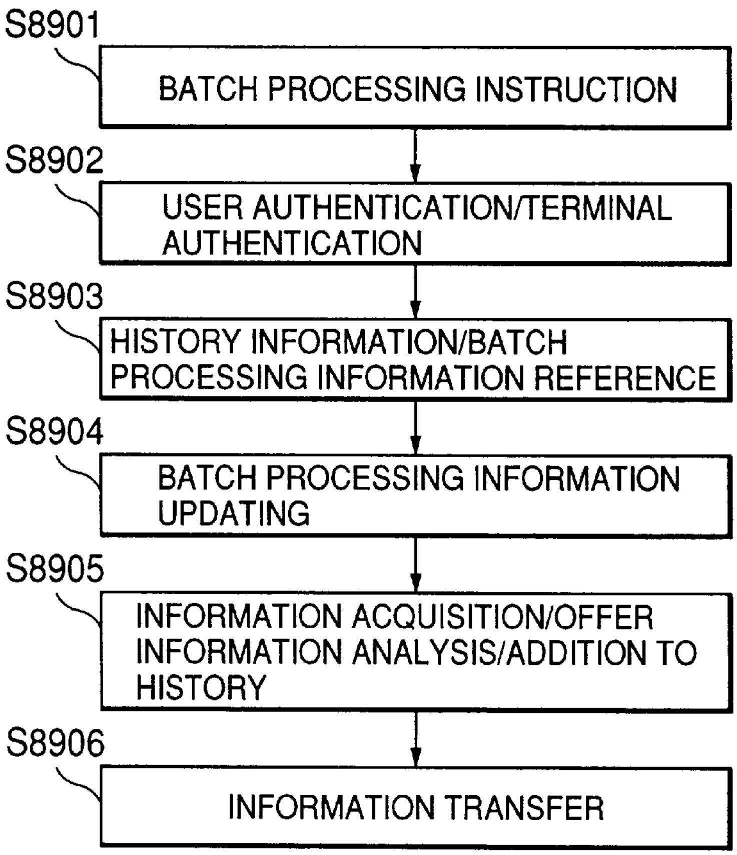
FIG. 89 is a flow chart showing a batch processing instruction by a second terminal in the ninth embodiment of this invention.

Furthermore, referring to FIG. 89, a description will be made hereinbelow of an operation to be taken until the user 1 issues an instruction for batch processing through the information accessing terminal B and gets the information x and z and displays them in the information accessing terminal B.

In a step S8901, the user 1 gives an instruction for the execution of the batch processing through the use of the inputting section 5201 of the information accessing terminal B, with this instruction being communicated through the communication section 5204 to the information transfer managing system 5004. Then, in a step S8902, the communication section 8501 receives the instruction from the user 1, and the user authentication section 8502 identifies the user being the sender of the instruction while the terminal identifying section 8503 identifies the terminal ability of the sender. In this case, a decision is made to that the terminal B can display a table.

Subsequently, in a step S8903, the information transferring section 8504 reads out the transfer history information about the user 1 shown in FIG. 87 and the batch processing information about the user shown in FIG. 88, whereas the batch processing managing section 8511 compares these with the terminal ability to determine the referred information. In this case, the information x at the head of the list of the batch processing information is the transfer history information and the table is in a partially non-displayed condition, and since the table can be displayed by the terminal ability of the sender, the information x is selected as the referred information.

Following this, in a step S8904, the batch processing managing section 8511 deletes, of the batch processing information, the information that no-display is not taken as a result of the comparison with the transfer history information in the step S8903. At this time, the batch processing information does not undergo the deletion. Further, in a step S8905, the information acquisition, the referred information analysis and addition to history are done as well as the operations in the aforesaid steps S8603, S8604 and S8605. In this case, since the terminal ability of the sender allows the display of a table, the flag indicative of non-display of a table in the information x falls down, the transfer history information assumes "absence". Still further, in a step S8906, an operation similar to the operation in the step S5306 in the fifth embodiment is conducted, so that the information x is displayed on the information accessing terminal B 5002.

Thereafter, returning to the step S8901, the user 1 gives an instruction for the execution of the batch processing through the use of the inputting section 5201 of the information accessing terminal B 5002, with this instruction being communicated through the communication section 5204 to the information transfer managing section 5004. Further, in a step S8902, an operation is conducted as well as the first operation, and a decision is made to that the information accessing terminal B can display a table. Then, in a step S8903, an operation is conducted as well as the first operation, and the batch processing managing section 8511 determines the referred information. At this time, the transfer history information is as shown in FIG. 90, and the information x at the head of the list of the batch processing information is not selected because "non-display" disappears in the transfer history information, while in the next information z the table is in a partially non-displayed condition and a table can be displayed with the terminal ability of the sender and hence the information z is selected as the referred information.

Figure 91:
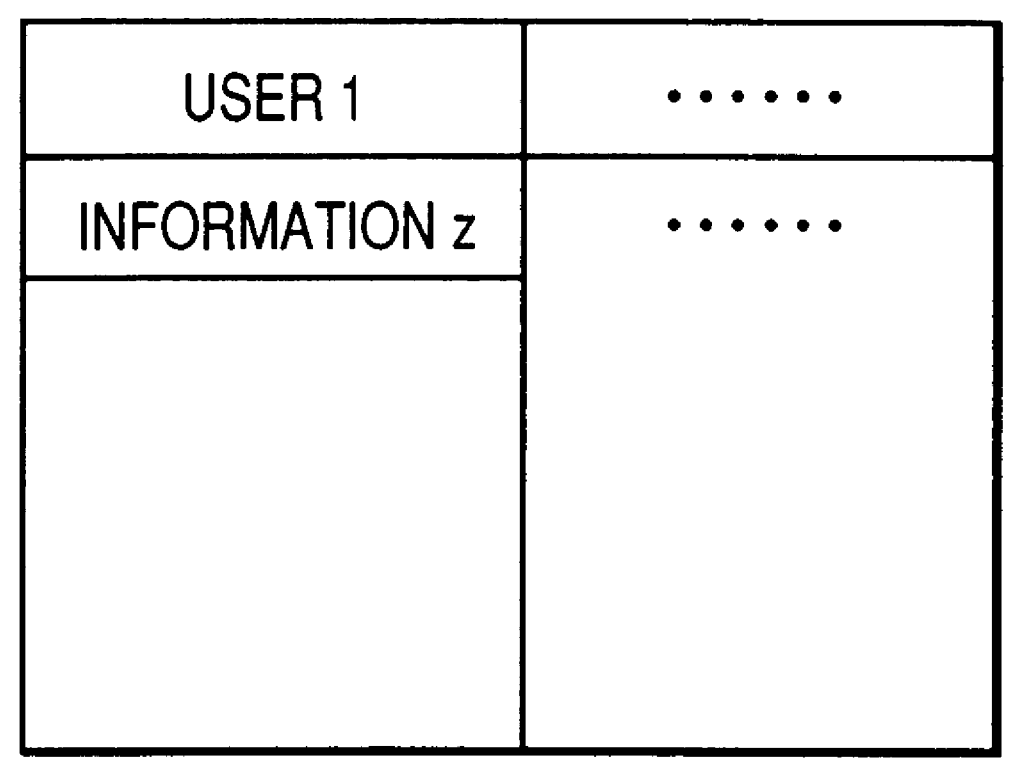

After this, in a step S8904, an operation is conducted as well as the first operation, and since at this time in the batch processing information the information x assumes no non-displayed contents as a result of the comparison with the transfer history information in a step 8903, it is eliminated from the batch processing information, and therefore the batch processing information becomes as shown in FIG. 91. Further, in a step S8905, an operation is conducted as well as the first operation to perform the information acquisition, the referred information analysis and the addition to history. In this case, since the table can be displayed due to the terminal ability of the sender, in the transfer history information, as shown in FIG. 92, a flag indicative of non-display of the table in the information z falls down, thus resulting in "nothing". Then, in a step S8906, an operation is conducted as well as the first operation so that the information z us displayed in the information accessing terminal B 5002.

Moreover, operational flow again returns to the step S8901, the user 1 gives an instruction for the execution of the batch processing through the use of the inputting section 5201 of the information accessing terminal B 5002, with this instruction being communicated through the communication section 5204 to the information transfer managing system 5004. Further, in a step S8902, an operation is done as well as the first operation, so that a decision is again made to that the information accessing terminal B can display a table.

Subsequently, in a step S8903, an operation is made as well as the first operation so that the batch processing managing section 8511 determines the referred information, At this time, the batch processing information is as shown in FIG. 91 while the transfer history information is as shown in FIG. 91. Since the contents of the non-display disappear in the transfer history information the information z at the head of the list of the batch processing information is not selected, the referred information becomes absent.

Following this, in a step S8904, an operation is done as well as the first operation, and since at this time the information x assumes no non-displayed contents as a result of the comparison with the transfer history information in a step 8903 in the batch processing information, it is deleted from the batch processing information. Further, in a step S8905, because of no selection of the referred information, an operation is not particularly done. Still further, in a step S8906, a message representative of no referred information is displayed in the information accessing terminal B 5002. From the message the user 1 decides the completion of the batch processing and terminates the work.

As described above, in the information system according to this embodiment, in the case that repeated use is made through one terminal and an environment occurs which allows the use of a different terminal capable of the complete reference after there appear many information a portion of each of which is incompletely referred to because of the limitation in the terminal ability, it is possible to enhance the work efficiency by assisting the user collectively terminates the incomplete work.

Incidentally, although in this embodiment the description is made of only the incomplete reference, the information loss described in the fourth embodiment and the information such as the input described in the seventh and eighth embodiments can undergo the batch processing management, which can assist the batch work. Further, if the analysis result of the referred information analyzing section 8510 is retained in the cache managing section 8508 and is used at the second access or the following access, it is possible to improve the efficiency of the information transfer managing system. Still further, if a group communizes the transfer history information through the use of the group managing section 8507 as in the case of the fourth embodiment, the efficiency of the cooperative work can improve.

Furthermore, if the edition of the referred information is made as in the case of the eighth embodiment, for example, if a comment "under batch work" is put therein to guide the user not to conduct operations other than the batch work, the work efficiency can improve. Moreover, when the batch processing managing section 8511 selects the referred information from the batch processing information, if a decision of the precedence is made from the factors such as the kind of the incomplete situation such as the information loss due to the information conversion and the non-inputted condition due to no input ability, the position on a network decided on the basis of the identifier of the referred information and the latest reference time, in a series of batch processing it is possible to make the reference to and input of the information in the order of decreasing precedence, which can enhance the work efficiency of the batch processing.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An information transfer managing system comprising:

a user authentication section for identifying a user;

a transfer history managing section for retaining and managing a demand on reference to and input of information from an information accessing terminal, with said transfer history managing section having a function to retain and manage said demand in units of a user, said transfer history managing section having a function to manage information at every group including any group having a plurality of users, said transfer history managing section being capable of utilizing a piece of information of a user of one group when obtaining information of another user belonging to the same group; and an additional information managing section for managing additional information on said demand managed by said transfer history managing section, with said additional information being added to a transfer history of information recorded in said transfer history managing section.

2. An information acquisition proxy system which conducts mediation for information acquisition between an information accessing terminal and an information distributing server, said system comprising:

a user authentication section for identifying a user;

an information acquisition history managing section for retaining and managing a demand for information acquisition from said information accessing terminal, with said information acquisition history managing section retaining and managing demands in units of a user, said information acquisition history managing section having a function to manage information at every group including any group having a plurality of users, said information acquisition history managing section being capable of utilizing a piece of information of one user of one group when obtaining information of another user belonging to the same group; and an additional information managing section for managing additional information for said demand managed by said information acquisition history managing section.

3. An information acquisition proxy system which conducts mediation for information acquisition between an information accessing terminal and an information distributing server, said system comprising:

a user authentication section for identifying a user;

an information acquisition history managing section for retaining and managing a demand for information acquisition from said information accessing terminal, with said information acquisition history managing section retaining and managing demands in units of users; and an additional information managing section for managing additional information for said demand said information acquisition history managing section manages, further comprising a terminal identifying section for finding out an ability of said information accessing terminal and a referred information analyzing section for analyzing the contents of information to be presented to said information accessing terminal to compare an analysis result with said ability of said information accessing terminal so that specific information is added to a transfer history of said referred information in accordance with a comparison result by said referred information analyzing section.

4. An information acquisition proxy system as defined in claim 3, further comprising an access information analyzing section for analyzing a demand information about reference to and input of information from said information accessing terminal to compare an analysis result with said ability of said information accessing terminal so that specific information is added to said transfer history of said referred information according to a comparison result by said access information analyzing section.

5. An information acquisition proxy system which conducts mediation for information acquisition between an information accessing terminal and an information distributing server, said system comprising:

a user authentication section for identifying a user;

a terminal identifying section for finding out an ability of said information accessing terminal;

an information converting section for converting the contents of information in accordance with said ability of said information accessing terminal found out by said terminal identifying section;

an information acquisition history managing section for retaining and managing a demand for information acquisition from said information accessing terminal in units of users; and an additional information managing section for managing additional information on said information acquisition demand said information acquisition history managing section manages, wherein, when said information converting section performs conversion to reduce a quantity of information, specific additional information is given to said information acquisition demand recorded in said information acquisition history managing section.

6. An information acquisition proxy system as defined in claim 5, further comprising an referred information analyzing section for analyzing the contents of information to be presented to said information accessing terminal to compare an analysis result with said ability of said information accessing terminal so that specific information is added to a transfer history of said referred information in accordance with a comparison result by said referred information analyzing section.

7. An information acquisition proxy system as defined in claim 6, further comprising an access information analyzing section for analyzing a demand information about reference to and input of information from said information accessing terminal to compare its analysis result with said ability of said information accessing terminal so that specific information is added to said transfer history of said referred information according to a comparison result by said access information analyzing section.

8. An information acquisition proxy system as defined in claim 5, further comprising a cache managing section for retaining information once obtained so that, when said specific additional information is given to said information acquisition demand said information acquisition history managing section manages, a time period taken until said cache managing section erases the retained information corresponding to said demand is changed in accordance with said specific additional information.

9. An information transfer managing system comprising:

a user authentication section for identifying a user;

a terminal identifying section for finding out an ability of an information accessing terminal;

an information converting section for converting the contents of information in accordance with said ability of said information accessing terminal found out by said terminal identifying section; and a transfer history managing section for retaining and managing a demand on reference to and input of information from said information accessing terminal in units of users, wherein, when said information converting section makes conversion of the contents of said information to reduce its information quantity, specific information is added to a transfer history of said information recorded in said transfer history managing section.

10. An information transfer managing system comprising:

a user authentication section for identifying a user;

a terminal identifying section for finding out an ability of an information accessing terminal;

a referred information analyzing section for analyzing the contents of information to be referred to said information accessing terminal to compare its analysis result with said ability of said information accessing terminal; and a transfer history managing section for retaining and managing a demand on reference to and input of information from said information accessing terminal in units of users in addition to a comparison result by said referred information analyzing section, wherein, when said referred information analyzing section decides that a portion of said referred information is incompletely referred to in said information accessing terminal, specific information is added to a transfer history of said information recorded in said transfer history managing section.

11. An information transfer managing system as defined in claim 10, further comprising a referred information editing section for partially change the contents of information to be referred to said information accessing terminal.

12. An information transfer managing system comprising:

a user authentication section for identifying a user;

a terminal identifying section for finding out an ability of an information accessing terminal;

a referred information analyzing section for analyzing the contents of information to be referred to said information accessing terminal to compare its analysis result with said ability of said information accessing terminal found by said terminal identifying section;

an operation information extracting section for extracting an item relating to an operation by said user from said analysis result by said referred information analyzing section;

an access information analyzing section for analyzing demand information concerning reference and input of information from said information accessing terminal to compare its analysis result with said ability of said information accessing terminal found by said terminal identifying section; and a transfer history managing section for retaining and managing a demand on the reference to and input of information from said information accessing terminal in units of users together with said analysis results by said referred information analyzing section and said access information analyzing section, wherein, when said access information analyzing section decides that a portion of input is incomplete in said information accessing terminal, specific information is added to a transfer history of information retained in said transfer history managing section.

13. An information transfer managing system as defined in claim 12, further comprising a referred information editing section for partially changing the contents of said information to be referred to said information accessing terminal.

14. An information transfer managing system as defined in claim 9, further comprising a batch processing managing section for continuously offering said information, to which incomplete access occurs, to said information accessing terminal.

15. An information transfer managing system as defined in claim 14, wherein said batch processing managing section gives a precedence to said information to which a plurality of incomplete access occur.

16. An information acquisition proxy system as defined in claim 2, wherein said one group is one of a plurality of groups, and said information history managing section utilizes a piece of information of one user in said one of a plurality of groups when obtaining information of another user belonging to the same one of a plurality of groups.

17. An information transfer managing system as defined in claim 1, wherein said one group is one of a plurality of groups, and said transfer history managing section utilizes a piece of information of one user in said one of a plurality of groups when obtaining information of another user belonging to the same one of a plurality of groups.

* * * * *